United States Patent
Skowronek et al.

(10) Patent No.: US 9,720,086 B1
(45) Date of Patent: *Aug. 1, 2017

(54) THERMAL- AND MODULATED-LIGHT-BASED PASSIVE TRACKING SYSTEM

(71) Applicant: 4Sense, Inc., Delray Beach, FL (US)

(72) Inventors: Stanislaw K Skowronek, New York, NY (US); Christopher M. Wade, Ocean Ridge, FL (US); Antonio A Ricco, Weston, FL (US)

(73) Assignee: 4Sense, Inc., Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,485

(22) Filed: Nov. 22, 2016

(51) Int. Cl.
| | |
|---|---|
| *G01N 21/00* | (2006.01) |
| *G01S 17/02* | (2006.01) |
| *G01J 5/00* | (2006.01) |
| *G01J 5/10* | (2006.01) |
| *G01B 21/16* | (2006.01) |
| *G01S 17/66* | (2006.01) |
| *G01S 17/06* | (2006.01) |

(52) U.S. Cl.
CPC ............ *G01S 17/023* (2013.01); *G01B 21/16* (2013.01); *G01J 5/0025* (2013.01); *G01J 5/10* (2013.01); *G01S 17/06* (2013.01); *G01S 17/66* (2013.01)

(58) Field of Classification Search
CPC .......... G01S 17/66; G01S 17/87; G01S 15/66; G01S 15/06; G01S 17/06; G01B 11/00; G01N 21/00

See application file for complete search history.

(56) References Cited

U.S. PATENT DOCUMENTS

| | | |
|---|---|---|
| 5,231,483 A | 7/1993 | Sieber et al. |
| 7,894,305 B2 | 2/2011 | Sabatier et al. |
| 8,131,011 B2 | 3/2012 | Nevatia et al. |
| 8,139,029 B2 | 3/2012 | Boillot et al. |

(Continued)

FOREIGN PATENT DOCUMENTS

EP    WO2015086855 A1    6/2015

OTHER PUBLICATIONS

U.S. Appl. No. 15/359,513, Skowronek et al., "Visible-Light and Sound-Based Passive Tracking System," filed Nov. 22, 2016.

(Continued)

*Primary Examiner* — Abdullahi Nur

(57) ABSTRACT

A passive-tracking system is described herein. In one example, the passive-tracking system includes a thermal sensor configured to generate a series of thermal frames based on an object in a monitoring area. In this example, the system also includes a processor and a time-of-flight (ToF) sensor configured to generate a series of modulated-light frames based on the object. The processor may be configured to receive the thermal and modulated-light frames and based at least in part on the data of the frames, generate a novelty representation of the object. Based on this data, the processor may also be configured to determine whether the object is human and if so, generate a three-dimensional (3D) position of the human object. The processor may also be configured to passively track the human object over time by, based on the novelty representation, selectively updating the 3D position of the human object.

19 Claims, 11 Drawing Sheets

(56) References Cited

U.S. PATENT DOCUMENTS

| | | | |
|---|---|---|---|
| 8,274,386 | B1 | 9/2012 | Dea et al. |
| 8,744,121 | B2 | 6/2014 | Polzin et al. |
| 9,007,871 | B2 | 4/2015 | Armstrong-Muntner |
| 2007/0159922 | A1 | 7/2007 | Zimmerman et al. |
| 2008/0069411 | A1 | 3/2008 | Friedman et al. |
| 2008/0123968 | A1 | 5/2008 | Nevatia et al. |
| 2010/0303289 | A1 | 12/2010 | Polzin et al. |
| 2011/0007939 | A1 | 1/2011 | Teng et al. |
| 2011/0148689 | A1 | 6/2011 | Filippi et al. |
| 2011/0216192 | A1 | 9/2011 | Leung et al. |
| 2013/0237811 | A1 | 9/2013 | Mihailescu et al. |
| 2014/0072170 | A1 | 3/2014 | Zhang et al. |
| 2014/0077988 | A1* | 3/2014 | Saito .................. G01S 7/41 342/27 |
| 2014/0369561 | A1 | 12/2014 | Gupta et al. |
| 2015/0336014 | A1 | 11/2015 | Stenzler et al. |
| 2016/0033334 | A1 | 2/2016 | Zhevelev |
| 2016/0093051 | A1 | 3/2016 | Cheatham, III et al. |
| 2016/0295128 | A1 | 10/2016 | Schnittman et al. |

OTHER PUBLICATIONS

U.S. Appl. No. 15/359,525, Skowronek et al., "Passive Tracking System," filed Nov. 22, 2016.
U.S. Appl. No. 15/359,537, Skowronek et al., "Modulated-Light-Based Passive Tracking System," filed Nov. 22, 2016.
Thiago Teixeira et al., "A Survey of Human-Sensing: Methods for Detecting Presence, Count, Location, Track, and Identity," ENALAB Technical Report, Sep. 2010, pp. 1-41, vol. 1, No. 1.
Larry Li, "Time-of-Flight Camera—An Introduction," Texas Instruments Technical White Paper, Jan. 2014 (revised Mary 2014), pp. 1-10, SLOA190B.
Nordic Semiconductor, "Bluetooth Smart Presence-Detecting Power Plugs Allow Users to Automatically Control Lights and Home Appliances in Their Homes," Product-Related News, Feb. 18, 2015, Oslo, Norway.
Scanse, "Sweep—Scanning LiDAR," https://www.kickstarter.com/projects/scanse/sweep-scanning-lidar?ref=thanks, San Leandro, California.
David Geronimo, "Computer Vision Research," http://www.davidgeronimo.com/index.php?s=projects.
Kurzweil, "Tracking People in Complex Indoor Settings," http://www.kurzweilai.net/how-to-track-people-in-complex-indoor-settings, Jun. 14, 2013.
University of Central Florida, Center for Research in Computer Vision, http://crcv.ucf.edu/projects/Part-basedTracking/index.php.
Randa Bakken, "XeThru Sensors Deliver Human Presence Tracking at Store Experiment," https://www.xethru.com/blog/posts/xethru-sensors-deliver-human-presence-tracking, XeThru.
Xandem, "A Powerful New Technology to Help You Watch Over the People and Places that Matter Most," http://www.xandem.com/.
Chris Leader, "Introducing Stack Care," http://stacklighting.com/news/introducing-stack-care, Stack Lighting, Oct. 13, 2016.
Jon Fingas, "Google's Mini-Radar Can Identify Virtually Any Object," https://www.engadget.com/2016/11/09/google-project-soli-used-to-identify-objects/, Engadget, Nov. 9, 2016.
Non-final office action delivered on Feb. 15, 2017 for U.S. Appl. No. 15/359,513, filed Nov. 2, 2016, Skowronek, et al.
"Motion detector," section "Dual-technology motion detectors," retrieved May 5, 2017, Wikipedia, https://en.wikipedia.org/wiki/Motion_detector.
"Motion detector," section "Dual-technology motion detectors," version edited on Nov. 6, 2016, Wikipedia, https://en.wikipedia.org/w/index.php?title=Motion_detector&oldid=748099505.
Amendment and supporting exhibits filed on May 12, 2017 for U.S. Appl. No. 15/359,513, Skowronek, et al.
Chen, Hai-Wen and Braunreiter, Dennis, "Robust Image-Domain Target Tracking and Recognition Process under Heavy Urban Background Clutter Conditions," Acquisition, Tracking, Pointing, and Laser System Technologies XXIII, Proc. of SPIE, vol. 7338, 73380M, pp. 73380M-1 to 73380M-11, 2009.
Chen, Hai-Wen and McGurr, Mike, "An Automated Data Exploitation System for Airborne Sensors," Geospatial InfoFusion and Video Analytics IV, Motion Imagery for ISR and Situational Awareness II, Proc. of SPIE, vol. 9089, 90890F, pp. 90890F-1 to 90890F-20, 2014.
Chen, Hai-Wen and McGurr, Mike, "Robust Human Detection, Tracking, and Recognition in Crowded Urban Areas," Ground/Air Multisensor Interoperability, Integration, and Networking for Persistent ISR V, Proc. of SPIE, vol. 9079, 90790C, pp. 90790C-1 to 90790C-15, Jun. 2014.
Chen, Hai-Wen, McGurr, Mike, and Brickhouse, Mark, "Chemical Agent Resistant Coating (CARC) Detection Using Hyper-Spectral Imager (HSI) and a Newly Developed Feature Transformation (FT) Detection Method," Algorithms and Technologies for Multispectral, Hyperspectral, and Ultraspectral Imagery XXI, Proc. of SPIE, vol. 9472, 947202, pp. 947202-1 to 947202-21, May 2015.
Chen, Hai-Wen, McGurr, Mike, and Brickhouse, Mark, "Robust Chemical and Chemical-Resistant Material Detection Using Hyper-Spectral Imager and a New Bend Interpolation and Local Scaling HSI Sharpening Method," Algorithms and Technologies for Multispectral, Hyperspectral, and Ultraspectral Imagery XXI Proc. of SPIE, vol. 9472, 94720N, pp. 94720N-1 to 94720N-21, May 2015.
Chen, Hai-Wen and McGurr, Mike, "Moving Human and Full-Body and Body-Parts Detection, Tracking, and Applications on Human Activity Estimation, Walking Pattern and Face Recognition," Automatic Target Recognition XXVI, Proc. of SPIE, vol. 9844, 98440T, pp. 98440T-1 to 98440T-34, Jun. 2016.

* cited by examiner

THERMAL- AND MODULATED-LIGHT-BASED PASSIVE TRACKING SYSTEM

FIELD

The subject matter described herein relates to tracking systems and more particularly, to tracking systems that are capable of passively tracking one or more objects.

BACKGROUND

In recent years, several companies have developed systems that detect the presence of an object and in response, take some sort of action. For example, a passive infrared (PIR) sensor that is part of a security-lighting system detects the infrared radiation (IR) emitted in its surrounding environment and may cause the lights of the system to illuminate when changes to the environment, such as movement, are detected. This type of detection is passive in nature because the object in motion is not required to take any action, other than its normal interactions within the environment being monitored, for the PIR sensor to detect it. As another example, a system may emit signals, such as laser beams, for the detection of the movement of an object, which may be used to trigger an external system. Similar to the PIR sensor example, the interaction of the object is passive because the object is unmodified as it moves through the relevant area in a normal manner. That is, the object is not required to take any predetermined actions or move in any particular manner for the motion to be detected.

These passive systems, however, are not designed to provide any information about the objects that they detect. In particular, the PIR sensor and the motion-detector system are unable to track the object as it moves through the location being monitored. Such systems also fail to detect objects that are present but remain at rest for prolonged periods and cannot distinguish from one another multiple objects that may be detected in the same area. This latter event is particularly true if an object that initiated the original detection has left the area and a new and different object has entered the area at the same time or shortly thereafter.

SUMMARY

A passive-tracking system for passively tracking a human is described herein. The system can include a thermal sensor that can be configured to receive thermal radiation emitted from an object in a monitoring area and generate a series of temperature or thermal frames based at least in part on the thermal radiation emitted from the object in the monitoring area. The system can also include a time-of-flight (ToF) sensor and a processor, which can be communicatively coupled to the thermal sensor and the ToF sensor. The ToF sensor can be configured to generate a series of modulated-light or positioning frames based at least in part on modulated light reflected off the object.

The processor can be configured to receive the thermal frames from the thermal sensor and the modulated-light frames from the ToF sensor and, based at least in part on the data of the thermal frames and the modulated-light frames, generate a novelty representation of the object. Also based at least in part on the data of the thermal frames and the modulated-light frames, the processor can be configured to determine whether the object is human. If the processor determines that the object is human, the processor can be further configured to, based on the novelty representation, generate a three-dimensional (3D) position of the human object and passively track the object over time by, based on the novelty representation, selectively updating the 3D position of the human object. As an option, two-dimensional positions of an object or other element may be provided and updated over time in a similar manner.

The processor can be further configured to, based at least in part on the data of the thermal frames, track one or more thermal reference frames and based at least in part on the data of the modulated-light frames, track one or more modulated-light reference frames. The processor may also be configured to, based on an analysis of the thermal reference frames and one or more past-performance factors, assign a deemphasizing grade to the data of the thermal frames.

As an example, the thermal reference frames include thermal reference frames that correspond to different time periods or to different thermal events. As another example, the modulated-light reference frames can include modulated-light reference frames that correspond to different time periods or to different modulated-light events. In one arrangement, the processor can be further configured to compare the data of the thermal frames to the data of the thermal reference frames and to compare the data of the modulated-light frames to the data of the modulated-light reference frames as part of the generation of the novelty representation of the object. The processor may also be configured to merge data of the thermal frames and the modulated-light frames based on novelty factors as part of the generation of the novelty representation of the object. In another arrangement, the processor may be configured to conduct a size-threshold analysis or to conduct a thermal analysis as part of the determination of whether the object is human.

In one embodiment, one of the modulated-light frames can be a current modulated-light frame and another one of the modulated-light frames can be a previous positioning frame. In this embodiment, the processor can be further configured to compare the data of the current modulated-light frame to the data of the previous modulated-light frame and to reject excessive motion readings based on the comparison of the data of the current modulated-light frame to the data of the previous modulated-light frame as part of the determination of the 3D position of the object. As an example, the 3D position can include X, Y, and Z coordinates. The processor may be further configured to extract features from the data of the modulated-light frames in which at least some of the features include human-recognition features that are associated with the object.

The passive-tracking system may also include a communication circuit that is communicatively coupled to the processor. The processor may be further configured to signal the communication circuit to cause the 3D position of the object and the updates of the 3D position of the object to be transmitted to a hub or to a second passive-tracking system. As an example, the hub or the second passive-tracking system may be part of a network.

A method of passively tracking a human is also described herein. The method can includes the steps of generating thermal frames that include data associated with thermal radiation emitted from a human in a monitoring area and generating modulated-light frames that include data associated with modulated light reflected off the human. The method can also include the steps of comparing the data of the thermal frames with one or more thermal reference frames and comparing the data of the modulated-light frames with one or more modulated-light reference frames. Based on comparing the data with the thermal reference frame and on comparing the data with the modulated-light reference frame, a digital representation of the human may be generated. The method can also include the step of determining a 3D position for the digital representation and passively tracking the human over time by periodically updating the 3D position of the digital representation.

The method can also include the step of selectively tracking the thermal reference frame and the modulated-light reference frame. As an example, selectively tracking the thermal reference frame and the modulated-light reference frame can include tracking multiple thermal reference frames and multiple modulated-light reference frames. The multiple thermal reference frames may include thermal reference frames that are based on separate time periods or separate thermal events, and the multiple modulated-light reference frames may include modulated-light reference frames that are based on separate time periods or separate modulated-light events.

In one embodiment, generating thermal frames that include data associated with thermal radiation emitted from a human in the monitoring area can include generating thermal frames that include temperature data associated with thermal radiation emitted from the human and a second human in the monitoring area. Also in this embodiment, generating modulated-light frames that include data associated with modulated light reflected off the human can include generating modulated-light frames that include data associated with modulated light reflected off the human and the second human.

The method can also include the steps of distinguishing the digital representation of the human from a digital representation of the second human and simultaneous to passively tracking the human, passively tracking the second human over time by periodically updating a 3D position of the digital representation of the second human. As an example, distinguishing the digital representation of the human from the digital representation of the second human can include the step of detecting a depth boundary of the digital representation of the human and the digital representation of the second human. The method can further include the step of providing a passive count of a plurality of humans in the monitoring area.

Another passive-tracking system for passively tracking a living being is described herein. This system may include a thermal sensor that can be configured to generate a series of thermal frames based at least in part on an object in a monitoring area and may also include a ToF sensor that can be configured to generate a series of modulated-light frames based at least in part on modulated-light reflections off the object. In addition, the system can include a transducer array that can be configured to generate a series of sound frames based at least in part on sound reflections off the object and include a processor that can be communicatively coupled to the thermal sensor, the ToF sensor, and the transducer array.

The processor can be configured to receive the thermal frames from the thermal sensor and the modulated-light frames from the ToF sensor and based at least in part on the data of the thermal frames and the modulated-light frames, determine a 3D position of the object. The processor can be further configured to, based on at least one of the values of the 3D position of the object, narrow a focus of a search of the transducer array and to, based on the search of the transducer array, selectively adjust the value of the 3D position of the object. The processor can also be configured to passively track the object over time by selectively updating the 3D position of the object and the adjusted value of the 3D position of the object.

As an example, the value of the 3D position that is selectively adjusted is a depth position of the object with respect to the passive-tracking system. The processor may also be configured to narrow the focus of the search of the transducer array at least in part by merging the data of the thermal frames and the modulated-light frames and mapping data from the sound frames against the merged data to identify a primary maximum of the sound reflections off the object.

Figure 1:
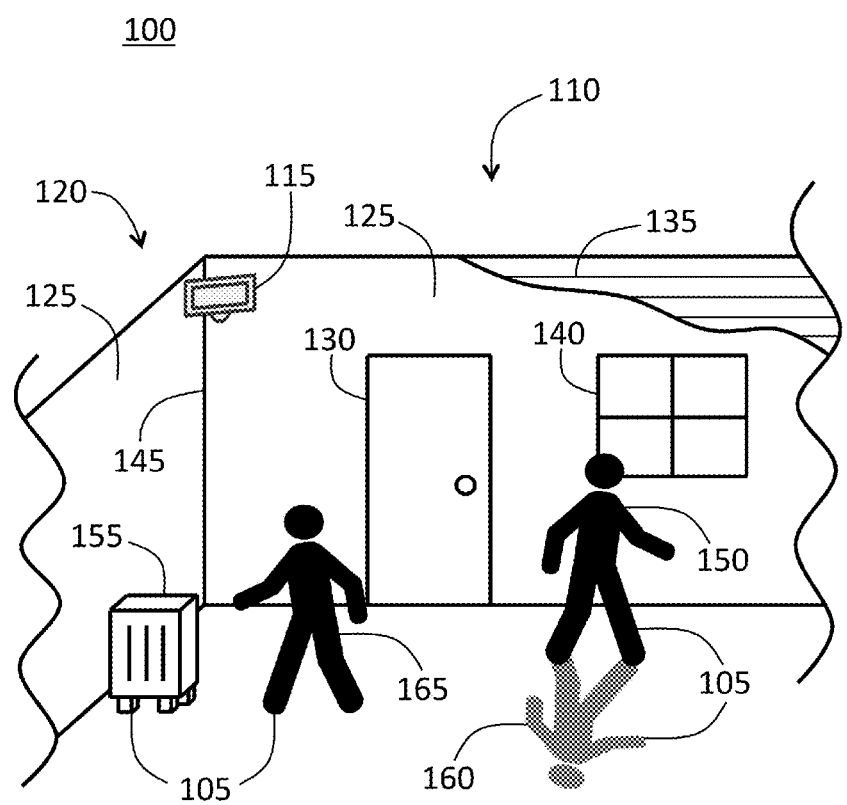
FIG. 1 illustrates an example of a passive-tracking system for passively tracking one or more objects.

For purposes of simplicity and clarity of illustration, elements shown in the above figures have not necessarily been drawn to scale. For example, the dimensions of some of the elements may be exaggerated relative to other elements for clarity. Further, where considered appropriate, reference numbers may be repeated among the figures to indicate corresponding, analogous, or similar features. In addition, numerous specific details are set forth to provide a thorough understanding of the embodiments described herein. Those of ordinary skill in the art, however, will understand that the embodiments described herein may be practiced without these specific details.

DETAILED DESCRIPTION

As previously explained, current systems that detect the presence or movement of an object are unable to provide information about such objects, and most of them perform only rudimentary actions, like causing lights to illuminate, in response to such detection. In particular, these existing systems cannot generate spatial-location-tracking information of objects or address scenarios that involve multiple objects in the same area or mixed object movements in which an object transitions between motion and stillness. As such, these pre-existing systems are ill-suited for passive tracking of humans, a process that does not require a human to establish some active connection with the system, such as through a mobile device or by using predetermined voice commends or gestures, to enable the system to monitor or otherwise track the human.

A passive-tracking system for passively tracking a living being, such as a human, is described herein, which represents a significant advancement over the current art. In one embodiment, the passive-tracking system includes a thermal sensor that is configured to receive thermal radiation emitted from an object in a monitoring area and generate a series of temperature frames based at least in part on the thermal radiation emitted from the object in the monitoring area. In this embodiment, the passive-tracking system may also contain a time-of-flight sensor (ToF) that is configured to generate a series of positioning frames based at least in part on reflections of modulated light reflected off the object. The passive-tracking system may also include a processor that is communicatively coupled to the thermal sensor and the ToF sensor.

The processor may be configured to receive the temperature frames from the thermal sensor and the positioning frames from the ToF sensor and based at least in part on the data of the temperature and positioning frames, generate a novelty representation of the object. The processor may also be configured to, based at least in part on the data of the temperature frames and the positioning frames, determine whether the object is human and if the object is human, generate a three-dimensional (3D) position of the human object. The processor may be further configured to passively track the human object over time by selectively updating the 3D position of the human object.

In view of this arrangement, the passive-tracking system can track a human (or some other living being) without first having to receive registration information from the human or without being communicatively coupled to a communication device worn by or otherwise associated with the human. Accordingly, passive tracking can be enabled for any number of living beings in various types of environments without requiring the living beings to take any action beyond their normal interactions with such environments.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. Those of skill in the art, however, will understand that the embodiments described herein can be practiced without these specific details.

Several definitions that are applicable here will now be presented. The term "sensor" is defined as a component or a group of components that include at least some circuitry and are sensitive to one or more stimuli that are capable of being generated by or originating from a living being, composition, machine, etc. or are otherwise sensitive to variations in one or more phenomena associated with such living being, composition, machine, etc. and provide some signal or output that is proportional or related to the stimuli or the variations. An "object" is defined as any real-world, physical object or one or more phenomena that results from or exists because of the physical object, which may or may not have mass. An example of an object with no mass is a human shadow. The term "monitoring area" is an area or portion of an area, whether indoors, outdoors, or both, that is the actual or intended target of observation or monitoring for one or more sensors.

A "frame" is defined as a set or collection of data that is produced or provided by one or more sensors or other components. As an example, a frame may be part of a series of successive frames that are separate and discrete transmissions of such data in accordance with a predetermined frame rate. A "reference frame" is defined as a frame that serves as a basis for comparison to another frame. A "visible-light frame" is defined as a frame that at least includes data that is associated with the interaction of visible light with an object or the presence of visible light in a monitoring area or other location. A "sound frame" or a "sound-positioning frame" is defined as a frame that at least includes data that is associated with the interaction of sound with an object or the presence of sound in a monitoring area or other location. A "temperature frame" or a "thermal frame" is defined as a frame that at least includes data that is associated with thermal radiation emitted from an object or the presence of thermal radiation in a monitoring area or other location. A "positioning frame" or a "modulated-light frame" is defined as a frame that at least includes data that is associated with the interaction of modulated light with an object or the presence of modulated light in a monitoring area or other location.

A "thermal sensor" is defined as a sensor that is sensitive to at least thermal radiation or variations in thermal radiation emitted from an object. A "time-of-flight sensor" is defined as a sensor that is sensitive to at least modulated light or variations in modulated light that is reflected or emitted from an object. A "visible-light sensor" is defined as a sensor that is sensitive to at least visible light that is reflected off or emitted from an object. A "transducer" is defined as a device that is configured to at least receive one type of energy and convert it into a signal in another form. An "array of transducers" is defined as a set of one or more transducers, whether such set of transducers is configured for phased-array operation or not. A "processor" is defined as a circuit-based component or group of circuit-based components that are configured to execute instructions or are programmed with instructions for execution (or both), and examples include single and multi-core processors and co-processors. A "pressure sensor" is defined as a sensor that is sensitive to at least variations in pressure in some medium. Examples of a medium include air or any other gas (or gases) or liquid. The pressure sensor may be configured to detect changes in other phenomena.

The term "circuit-based memory element" is defined as a memory structure that includes at least some circuitry (possibly along with supporting software or file systems for operation) and is configured to store data, whether temporarily or persistently. A "communication circuit" is defined as a circuit that is configured to support or facilitate the transmission of data from one component to another through one or more media, the receipt of data by one component from another through one or more media, or both. As an example, a communication circuit may support or facilitate wired or wireless communications or a combination of both, in accordance with any number and type of communications protocols. The term "communicatively coupled" is defined as a state in which signals may be exchanged between or among different circuit-based components, either on a unidirectional or bi-directional basis, and includes direct or indirect connections, including wired or wireless connections. A "hub" is defined as a circuit-based component in a network that is configured to exchange data with one or more passive-tracking systems or other nodes or components that are part of the network and is responsible for performing some centralized processing or analytical functions with respect to the data received from the passive-tracking systems or other nodes or components.

The term "novelty representation" is defined as a digital representation of an object that is indicative or suggestive of a change in content for one or more frames in comparison to one or more other frames or other data. The term "digital representation" is defined as a representation of an object in which the representation is in digital form or otherwise is capable of being processed by a computer. The term "living-being representation" is defined as a novelty representation that is indicative or suggestive of a living being, including a human. A "human-recognition feature" is defined as a feature, parameter, or value that is indicative or suggestive of a human or some portion of a human. Similarly, a "living-being-recognition feature" is defined as a feature, parameter, or value that is indicative or suggestive of a living being or some portion of a living being. A "thermal event" is defined as an event that causes or results in the emission of thermal radiation. A "positioning event" or "modulated-light event" is defined as an event in which modulated-light is reflected off or emitted from (or both) an object in a monitored area. A "visible-light event" is defined as an event in which visible light is reflected off or emitted from (or both) an object. A "sound event" is defined as an event in which sound is reflected off or emitted from (or both) an object.

A "low-level light condition" is defined as a lighting condition that has a value or some other measurable that is below a predetermined threshold of operation for a sensor or some other device. The term "depth boundary" is defined as a boundary of a digital representation of an object that is based on a depth value of the object in relation to a sensor or some other reference point or structure. The term "three-dimensional position" is defined as data that provides the position of an element in some setting, including real-world settings or computerized settings. The term "sub-position" is defined as a portion of a three-dimensional position that is combined with other positional data to form the three-dimensional position. The term "periodically" is defined as recurring at regular or irregular intervals or a combination of both regular and irregular intervals.

The term "novelty factor" is defined as one or more values that are indicative of whether data corresponding to some current data structure or object was not present in a different data structure or object or in a reference data structure or object. The term "confidence factor" is defined as one or more values or other parameters that are attached or assigned to data related to a measurement, calculation, analysis, determination, finding, or conclusion and that provide an indication as to the likelihood, whether estimated or verified, that such data is accurate or plausible.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Referring to FIG. 1, an example of a system 100 for tracking one or more objects 105 in a monitoring area 110 is shown. In one arrangement, the system 100 may include one or more passive-tracking systems 115, which may be configured to passively track any number of the objects 105. The term "passive-tracking system" is defined as a system that is capable of passively tracking an object. The term "passively track" or "passively tracking" is defined as a process in which a position of an object, over some time, is monitored, observed, recorded, traced, extrapolated, followed, plotted, or otherwise provided (whether the object moves or is stationary) without at least the object being required to carry, support, or use a device capable of exchanging signals with another device that are used to assist in determining the object's position. In some cases, an object that is passively tracked may not be required to take any active step or non-natural action to enable the position of the object to be determined. Examples of such active steps or non-natural actions include the object performing gestures, providing biometric samples, or voicing or broadcasting certain predetermined audible commands or responses. In this manner, an object may be tracked without the object acting outside its ordinary course of action for a particular environment or setting.

In one case, the object 105 may be a living being. Examples of living beings include humans and animals (such as pets, service animals, animals that are part of an exhibition, etc.). Although plants are not capable of movement on their own, a plant may be a living being that is tracked or monitored by the system described herein, particularly if they have some significant value and may be vulnerable to theft or vandalism. An object 105 may also be a non-living entity, such as a machine or a physical structure, like a wall or ceiling. As another example, the object 105 may be a phenomenon that is generated by or otherwise exists because of a living being or a non-living entity, such as a shadow, disturbance in a medium (e.g., a wave, ripple or wake in a liquid), vapor, or emitted energy (like heat or light).

The monitoring area 110 may be an enclosed or partially enclosed space, an open setting, or any combination thereof. Examples include man-made structures, like a room, hallway, vehicle or other form of mechanized transportation, porch, open court, roof, pool or other artificial structure for holding water of some other liquid, holding cells, or greenhouses. Examples also include natural settings, like a field, natural bodies of water, nature or animal preserves, forests, hills or mountains, or caves. Examples also include combinations of both man-made structures and natural elements.

In the example here, the monitoring area 110 is an enclosed room 120 (shown in cut-away form) that has a number of walls 125, an entrance 130, a ceiling 135 (also shown in cut-away form), and one or more windows 140, which may permit natural light to enter the room 120. Although coined as an entryway, the entrance 130 may be an exit or some other means of ingress and/or egress for the room 120. In one embodiment, the entrance 130 may provide access (directly or indirectly) to another monitoring area 110, such as an adjoining room or one connected by a hallway. In such a case, the entrance 130 may also be referred to as a portal, particularly for a logical mapping scheme. In another embodiment, the passive-tracking system 115 may be positioned in a corner 145 of the room 120 or in any other suitable location. These parts of the room 120 may also be considered objects 105. As will be explained below, the passive-tracking system 115 may be configured to passively track any number of objects 105 in the room 120, including both stationary and moving objects 105. In this example, one of the objects 105 in the room 120 is a human 150, another is a portable heater 155, and yet another is a shadow 160 of the human 150. The shadow 160 may be caused by natural light entering the room through the window 140. A second human 165 may also be present in the room 120. Examples of how the passive-tracking system 115 can distinguish the human 150 from the portable heater 155, the shadow 160, and the second human 165 and passively track the human 150 (and the second human 165) will be provided below.

As an example, a passive-tracking system 115 may be assigned to a particular monitoring area 110, meaning that it may passively track objects 105 within the monitoring area 110 or both within and proximate to the monitoring area 110. The passive-tracking system 115, however, may passively track objects 105 outside its assigned monitoring area 110, including objects 105 that are an extended distance from the assigned area 110. Moreover, more than one passive-tracking system 115 may be assigned to a monitoring area 115, and a passive-tracking system 115 may not necessarily be assigned to monitor a particular area, as passive tracking could be performed for any particular setting in accordance with any number of suitable parameters.

Figure 2:
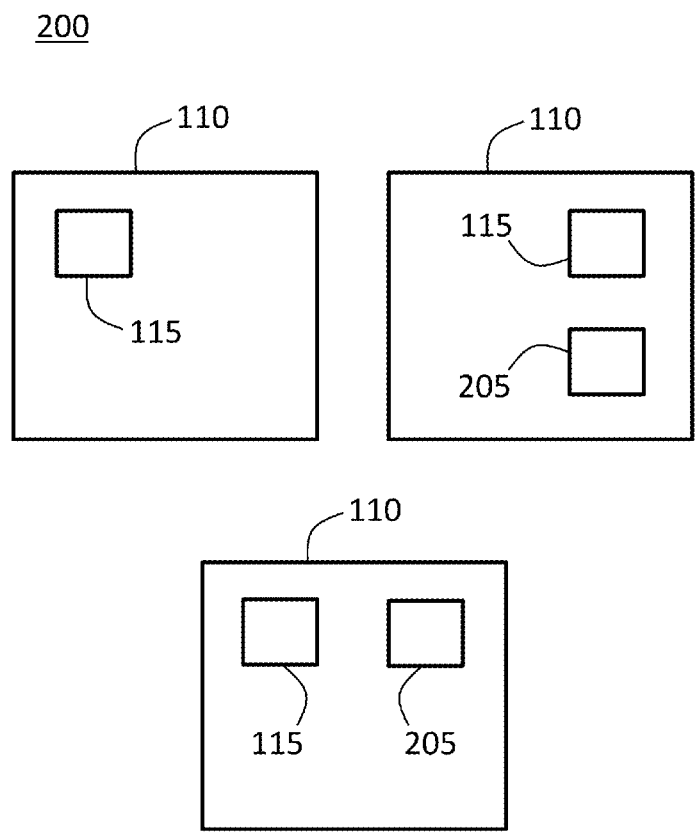
FIG. 2 illustrates an example of a network that includes one or more passive-tracking systems for passively tracking one or more objects.

Turning to FIG. 2, an example of a network 200 is shown. In this example, the network 200 may include a plurality of passive-tracking systems 115, each of which may be configured to passively track objects 105 in a monitoring area 110. As such, each passive-tracking system 115 may be responsible for passively tracking objects 105 in a monitoring area 110 that has been assigned to it. As another example, more than one passive-tracking system 115 may be assigned to a particular monitoring area 110, while others may not necessarily be assigned to any monitoring area 110. Moreover, the passive-tracking systems 115 may be fixed in place in or proximate to a monitoring area 110, although the passive-tracking systems 115 are not necessarily limited to such an arrangement. For example, one or more passive-tracking systems 115 may be configured to move along a track or some other structure that supports movement or may be attached to or integrated with a machine capable of motion, like a drone, vehicle, or robot.

The network 200 may also include one or more hubs 205, which may be communicatively coupled to any of the passive-tracking systems 115. The hubs 205 may process data received from the passive-tracking systems 115 and may provide the results of such processing to the systems 115. In addition, any number of the passive-tracking systems 115 may be communicatively coupled to any of the other passive-tracking systems 115. As such, any combination of the passive-tracking systems 115 and the hubs 205 may exchange various types of data between or among each other. To support this data exchange, the passive-tracking systems 115 and the hubs 205 may be built to support wired or wireless (or both) communications in accordance with any acceptable standards. The hubs 205 may be positioned within any monitoring area 110 or outside the monitoring areas 110 (or a combination of both). As such, the hubs 205 may be considered local or remote, in terms of location and being hosted, for a network 200.

Figure 3:
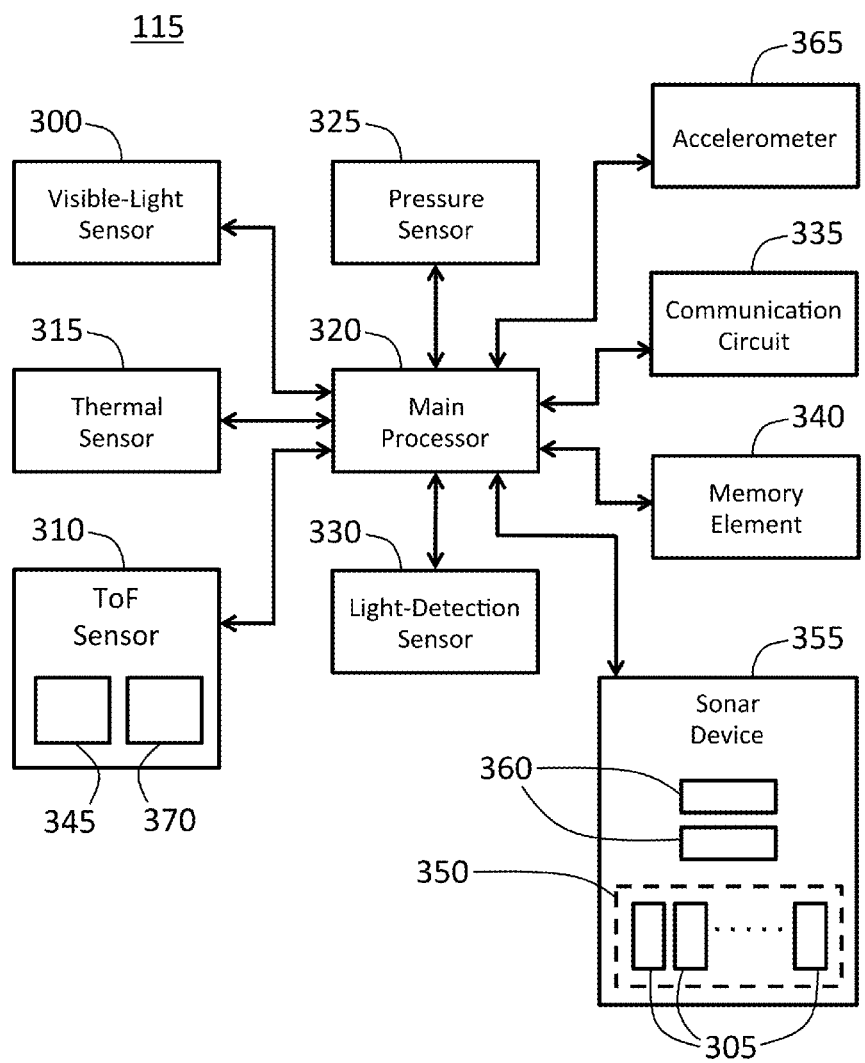
FIG. 3 illustrates a block diagram of an example of a passive-tracking system for passively tracking one or more objects.

Referring to FIG. 3, a block diagram of an example of a passive-tracking system 115 is shown. In this embodiment, the passive-tracking system 115 can include one or more visible-light sensors 300, one or more sound transducers 305, one or more time-of-flight (ToF) sensors 310, one or more thermal sensors 315, and one or more main processors 320. The passive-tracking system 115 may also include one or more pressure sensors 325, one or more light-detection sensors 330, one or more communication circuits 335, and one or more circuit-based memory elements 340. Each of the foregoing devices can be communicatively coupled to the main processor 320 and to each other, where necessary. Although not pictured here, the passive-tracking system 115 may also include other components to facilitate its operation, like power supplies (portable or fixed), heat sinks, displays or other visual indicators (like LEDs), speakers, and supporting circuitry.

In one arrangement, the visible-light sensor 300 can be a visible-light camera that is capable of generating images or frames based on visible light that is reflected off any number of objects 105. These visible-light frames may also be based on visible light emitted from the objects 105 or a combination of visible light emitted from and reflected off the objects 105. In this description, the non-visible light may also contribute to the data of the visible-light frames, if such a configuration is desired. The rate at which the visible-light sensor 300 generates the visible-light frames may be periodic at regular or irregular intervals (or a combination of both) and may be based on one or more time periods. In addition, the rate may also be set based on a predetermined event (including a condition), such as adjusting the rate in view of certain lighting conditions or variations in equipment. The visible-light sensor 300 may also be capable of generating visible-light frames based on any suitable resolution and in full color or monochrome. In one embodiment, the visible-light sensor 300 may be equipped with an IR filter (not shown), making it responsive to only visible light. As an alternative, the visible-light sensor 300 may not be equipped with the IR filter, which can enable the sensor 300 to be sensitive to IR light.

The sound transducer 305 may be configured to at least receive soundwaves and convert them into electrical signals for processing. As an example, the passive-tracking system 115 can include an array 350 of sound transducers 305, which can make up part of a sonar device 355. As another example, the sonar device 355 can include one or more sound transmitters 360 configured to transmit, for example, ultrasonic sound waves in at least the monitored area 110. That is, the array 350 of sound transducers 305 may be integrated with the sound transmitters 360 as part of the sonar device 355. The sound transducers 305 can capture and process the sound waves that are reflected off the objects 105. In one embodiment, the sound transducers 305 and the sound transmitters 360 may be physically separate components. In another arrangement, one or more of the sound transducers 305 may be configured to both transmit and receive soundwaves. In this example, the sound transmitters 360 may be part of the sound transducers 305. If the sound transducers 305 and the sound transmitters 360 are separate devices, the sound transducers 305 may be arranged horizontally in the array 350, and the sound transmitters 360 may be positioned vertically in the array 350. This configuration may be reversed, as well. In either case, the horizontal and vertical placements can enable the sonar device 355 to scan in two dimensions.

As a specific example, the array 350 can include 16 sound transducers 305 with one or more of the transducers 305 orientated in a predetermined direction. This direction may be fixed and may also be adjusted, if necessary. The sound transducers 305 can operate in any range of frequencies, such as from approximately 30 kHz to 100 kHz, although other ranges may be suitable. In this case, the sound transducers 305 are capable of capturing reflections of ultrasonic waves off an object 105, and the ultrasonic waves may be transmitted by the sound transmitters 360.

The sound transducers 305 may also be configured to capture speech or other sounds that are audible to humans or other animals, which may originate from sources other than the sound transmitters 360. Such other sounds are not limited to natural sounds generated by a human or animal, as they may also be produced by a machine, which may be operated or controlled by the human or animal. Based on the reflections or active transmissions of sound, the array 350 of sound transducers 305 may generate one or more sound frames for subsequent processing, as will be shown later. The sound frames can include data related to one or more sound waveforms. As an example, each sound transducer 305 can be arranged to generate the sound frames, or data from the sound transducers 305 can be multiplexed for purposes of generating sound frames that include data from all or a portion of the sound transducers 305. Whatever devices are used to facilitate the compilation of such data may be considered part of the array 350 of sound transducers 305, a plurality of sound transducers 305, or an individual sound transducer 305.

In one arrangement, a phased-array operation may be implemented in the sonar device 355. In one example, the sound transducers 305 may be substantially omnidirectional transducers, meaning they may possibly receive sound reflections from all objects 105 in a monitoring area 110. The sound transducers 305, however, may be positioned in different locations as part of the design of the array 350. As such, time delays between sounds reaching the sound transducers 305 from different directions can enable the sonar device 355 to distinguish these directions from one another. This design may effectively allow the array 350 to realize a number of virtual sound transducers, each with a narrow beam that corresponds to one of the directions. For purposes of clarity, the concepts or features described when referring to sound transducers 305 or an array 350 of sound transducers 305 may apply to virtual sound transducers in phased-array operation, where relevant.

In one example, an array 350 of 16 sound transducers 305 may synthesize 23 virtual sound transducers, and the narrow beams associated with the virtual sound transducers may point in 23 different directions, from roughly negative 45 degrees to about positive 45 degrees azimuth (or substantially horizontal). As another example, for each of these directions, returns may be received for 512 distance values, from near zero to about 630 centimeters. Of course, the array 350 may be configured to support other arrangements for sonar operation. As another option, multiple (separate) phased arrays can be used to achieve 360 degree coverage if the individual transducers 305 are not omnidirectional. Then an arrangement can be realized in which the sound transducers 305 are both narrow-angle (compared to the whole system) and are used to create virtual sound transducers in a phased-array arrangement, with whole groups of transducers 305 pointing in a given direction.

To support the detection of reflected sound waves, the sonar device 355 may emit ultrasound pulses. In one embodiment, the frequencies of the pulses may not remain at the same values throughout their durations, resulting in a chirped pulse, or a chirp. A benefit of a chirp is that the distance at which the reflection from the chirp that occurs may be determined with an accuracy greater than that originating from a pulse with a constant frequency. As an example, the sonar device 355 may emit two chirps with opposite chirp directions in which one of the sound transmitters 360 may transmit an up-chirp and another may transmit a down chirp. As these chirps are not strongly correlated, the returns from them can be separated through correlation of the return or reflected signals. Other transmission schemes, however, may be employed here, such as using codes to distinguish simultaneous returns. In either case, the sonar device 355 may broadcast the sound waves at any suitable rate and intensity. In particular, the rate at which the sound waves are generated may be periodic, whether at regular or irregular (or both) intervals, or it may be set based on the detection of a predetermined event, such as a certain environmental condition. An example of such an environmental condition may be the detection of an object 105 moving above a certain speed in a monitoring area 110, where an increased transmission rate may be warranted. Similarly, the intensity of the transmitted sound waves may be based on a predetermined event, like a particular time of day or night or in response to poor readings from the generated sound frames.

In the reflected returns, the time at which a pulse (such as a chirp) was reflected, and hence, the distance at which it was reflected, may be determined. As a result, an array that includes the number of beams and the distance values (23×512) may be realized, where the values are larger for stronger return signals from a given direction and distance. Such stronger return signals, in comparison to the established background (or sonar clutter), may be referred to as significant positive deviations.

The array 350 of sound transducers 305 may also assist in passively tracking an object 105 or otherwise determining a particular direction of the object 105 based on the receipt of these sounds. As such, the array 350 of sound transducers 305 is not necessarily limited to merely serving as a receptacle for reflected ultrasonic waves from a sonar device. For example, the sound transducers 305 may detect sound emitted by an object 105 (or a machine operated or controlled by the object 105) from a certain direction in the monitoring area 110, which may be used to help determine the position of the object 105 or to direct other sensors to focus in that direction. These emitted sounds may be passive, meaning the object 105 that caused their emission is not cognizant of the ability of the array 350 to capture them. Such emitted sounds may also be active, where the object 105 that caused their emission is aware that the sounds may be used to help passively track the object 105. As an example, the passive and active emitted sounds may be speech from a human or machine.

The sonar device 355 is not limited to this particular structure or any of the specific values recited above. For example, a larger or smaller number of sound transducers 305 may be part of the array 350, and the number of beam directions may be correspondingly modified. Returns may also be received for shorter or longer distances, and the sound transmitters 360 may also use different broadcast schemes to generate the returns.

The ToF sensor 310 can be configured to emit modulated light in the monitoring area 110 or some other location and to receive reflections of the modulated light off an object 105, which may be within the monitoring area 110 or other location. The ToF sensor 310 can convert the received reflections into electrical signals for processing. As part of this step, the ToF sensor 310 can generate one or more frames of positioning frames or modulated-light frames in which the data of such frames is associated with the reflections of modulated light off the objects 105. This data may also be associated with light from sources other than those that emit modulated-light and/or from sources other than those that are part of the ToF sensor 310. If the ToF sensor 310 is configured with a filter to block out wavelengths of light that are outside the frequency (or frequencies) of its emitted modulated light, the light from these other sources may be within such frequencies. As an example, the ToF sensor 310 can include one or more modulated-light sources 345 and one or more imaging sensors 370, and the phase shift between the illumination and the received reflections can be translated into positional data. As an example, the light emitted from the ToF sensor 310 may have a wavelength that is outside the range for visible light, including infrared (such as near-infrared) light.

The thermal sensor 315 can detect thermal radiation emitted from any number of objects 105 in the monitoring area 110 or some other location and can generate one or more thermal or temperatures frames that include data associated with the thermal radiation from the objects 105. The objects 105 from which the thermal radiation is emitted can be from living beings or from machines, like portable heaters, engines, motors, lights, or other devices that give off heat and/or light. As another example, sunlight (or other light) that enters the monitoring area 110 (or other location) may also be an object 105, as the thermal sensor 315 can detect thermal radiation from this condition or from its interaction with a physical object 105 (like a floor). As an example, the thermal sensor 315 may detect thermal radiation in the medium-wavelength-infrared (MWIR) and/or long-wavelength-infrared (LWIR) bands.

The main processor 320 can oversee the operation of the passive-tracking system 115 and can coordinate processes between all or any number of the components (including the different sensors) of the system 115. Any suitable architecture or design may be used for the main processor 320. For example, the main processor 320 may be implemented with one or more general-purpose and/or one or more special-purpose processors, either of which may include single-core or multi-core architectures. Examples of suitable processors include microprocessors, microcontrollers, digital signal processors (DSP), and other circuitry that can execute software or cause it to be executed (or any combination of the foregoing). Further examples of suitable processors include, but are not limited to, a central processing unit (CPU), an array processor, a vector processor, a field-programmable gate array (FPGA), a programmable logic array (PLA), an application specific integrated circuit (ASIC), and programmable logic circuitry. The main processor 320 can include at least one hardware circuit (e.g., an integrated circuit) configured to carry out instructions contained in program code.

In arrangements in which there is a plurality of main processors 320, such processors 320 can work independently from each other or one or more processors 320 can work in combination with each other. In one or more arrangements, the main processor 320 can be a main processor of some other device, of which the passive-tracking system 115 may or may not be a part. This description about processors may apply to any other processor that may be part of any system or component described herein, including any of the individual sensors or other components of the passive-tracking system 115.

The pressure sensor 325 can detect pressure variations or disturbances in virtually any type of medium, such as air or liquid. As an example, the pressure sensor 325 can be an air pressure sensor that can detect changes in air pressure in the monitored area 110 (or some other location), which may be indicative of an object 105 entering or otherwise being in the monitored area 110 (or other location). For example, if a human passes through an opening (or portal) to a monitored area 110, a pressure disturbance in the air of the monitored area 110 is detected by the pressure sensor 325, which can then lead to some other component taking a particular action. Examples of this event will be presented below.

The pressure sensor 325 may be part of the passive-tracking system 115, or it may be integrated with another device, which may or may not be positioned within the monitoring area 110. For example, the pressure sensor 325 may be a switch that generates a signal when a door or window that provides ingress/egress to the monitoring area 110 is opened, either partially or completely. Moreover, the pressure sensor 325 may be configured to detect other disturbances, like changes in an electro-magnetic field or the interruption of a beam of light (i.e., visible or non-visible). As an option, no matter what event may trigger a response in the pressure sensor 325, a minimum threshold may be set (and adjusted) to provide a balance between ignoring minor variations that would most likely not be reflective of an object 105 that warrants passive tracking entering the monitoring area 110 (or other location) and processing disturbances that most likely would be. In addition to acting as a trigger for other sensors or components of the passive-tracking system 115, the pressure sensor 325 may also generate one or more pressure frames, which can include data based on, for example, pressure variations caused by or originating from an object 105.

The light-detection circuit 330 can detect an amount of light in the monitoring area 110 (or other location), and this light may be from any number and type of sources, such as natural light, permanent or portable lighting fixtures, portable computing devices, flashlights, fires (including from controlled or uncontrolled burning), or headlights. Based on the amount of light detected by the light-detection circuit 330, one or more of the other devices of the passive-tracking system 115 may be activated or deactivated, examples of which will be provided later. Like the pressure sensor 325, the light-detection circuit 330 can be a part of the passive-tracking system 115 or some other device. In addition, minimum and maximum thresholds may be set (and adjusted) for the light-detection circuit 330 for determining which lighting conditions may result in one or more different actions occurring.

The communication circuits 335 can permit the passive-tracking system 115 to exchange data with other passive-tracking systems 115, the hubs 205 (see FIG. 2), or any other device, system, or network. To support various type of communication, including those governed by certain protocols or standards, the passive-tracking system 115 can include any number and kind of communication circuits 335. For example, communication circuits 335 that support wired or wireless (or both) communications may be used here, including for both local- and wide-area communications. Examples of protocols or standards under which the communications circuits 335 may operate include Bluetooth, Near Field Communication, and Wi-Fi, although virtually any other specification for governing communications between or among devices and networks may govern the communications of the passive-tracking system 115. Although the communication circuits 335 may support bi-directional exchanges between the system 115 and other devices, one or more (or even all) of such circuits 335 may be designed to only support unidirectional communications, such as only receiving or only transmitting signals.

The circuit-based memory elements 340 can be include any number of units and type of memory for storing data. As an example, a circuit-based memory element 340 may store instructions and other programs to enable any of the components, devices, sensors, and systems of the passive-tracking system 115 to perform their functions. As an example, a circuit-based memory element 340 can include volatile and/or non-volatile memory. Examples of suitable data stores here include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. A circuit-based memory element 340 can be part of the main processor 320 or can be communicatively connected to the main processor 320 (and any other suitable devices) for use thereby. In addition, any of the various sensors and other parts of the passive-tracking system 115 may include one or more circuit-based memory elements 340.

The passive-tracking system 115 is not necessarily limited to the foregoing design, as it may not necessarily include each of the previously listed components. Moreover, the passive-tracking system 115 may include components beyond those described above. For example, instead of or in addition to the sonar device 355, the system 115 can include a radar array, such as a frequency-modulated, continuous-wave (FMCW) system, that emits a sequence of continuous (non-pulsed) signals at different frequencies, which can be linearly spaced through the relevant spectrum. The results, which include the amplitude and phase of the reflected waves, may be passed through a Fourier transform to recover, for example, spatial information of an object 105. One example of such spatial information is a distance of the object 105 from the array. In some FMCW systems, the distances wrap or otherwise repeat—a discrete input to a Fourier transform produces a periodic output signal—and a tradeoff may be necessary between the maximum range and the number of frequencies used.

Some or all of the various components of the passive-tracking system 115 may be oriented in a particular direction. These orientations may be fixed, although they may also be adjusted if necessary. As part of the operation of the passive-tracking system 115, some of the outputs of the different components of the system 115 may be compared or mapped against those of one or more other components of the system 115. Examples of these processes will be presented below. In any event, to accommodate such an arrangement, the orientations of one or more components of the passive-tracking system 115 may be set so that they overlap one another.

A particular sensor of the passive-tracking system 115 may have a field-of-view (FoV), which may define the boundaries of an area that are within a range of operation for that sensor. As an example, the visible-light sensor 300, depending on its structure and orientation, may be able to capture image data of every part of a monitoring area 110 or only portions of the area 110. The FoV for one or more of the other components of the passive-tracking system 115 may be substantially aligned with the FoV of the visible-light sensor 300. For example, the FoV for the array 350 of sound transducers 305, ToF sensor 310, thermal sensor 315, and pressure sensor 325 may be effectively matched to that of the visible-light sensor 300. As part of this arrangement, the FoV for one particular component of the passive-tracking system 115 may be more expansive or narrower in comparison to that of another component of the passive-tracking system 115, although at least some part of their FoVs may be aligned. This alignment process can enable data from one or more of the sensors of the passive-tracking system 115 to be compared and merged or otherwise correlated with data from one or more other sensors of the system 115. Some benefits to this arrangement include the possibility of using a common coordinate or positional system among different sensors and confirmation of certain readings or other data from a particular sensor.

If desired, the orientation of the passive-tracking system 115 (as a whole) may be adjusted, either locally or remotely, and may be moved continuously or periodically according to one or more intervals. In addition, the orientations of one or more of the sensors (or other components) of the passive-tracking system 115 may be adjusted or moved in a similar fashion, either individually (or independently) or synchronously with other sensors or components. Any changes in orientation may be done while maintaining the alignments of one or more of the FoVs, or the alignments may be dropped or altered. Optionally, the system 115 or any component thereof may include one or more accelerometers 365, which can determine the positioning or orientation of the system 115 overall or any particular sensor or component that is part of the system 115. The accelerometer 365 may provide, for example, attitude information with respect to the system 115.

An example of the operation of a passive-tracking system will now be presented. As part of this explanation, reference will be made to FIGS. 1-3 and FIGS. 4(A-C)-9, which will be introduced below. In this example, the passive-tracking system 115 of FIG. 3 may be used to describe this operation, although other embodiments of a passive-tracking system that can function in accordance with some or all these principles presented here will be presented later.

As presented as an earlier example, a passive-tracking system 115 may be assigned to a monitoring area 110 (or some other location), which may be a room 120 that has walls 125, an entrance 130, a ceiling 135, and windows 140 (see FIG. 1). Any number of objects 105 may be in the room 120 at any particular time, such as the human 150, the portable heater 155, and the shadow 160. For this initial illustration, sunlight may be entering the room 120 through the windows 140, although other scenarios will be discussed in which no sunlight is entering the room 120 or as sunlight moves across the room 120 over time. In addition, at the start of this discussion, one may assume that the human 150 and the shadow 160 of the human are not present in the room 120, although the heater 155 is.

As noted above, many of the sensors of the passive-tracking system 115 may generate one or more frames, which may include data associated with, for example, the monitoring area 110, in this case, the room 120. For example, the visible-light sensor 300 may generate at any particular rate one or more visible-light frames that include visible-light data associated with the room 120. As part of this process, visible light that is reflected off one or more objects 105 of the room 120, like the walls 125, entrance 130, ceiling 135, windows 140, and heater 155, can be captured by the visible-light sensor 300 and processed into the data of the visible-light frames. In addition, as pointed out earlier, the visible light that is captured by the visible-light sensor 300 may be emitted from an object 105, and this light may affect the content of the visible-light frames.

In one arrangement, one or more of these visible-light frames may be set as visible-light reference frames, to which other visible-light frames may be compared. For example, in an initial phase of operation, the visible-light sensor 300 may capture images of the room 120 and can generate the visible-light frames, which may contain data about the layout of the room 120 and certain objects 105 in the room 120 that are present during this initial phase. Some of the objects 105 may be permanent fixtures of the room 120, such as the walls 125, entrance 130, ceiling 135, windows 140, and heater 155 (if the heater 155 is left in the room 120 for an extended period of time). As such, these initial visible-light frames can be set as visible-light reference frames and can be stored in, for example, the circuit-based memory element 340 or some other database for later retrieval. Because these objects 105 may be considered permanent or recognized fixtures of the room 120, as an option, a decision can be made that passively tracking such objects 105 is unnecessary or not helpful. Other objects 105, not just permanent or recognized fixtures of the room 120, may also be ignored for purposes of passively tracking.

As such, because these insignificant objects 105 may not be passively tracked, they can be used to narrow the focus of the passive-tracking process. For example, assume one or more visible-light reference frames include data associated with one or more objects 105 that are not to be passively tracked. When the visible-light sensor 300 generates a current visible-light frame and forwards it to the main processor 320, the main processor 320 may retrieve the visible-light reference frame and compare it to the current visible-light frame. As part of this comparison, the main processor 320 can ignore the objects 105 in the current frame that are substantially the same size and are in substantially the same position as the objects 105 of the reference frame. The main processor 320 can then focus on new or unidentified objects 105 in the current visible-light frame that do not appear as part of the visible-light reference frame, and they may be suitable candidates for passive tracking. Additional information on this analysis will be provided below.

As alluded to earlier, the data of the visible-light reference frame may be associated with any number and type of objects 105 that may be suitable for ignoring or masking (including all of them) for purposes of passive tracking. Even so, some objects 105 that are part of a visible-light reference frame may be suitable for passive tracking, meaning they may not necessarily be automatically ignored as a result of the comparison with the current visible-light frame. Moreover, the visible-light reference frame may be tracked to account for changes in the room 120, such as the appearance of a new object 105 that may be a permanent fixture for the room 120 or variations in the amount of visible light in the room 120. By tracking, the data of the current visible-light reference frame may be updated or simply replaced by a new visible-light reference frame. This tracking process may occur at any suitable time, including in accordance with one or more time intervals or based on certain conditions.

As an example of being based on a certain condition, if a new object 105 is positioned in the room 120, such as a piece of furniture, the new object 105 may become part of the visible-light reference frame, meaning that it eventually may be ruled out for purposes of passive tracking. In this example, the main processor 320, after several comparisons with no change in the size or position of the new object 105, may update or replace the visible-light reference frame to account for the new object 105. In accordance with the earlier explanation, the main processor 320, when it compares the current visible-light frame with the new visible-light reference frame, may ignore the new object 105 for purposes of passive tracking. An example of tracking the visible-light reference frame in accordance with a time interval may include updating the current visible-light reference frame or replacing it with a new reference frame at a predetermined time, such as when minimal activity may be expected in the monitoring area 110.

In one embodiment, multiple visible-light reference frames may be generated and stored for later retrieval, and these multiple reference frames may correspond to different time periods or events. For example, a visible-light reference frame may be generated for every fifteen-minute interval for a twenty-four hour period. As will be explained below, different lighting conditions may affect the process of passive tracking objects 105. One example includes the amount of sunlight entering the room 120, which may change over the course of a day. As such, multiple visible-light reference frames that correspond to certain times of the day may be generated and stored, and these reference frames can enable the main processor 320 to account for different amounts and patterns of sunlight in the room 120 during the passive tracking of an object 120. The multiple visible-light reference frames may also be tracked, which can enable the passive-tracking system 115 to account for variations over time, such as seasonal shifts in sunlight.

As another example, a visible-light reference frame may be generated to account for a predetermined condition that may result in an object 105 that occasionally appears in the room 120 but whose appearance is expected. Such conditions may be referred to as visible-light events. As a specific example, a container that holds recyclable items may be positioned in the room 120 each day at roughly the same time in anticipation of being emptied by some service and then later returned to its original location. Because the size of the container may remain the same and it may be in the same location (for emptying) at approximately the same time each day, a visible-light reference frame may be generated to account for this expected event. As such, when this particular visible-light reference frame is compared to the current visible-light frame, whose data may include the container as an object 105, the main processor 320 can ignore the (container) object 105 for purposes of passive tracking with respect to the current visible-light frame. Visible-light reference frames that are based on predetermined conditions may also be tracked to account for changes in the events that precipitated their creation. For example, the service schedule for the container may change, meaning that it may not be present in the room 120 at the expected time. Tracking the reference frames can enable the passive-tracking system 115 to account for this change.

In addition to the examples presented above, any number of visible-light reference frames may be generated for many other visible-light events or scenarios. Other examples that may serve as the basis for creating and tracking one or more visible-light reference frames include the following: changes in the layout of the room 120 that occur according to a schedule (including shutting the entrance 130 or windows 140 at a closing time associated with a business operating in the room 120); predetermined variations in the illumination of man-made lighting sources (like automated dimming of lights at a certain time); or activation of certain machines (such as an automated vacuum unit). No matter the number of visible-light reference frames and the scenarios that lead to their creation, the main processor 320 may maintain a schedule that indicates which particular reference frame is best suited for comparison to a current visible-light frame.

In another arrangement, the main processor 320 may simply compare the current visible-light frame to multiple visible-light reference frames without regard to a schedule that may identify a reference frame that is expected to be the best candidate for the comparison. In particular, the main processor 320 may, following the step of comparing the current visible-light frame to the plurality of visible-light reference frames, select a reference frame that has the lowest mismatch in terms of objects 105 that make up the data of both the visible-light frame and the selected reference frame. The selected visible-light reference frame may then be the reference frame that serves as the baseline for the comparison.

As an option, a reference frame, such as a visible-light reference frame, may be a composite average of several reference frames. This feature may smooth out variations in the data that makes up the several reference frames, which may reflect a more accurate standard for the monitoring area 110. Any number of reference frames may be averaged to create a composite-average reference frame. Such a number, however, may be capped to account for significant changes in the monitoring area 110 over time, including, for example, the introduction of natural light in the area 110. In another embodiment, different types of reference frames may be merged together and averaged in accordance with the description here. For example, one or more visible-light frames may be merged with one or more thermal frames to form one or more visible-light-thermal-merged reference frames. Additional information on merging will be presented below. As another example, the visible-light-thermal-merged reference frames may be averaged to create one or more composite-average-visible-light-thermal-merged reference frames. These examples may also apply to any other type of frames or reference frames that are created by the passive-tracking system 115.

The principles and examples described above may also apply to some of the other components of the passive-tracking system 115. For example, one or more sound transducers 305 may receive sound waves that are reflected off (or emitted from) an object 105 and can generate one or more sound frames comprised of data based on the received sound. One or more of these sound frames may be designated as sound reference frames, which may be compared to current sound frames for purposes of increasing the efficiency of the process of passively tracking an object 105. Like the visible-light reference frames, in one arrangement, the sound reference frames may be created based on intervals of time or certain sound events, with the comparison being performed based on the applicability of such time or sound events. A few examples of sound events include alterations to the monitoring area 110, such as the room 120, or the scheduled positioning of an object 105, like the recycling container described above. Such changes may affect the return of the sound waves, and the passive-tracking sensor 115 may take them into account for purposes of generating sound reference frames. In addition, the main processor 320 may simply select a sound reference frame based on the lowest amount of object 105 mismatch with the current sound frame.

As previously noted, each sound transducer 305 may generate sound frames, or the data comprising them can be combined to create one or more aggregate sound frames. In the case of the former, sound reference frames may be created for each of the individual sound transducers 305 (or beam directions); in the case of the latter, sound reference frames may be created from the aggregate sound frames. These concepts may also apply to the other sensors of the passive-tracking system 115 if the system 115 includes more than one of a particular sensor. For example, if the passive-tracking system 115 includes two visible-light sensors 300, visible-light reference frames may be separately created for both visible-light sensors 300 or generated as an aggregate visible-light reference frame.

One or more positioning or modulated-light reference frames may also be produced in relation to the operation of the ToF sensor 310, and one or more thermal or temperature reference frames may be generated in connection with the thermal sensor 315. Similarly, one or more pressure reference frames may be created and stored on behalf of the pressure sensor 325. The concepts and illustrations described with respect to reference frames of the visible-light sensor 300 and the sound transducer 305 may also apply to the ToF sensor 310, thermal sensor 315, and pressure sensor 325. That is, these reference frames may be used to filter current positioning or modulated-light frames, temperature or thermal frames, or pressure frames generated (respectively) by the ToF sensor 310, thermal sensor 315, and pressure sensor 325 during the comparisons for improved passive tracking. Also, as an option, one or more reference frames associated with the ToF sensor 310, thermal sensor 315, or pressure sensor 325 may correspond to different time periods or events, or a reference frame may be selected based on the lowest mismatch of objects 105 in comparison to the current frame.

As an example, any number of thermal reference frames may account for the effects of thermal radiation from sunlight in a monitoring area 110 during a certain time of day, such as if the sunlight increases the temperature of an object 105. As another example, any number of reference frames may be configured to account for one or more thermal events, such as a furnace in a monitoring area 110 that activates and emits thermal radiation. Although the activation of the furnace may not necessarily be based on a set schedule, some thermal reference frames may include the furnace in a deactivated state as a pre-existing object 105, and other thermal reference frames may include the furnace in an activated state as a pre-existing or recognized object 105. In either case, the comparisons with the current thermal frames may result in the furnace being ignored for purposes of passive tracking.

As an option, different thermal references frames may include the furnace in an activated state as an object 105 based on various temperatures that the furnace may reach. For example, a first thermal reference frame may include the furnace in an activated state at a first temperature as on object 105, and a second thermal reference frame may include it as an object 105 at a second temperature. Thus, reference frames may be created in accordance with a predetermined resolution range if an object 105 may undergo various state changes, and the reference frames are intended to account for such changes.

In one example, separate modulated-light reference frames may correspond to certain times of the day such that variations in natural light and their effect on pre-existing or recognized objects 105. In another example, different modulated-light reference frames may correspond to one or more modulated-light events, such as the expected appearance and subsequent disappearance of an object 105 in the monitored area 110. Examples of such scenarios with respect to pressure reference frames include the scheduled activation of an air conditioner or some other device that may disturb air flow in the monitored area 110 or the anticipated (and repeated) opening of a door for the monitored area 110. Of course, there are many other circumstances that may warrant the creation of one or more corresponding reference frames for any sensor or other component of the passive-tracking system 115.

In one arrangement, the passive-tracking system 115 may receive input from one or more other systems to reduce the scope of comparing current frames with reference frames. For example, a programmable thermostat may be communicatively coupled to the passive-tracking system 115 (or a network 200 to which the system 115 is assigned), and the thermostat may signal (directly or indirectly) the system 115 when the heating or cooling unit controlled by the thermostat is activated. As another example, the thermostat may communicate to the system 115 its heating or cooling schedule, temperature settings, and other information. If the system 115 is aware of the state of a device or system that may affect which reference frame is most relevant for a particular location, the system 115 may narrow its comparison to those reference frames that are most relevant or correspond to that state. In the example above, the reference frames that may be selected for comparison may be those that include as a pre-existing or recognized object 105 the heating or cooling unit in an activated state at the temperature that at least substantially coincides with the information received from the thermostat.

No matter the type of reference frame, they are not limited to being generated during an initial phase of operation. That is, reference frames can be generated and/or tracked ay any suitable time, based on the description above or other factors. This flexibility in the creation of reference frames can enable the passive-tracking system 115 to account for virtually any changes in the monitored area 110 or other relevant area. Further, the reference frames that are created may be shared between or among the passive-tracking system 115 and other devices or networks, such as another passive-tracking system 115 or the hub 205. As an example, this concept can allow other passive-tracking systems 115 to be aware of modifications to the monitoring area 110 or enable the hub 205 to perform the comparisons of the reference frames with the current frames on behalf of a passive-tracking system 115.

In one arrangement, the passive-tracking system 115 may be configured to perform tracking of a reference frame (any type) during one or more low-novelty periods, with respect to a predetermined threshold for the monitoring area 110 (or some other area). For example, over the course of some amount of time, the main processor 320, based on the input it receives from the sensors of the passive-tracking system 115, may determine that there are no novel or unidentified objects 105 in the monitoring area 110. As a specific example, the visible-light frames or the thermal frames may include data that indicates any activity in the monitoring area 110 is not beyond or substantially beyond that which has been previously detected for the relevant time frame. This lack of activity may confirm that no objects 105 currently in the monitoring area 110 are worthy of passive tracking. As such, in this example, any of these visible-light frames or thermal frames may be used to update or replace any corresponding (and currently existing) visible-light or thermal reference frames.

As part of the analysis, a predetermined activity threshold for the monitoring area 110 for the various sensors of the passive-tracking system 115 may be implemented. Values above the predetermined activity threshold may be a sign of a new object 105 in the monitored area 110, meaning that the current frame from the appropriate sensor may have data associated with a new object 105. Conversely, values below the threshold may indicate that no new objects 105 are present. In one embodiment, the values may be integer numbers or percentage changes. For example, assume the value for exceeding the predetermined activity threshold is one novel or unidentified object 105 in the monitoring area 110. If the current thermal frames indicate that one or more new objects 105 have appeared in the monitoring area 110, the value (at least one new object 105) is exceeded, and the current thermal frames may not be appropriate candidates to update or replace existing thermal reference frames.

As another example, assume the value for exceeding the predetermined threshold is a percentage increase in the overall average temperature of an existing object 105 in the monitoring area 110. If the current thermal frames show that the average temperature of a known object 105 has risen above the percentage value, such frames might not serve as reference frames. In contrast, if the values described above are below the predetermined thresholds, the current thermal frames may be the basis for tracking existing thermal reference frames.

In another embodiment, a variation that is directionally based may be compared against a predetermined threshold. For example, the thermal frames may indicate a slight to moderate change in temperature in a particular direction of some part of the monitoring area 110. The main processor 320 may compare this data with one or more predetermined thresholds. If below such thresholds, the main processor 320 may attribute these variations to, for example, sunlight entering and moving across that part of the area 110. As such, these changes, while novel in comparison to the data from previous reference frames, may be ignored and the thermal frames may be suitable candidates for replacing or updating existing thermal reference frames. These threshold concepts may apply to any of the other sensors of the passive-tracking system 115. For example, the visible-light frames or modulated-light frames may reveal gradual changes in the brightness of the monitored area 110, which may also be indicative of sunlight entering and moving across the area 110. Variations other than sunlight, including those produced from man-made devices or other natural sources, may be taken into account when setting the predetermined thresholds. Predetermined activity thresholds may apply to other variations, such as motion (or lack thereof) of an object 105.

Tracking reference frames, as explained above, may be performed on a per-frame basis. In such as case, if the data of a current frame as a whole includes variations above the predetermined threshold or that are excessive in comparison to a previous frame, that frame may not be a suitable candidate for replacing or updating a reference frame. This tracking process, however, is not limited to a per-frame basis. For example, the frames generated by the sensors may be comprised of a plurality of discrete elements, and the tracking of reference frames may be conducted on a per-element basis. (Examples of such discrete elements will be provided below.) In this example, some of the discrete elements of the current frame may be used to replace or update corresponding discrete elements of a reference frame, if the variations in the discrete elements of the current frame are below the predetermined threshold. This concept may hold true even if the variations of other discrete elements of the current frame are above the predetermined threshold. The discrete elements of the current frame with variations above the predetermined threshold or that are excessive in comparison to corresponding discrete elements of a previous frame may be ignored for purposes of tracking the reference frame.

To differentiate between parts of a frame that may be suitable for tracking from those that are not, boundaries may be placed around the discrete elements that are unsuitable candidates for tracking. These boundaries may be placed around the relevant perimeters of the unsuitable discrete elements or a differentiating boundary may be formed by relying on a given radius extending from any one of the unsuitable discrete elements. Other structures or features of a current frame may be used to distinguish the portions of the current frame that are suitable for tracking from those that are not. Moreover, if an entire or a portion of a current frame is determined to be unsuitable for tracking a reference frame, a plurality of successive (current) frames (or portions of such frames) may be excluded from updating or replacing the reference frame. This feature assumes that the variations of the current frame that prevent tracking of the reference frame are likely to be present in a number of successive (current) frames and that they can be conveniently ignored. The analysis of the current frames for determining whether they are suitable for tracking a reference frame may be resumed after a suitable period of time or number of successive frames. Additional detail on the comparison of data from reference frames to data from current frames will be presented below.

In some cases, the generation of reference frames may not be needed for all sensors that are part of the passive-tracking system 115. In particular, some sensors may simply provide data that is useful for the process of comparing frames from another sensor with the other sensor's reference frame. For example, as will be shown below, the ToF sensor 310 may provide a depth distance for an object 105 that has been captured as part of a visible-light frame for the visible-light sensor 300. The main processor 320 may compare the visible-light frame containing the object 105 with a visible-light reference frame to determine whether it is a novel object 105. If it is novel, the main processor 320 may simply use the data from the modulated-light frame from the ToF sensor 310 to determine the depth distance for the novel object 105. In this example, comparing modulated-light frames with modulated-light reference frames may not be necessary. Whether reference frames are to be created for a particular sensor may depend on several factors, including the type (or number) of sensors that are part of the passive-tracking sensor 115.

As previously noted, as part of passively tracking objects 105, the main processor 320 receives and analyzes frames from one or more of the sensors of the passive-tracking system 115. As also mentioned above, part of this analysis includes the main processor 320 comparing the data of the frames to one or more corresponding reference frames. In one embodiment, following the comparison, some of the data of the frames from the different sensors may be merged for additional analysis. Several examples of this process will be presented. In this description, the passive-tracking system 115 may include each of the sensors shown in FIG. 3, although alternative embodiments and examples will be shown.

For this illustration, assume the passive-tracking system 115 is assigned to a monitoring area 110, which at least includes the room 120 having three separate objects 105: a human 150, a portable heater 155, and a shadow 160 of the human 150 (see FIG. 1). Continuing with this example, the heater 155 is generating heat and is a pre-existing or recognized object 105 and is part of the data associated with one or more reference frames. Additionally, sunlight is entering the room 120 and is causing the shadow 160, and the human 150 has just entered the room 120 by passing through a door. As such, for purposes of this example, the human 150 and the shadow 160 may be considered new (or novel) objects 105.

Initially, the pressure sensor 325 may detect a disturbance in the air of the room 120 caused by the human 150 opening or passing through the door. The pressure sensor 325, whether it is remote to or part of the passive-tracking system 115, may provide an indication of the disturbance to the main processor 320. This indication may simply be a signal that some disturbance has been detected in the room 120 or may be comprised of one or more pressure frames containing data about the disturbance (or both). Because this disturbance may be indicative of a novel object 105 entering the room 120, the main processor 320 may signal one or more sensors, causing them to take some action. For example, some of the sensors may leave a sleep state and enter an active mode, while others may already be in an active mode but may begin generating frames in response to the signal. Some of the sensors may also continuously generate frames and may not necessarily be affected by the detection of the disturbance.

If the pressure sensor 325 provides pressure frames, the main processor 320 may compare, for example, pressure waveforms from the pressure frames with pressure waveforms that are part of one or more pressure reference frames. The pressure waveforms of the pressure reference frames may correspond to minor or expected pressure disturbances that are not related to a new object 105. Examples of minor or expected pressure disturbances include air flow from a ceiling fan or an air-conditioning vent. Deviations in the pressure waveforms from the pressure frames in comparison to the reference pressure waveforms may be a sign that a new object 105 has entered the room 120. These deviations may be required to exceed a predetermined threshold before the main processor 320 determines that they correspond to a novel object 105. If so, the main processor 320 may signal some of the sensors in accordance with the example above. While a pressure sensor 325 may be useful in some cases, the passive-tracking system 115 may passively track objects 105 without one being available.

If the passive-tracking system 115 includes a light-detection sensor 330, the sensor 330 may provide to the main processor 320 data that is indicative of the amount of light in the room 120. Because natural light is entering the room 120 in this example, the main processor 320 may determine that the level of light needed to operate one or more sensors, such as the visible-light sensor 300, is sufficient. Further, the level of light in the room 120 may be high enough to interfere with the effective operation of the ToF 310, as the ToF 310 relies on capturing reflections of modulated light. In the case of a high amount of light, the main processor 320 may cause the visible-light sensor 300 to become active and the ToF 310 to deactivate (such as sleep). Conversely, if the amount of light is low, the main processor 320 may signal the visible-light sensor 300 to deactivate and the ToF 310 to activate. To be sure, however, both the visible-light sensor 300 and the ToF 310 may operate simultaneously in many different environments subjected to various lighting conditions. In one embodiment, the visible-light sensor 300 may be configured to receive and process light that is outside the range of visible-light, including IR (such as near-IR light). As such, the light emitted from the ToF sensor 310, if it is IR light, may be used to help illuminate the monitoring area 110 for the visible-light sensor 300.

As an option, the measured lighting conditions of the room 120 may be compared to one or more predetermined lighting thresholds, such as a high-lighting threshold and a low-lighting threshold. Based on the comparisons, the main processor 320 may determine which action(s) to take. Lighting conditions that fall within the range between the high- and low-lighting thresholds may allow for simultaneous operation of some sensors, like the visible-light sensor 300 and the ToF sensor 310. Like the pressure sensor 325, the passive-tracking sensor 115 may passively track objects 105 without a light-detection sensor 330 being available. In this arrangement, readings from a sensor that are negatively affected by a lighting condition may be ignored, adjusted to compensate for such an effect, or replaced (or supplemented) by the operation of some other sensor. For example, if the amount of light in the room 120 causes the measured readings to exceed the high-lighting threshold, a depth distance provided by the ToF sensor 310 may be provided by the sonar device 315, which may not be affected by the increased level of light. Depending on lighting conditions in a monitoring area 110, other settings or operations may be adjusted. For example, if the amount of light in the room 120 drops below a certain threshold, the visible-light sensor 300 may increase its exposure time.

If the visible-light sensor 300 is operational, it can generate one or more visible-light frames that at least include data about visible light reflected off the objects 105 in the room 120. The visible-light frames may also include data about light emitted from an object 105 in the room 120, if such an event occurs. These visible-light frames, which may be referred to as current visible-light frames, may be transmitted to the main processor 320. As an example, the data of the current visible-light frames may include Bayer-matrix pixels, and the main processor 320, through the use of a Debayer filter (not shown), can convert the raw image data of the frame into an RGB image. The Debayer filter may be implemented as software or hardware (or a combination of both) in the main processor 320 or the visible-light sensor 300 (or a combination of both). In one embodiment, the coloring information for the RGB image may be discarded, which can convert the pixels into greyscale. As an option, the coloring information may be kept for the RGB image, which may be helpful for extracting features of the image.

At this point, the main processor 320 may identify discontinuities in the brightness of the current image or (if coloring information is retained) the color of the image. This identification may be facilitated by edge detection. As an example, the image may be converted into a number of discrete elements, such as blocks, like a matrix of 16×16 square blocks, and (depending on the resolution) the blocks may be comprised of a certain number of pixels. For each of the blocks, a set of integer numbers, or edge coefficients, that describe how intense the edge content (or "edginess") is in a pixel for a given orientation of an edge can be calculated. That is, an edge coefficient may describe how much activity exists in its corresponding direction of the pixel. As an example, a vector of 16 edge coefficients, ranging from a value of 0 to 16, may be generated for each block, one for each of the edge directions for the block. For example, a block of an image that contains no edges would produce edge coefficients with a value of 0. As another example, a high-contrast vertical edge may result in an edge coefficient of ten for that particular direction. Of course, matrices of other sizes may be employed as part of the edge detection.

In the case of a 16×16 pixel block, which is equal to 256 pixels overall, the use of 16 edge coefficients can reduce the amount of data to be processed by a factor of 16, which can improve performance. This process can also reduce the sensitivity of the visible-light sensor 300 to changes in lighting conditions of the monitoring area 110. Sensitivity to slow-motion movement may also be reduced because slight changes in the position of an object 105 results in the edges basically staying in the same block, which means such motion is likely to contribute to the same intensity for edge content for that block. In addition, successive current-visible-light frames may have their edge coefficients determined in a similar manner, and, consequently, edge coefficients may be generated for visible-light reference frames.

As another option, the main processor 320 may incorporate a blur step to reduce the sensitivity to motion of an object 105 captured by the visible-light sensor 300. In particular, for the edge coefficients of the blocks of a reference frame, the main processor 320 can mix the values of edge coefficients from these blocks with neighboring blocks of the reference frame, which can result in an averaging the edge coefficients of the pixels. In other words, this technique works by spreading the edge coefficients of a block in a reference frame to that block's neighboring blocks. For example, in a reference frame, if one of the neighboring blocks, as a result of the blur step, includes a 22.5 degree edge, and a corresponding block of a current frame contains a similar edge, the reaction to the change can be less sensitive than it otherwise would be. As an option, as part of this process, a minimum-maximum range for the coefficients of a particular block may be created (or averaged), and the upper-end and lower-end values (or bounds) of the range may be determined by the content of the block and its neighbors in the reference frame.

As noted above, the main processor 320 can compare current frames with reference frames to detect new objects 105 in the current frames. As an example, once the edge coefficients for the blocks of the current visible-light frame are generated, the differences between them and the edge coefficients of the corresponding blocks of the visible-light reference frame may be determined. For each block of the current frame, the absolute values of all the differences between its edge coefficients and those of its corresponding block of the visible-light reference frame can then added together. This sum can produce a novelty factor for each of the blocks of the current visible-light frame. Because the comparisons are based on such differences, the novelty factor for each block is a value that may be indicative of whether some phenomenon has been captured by the data of the block that was not present in the corresponding block of the reference frame. For example, a low novelty factor may indicate that the data of the block of the current frame is similar to that of the block of the reference frame, meaning no significant change may have occurred in this particular portion of the current frame with respect to the same portion of the reference frame. Conversely, a high novelty factor for the block of the current frame may illustrate that a substantial or not insignificant change may have taken place with respect to that block.

In the above example, if a minimum-maximum range for the coefficients is employed, for the blocks of the current frame, the absolute values of the differences between the coefficients of the blocks in the current frame and the bounds of the ranges of the corresponding blocks of the reference frame are determined. The minimum bound of the range is used if a particular coefficient of a block of a current frame is below the minimum bound, and the maximum bound is used if the coefficient of the current frame is above the maximum bound. These differences may be summed, similar to the example above. If the coefficient of the block of the current frame is within the bounds of the range, a value of zero is used for purposes of the summation of the differences.

A novelty threshold may also be implemented here in which only those novelty factors that meet or exceed the novelty threshold may be considered indications of change in relation to the blocks of the reference frame. Blocks with novelty factors below the novelty threshold (i.e., low novelty factor) may be essentially ignored in terms of detecting new objects 105 in the monitoring area 110. A novelty factor that is below the novelty threshold, however, may still represent some change in the data between a block and its corresponding reference block. As an example, a change in a lighting condition, such as the amount of natural light reaching an object 105 or a different portion of an object 105 captured by the visible-light sensor 300, may lead to minor or otherwise insignificant variations in the novelty factor for one or more blocks of the current frame in relation to the corresponding blocks of the reference frame. While this change in lighting may not cause the detection of a new object 105 in the current visible-light frame, the data from the current frame may be used to track the visible-light reference frame, in accordance with the description above. For example, the current frame may replace the reference frame, or certain blocks or pixels of the current frame may replace or otherwise be used to update corresponding blocks or pixels in the reference frame. That is, updates may occur at the block or pixel level for any type of reference frame.

This process may be repeated as successive current frames are received. This way, for example, gradual changes in lighting conditions of the monitoring area 110 may be incorporated into one or more visible-light reference frames. Of course, other conditions that may not result in a high novelty factor may be used to track the reference frames. Examples of such conditions include the movement of a window shade or curtain from a slight breeze or the gradual increase in size of a puddle resulting from a slow leak.

In one embodiment, blocks of the current frame with novelty factors above the novelty threshold (i.e., high novelty factor) may be associated with the detection of a new object 105 in the monitoring area 110. The main processor 320 can identify the blocks with the high novelty factors, and, as will be explained below, additional steps may be taken with respect to these blocks. As additional current visible-light frames are received, the blocks of the successive frames with high novelty factors may also be identified. Because the blocks of the successive current frames are compared to the corresponding blocks of the reference frame, the new object 105 may be detected if it is either moving or stationary, even for extended periods of time, following its initial detection.

In some cases, the data from the blocks with high novelty factors may also be used to track the visible-light reference frames, at least as part of an initial step for incorporating new objects 105 into the reference frames. For example, assume a new object 105 that is stationary, such as a piece of furniture, is placed in the monitoring area 110. The blocks of the current frames that correlate to the new object 105 should have high novelty factors because the new object 105 is not part of any reference frame. As will be explained later, the new object 105 may be ruled out as a human or some other living thing suitable for passive tracking. Over the course of some amount of time, given the stationary (and non-living) nature of the new object 105, one or more reference frames may be updated to incorporate the new object 105 into them. For future current frames, the block-by-block comparison with the updated reference frames should produce low novelty factors for the relevant blocks of the current frames, thereby effectively converting the previously new object 105 into something that can be ignored for purposes of passive tracking (i.e., a pre-existing or recognized object).

As noted earlier, the passive-tracking system 115 may be capable of creating, storing, and tracking multiple reference frames. In the case of the visible-light sensor 300, for example, changes in a monitoring area 110, whether they result in high or low novelty factors, may be used to track any number of these reference frames. As an example, modifications associated with low novelty factors or thresholds, such as gradual changes in the amount of natural light, may be used to track visible-light reference frames based on the time of day associated with the visible-light reference frames. In addition, a time delay may be introduced into the mechanism of tracking reference frames with changes in the monitoring area 110. For example, assume a new object 105 that is stationary is positioned in the monitoring area 110 for a very short period of time before being quickly removed from the area 110. In this case, the introduction of a predetermined delay may prevent the unnecessary incorporation of the object 105 into one or more reference frames. If no delay is introduced, however, the temporarily placed object 105 may no longer be part of subsequent current visible-light frames, meaning that it may eventually be erased from the reference frame(s).

No matter the technique used to track the reference frames, an averaging process may be used. For example, the main processor 320 may average or otherwise smooth out the data from a series of current frames for purposes of using it to update or replace the data of one or more reference frames. This step can improve the overall accuracy of the passive-tracking system 115 by making it less sensitive to changes in the monitoring area 110. In another embodiment, an averaging technique may be applied to the current frames. For example, the data associated with multiple current visible-light frames may be averaged prior to comparing it with the data of the visible-light reference frame(s). By averaging current frames, the main processor 320 may lower the effects of noise in the current frames.

In one arrangement, a motion analysis may be performed on corresponding blocks between the incoming visible-light frames. For example, by relying on motion vectors, the main processor 320 may estimate how far and in which direction a block for a current visible-light frame moved in comparison to the corresponding block for a previous visible-light frame. This process can be expanded to groups of blocks such that a distance and direction of motion can be determined for such groups. As an option, if the resolution of the visible-light sensor 300 is too low, the main processor 320 may simply track whole objects 105 between visible-light frames with no motion-vector-based hints. In addition to averaging, a minimum-maximum range (of the blocks of the previous visible-light frames) may be employed as part of the comparison analysis.

No matter how a motion analysis is conducted, it may be helpful in several ways. For example, a group of blocks that moves in a certain direction and speed may be distinguished from a second group of blocks that remain stationary or move in a different direction or speed. As another example of a benefit, if the main processor 320 determines that a particular group of blocks moved together based on the motion analysis and that this group is substantially proportional to the size or shape of a human, the main processor 320 may increase a confidence factor that relates to whether an object 105 associated with the block motion is human. A confidence factor may be a value or some other parameter that may provide, for example, an indication as to the likelihood that returned data or a determination or finding is accurate. As an example, a confidence factor may be an indication as to the estimated accuracy of a determination that an object 105 or some portion of an object 105 is a target or is part of a target that is intended for passive tracking. While a confidence factor may be assigned to whole objects 105 in relation to some determination, confidence factors may also be applied to blocks and pixels on an individual basis or groups of blocks or pixels on a group basis. For example, a confidence factor may be applied to an estimated posture or positioning of a human object 105 based on the arrangement of the group of blocks that correspond to the human object 105. In the cases of being applied at the block or pixel level, summations of confidence factors may be performed to provide macro-level confidence factors.

Knowing the motion limits of an item that has been selected for passive tracking may assist in distinguishing the movement of an object 105 from the sudden appearance of a new object 105. For example, if humans are the intended targets for passive tracking, the passive-tracking system 115 may be programmed with limits on human motion, such as the maximum distance a human could move over a period of time, like the time between visible-light frames. Assume the main processor 320 detects a group of blocks in a current visible-light frame in a position that is different from that of another group of blocks in a previous visible-light frame. If the speed necessary for the group of blocks in the previous frame to move to the new position in the current frame is beyond the maximum that a human could achieve, the blocks from the current frame may be treated as being related to a new object 105. If, however, the speed is equal to or below the maximum, the main processor 320 may consider it in the overall process of determining whether the object 105 is human, such as by increasing a confidence factor related to the visible-light data. As such, a predetermined motion threshold may be applied to any number of groups of blocks, and hence, their respective objects 105, to help the passive-tracking system 115 to distinguish objects 105 from one another and identify what they are.

Motion analysis of current visible-light frames may also be useful to help distinguish between objects 105 in a monitoring area 110. For example, detecting the movement of an object 105 may be a suitable indication that the object 105 is not an object 105 that forms part of a background of the monitoring area 110. For an object 105 determined to be a pre-existing or recognized object 105 under the process of comparing a current visible-light frame to a visible-light reference frame, this motion-analysis finding may offer additional confirmation that such object 105 does not warrant passive tracking.

Other techniques may be implemented as part of the analysis of data from visible-light frames to assist in identifying whether an object 105 is a particular subject, such as a human or some other living being. For example, the visible-light frames may undergo image processing for purposes of detecting and identifying features that are typically associated with a human (or some other living thing). Such features may be referred to as human-recognition features. Examples of human recognition features include faces or other body parts, like noses, ears, eyes, arms, and legs. Through this feature extraction, if one or more human-recognition features related to an object 105 are identified from the visible-light frames, the main processor 320 may assign a high confidence factor or increase an existing confidence factor as an indication that the object 105 is likely human. Additional information on this concept will be presented later.

Similar to the visible-light sensor 300, the thermal sensor 315 may generate one or more temperature or thermal frames that at least include data about IR emitted from the objects 105 in a monitoring area 110, such as the room 120 (see FIG. 1). These thermal frames, which may be referred to as current thermal frames, may be transmitted to the main processor 320. As an example, the thermal frames effectively provide a data stream that contains temperature averages for the pixels of the thermal sensor 315. In one particular example, the thermal sensor 315, through the thermal frames, may provide a 32×32 array of temperatures, or a temperature for each pixel of the sensor 315. Of course, the thermal sensor 315 may be configured with different resolutions, such as a 48×48 array, and is not limited to any specific arrangement. As an example, the thermal sensors 315 (or possibly, some of the other sensors of the passive-tracking system 115) may be configured with rectangular arrays or non-rectangular arrays (or both). The generation rate of the thermal frames may also be adjustable, such as by decreasing the number generated per unit of time to increase the amount of averaging done for the temperatures. The main processor 320 may, based on the data from the current thermal frames, conduct one or more thermal analyses, which can be used to help determine whether an object 105 is human.

Because the thermal frames provide temperatures averages throughout the monitoring area 110, the data from these frames may be useful for identifying detected objects 105 as potentially human or some other living being. Likewise, this data may be helpful in ruling out objects 105 as being a certain organism. For example, a certain range of average temperatures may be selected as a suitable indicator of the presence of a particular subject, such as a human. Any range of average temperatures used for this purpose may be adjusted to account for certain factors, such as the location or setting of the monitoring area 110 or the failure of a cooling system in the area 110. For example, if the monitoring area 110 is a gym that enables humans to exercise, the range of average temperatures that would normally be used for potentially identifying humans in the area 110 may be increased to account for higher temperatures of such humans. A range of average temperatures is not necessarily the only parameter that can be useful for identifying a certain subject in the monitoring area 110. For example, depending on the item being passively tracked, exact temperatures may be selected to assist in their detection.

No matter the selected parameters, the average temperatures associated with a particular object 105 may be designated with any number of confidence factors. For example, if a range of average temperatures is selected for purposes of potentially detecting a human presence in the monitoring area 110, average temperatures associated with the object 105 (from the thermal frames) that fall within the selected range may cause the assignment of a high confidence factor. The high confidence factor may indicate that the object 105 is (or is at least likely) a human. Conversely, average temperatures associated with an object 105 that are above or below this range may be given low confidence factors, which may indicate that the object 105 is not (or is at least likely not) a human. As previously noted, confidence factors may also be assigned at the block or pixel level.

As will be shown below, the results from other processes may be combined with the readings from the thermal sensor 315 to confirm (or rule out) the presence of a particular subject in the monitoring area 110, or at least to set or adjust any relevant confidence factors. For example, a non-human object 105 that emits IR may be in the monitoring area 110, and the thermal frames may reveal that this object 105 has an average temperature that is roughly equivalent to that of a human. Examples of such an object 105 may be a window pane that is heated by direct sunlight or a heater or stovetop burner that has been switched off and is currently cooling. In such a case, the non-human object 105 may be given a high confidence factor because its average temperature is close to that of a human. Even so, additional analyses, like determining the size of the object 105, can rule it out as human, and the object 105 may be ignored for purposes of passive tracking. Moreover, the main processor 320 can be configured to override high confidence factors associated with the data from the thermal frames by replacing them with low confidence factors if this particular circumstance repeats itself over time. For example, if the object 105 is the window pane mentioned above, the initial high confidence factor may be subsequently adjusted, particularly for a certain time of the day or year, such as when the amount of sunlight affects the data of the thermal frames the most.

In some cases, a first object 105 and a second object 105 in close proximity to one another may affect the accuracy of the thermal sensor 315. For example, assume the first object 105 is a human, the second object 105 is a fireplace with a fire currently burning in it, and the human is standing directly in front of the fireplace. Here, the temperature readings that would normally be associated singularly with the human may be integrated with those of the fireplace. As such, the human temperatures may be erroneously considered as part of a background or otherwise part of the fireplace temperatures, and the first object 105 (human) may be mistakenly combined with the second object 105 (fireplace) for the thermal analysis. Because the overall average temperatures of the fireplace may be much higher than the typical range for a human, a low confidence factor may be incorrectly assigned to this combination of first and second objects 105.

As will be shown later, concerning the example above, later processes may detect the existence of two separate objects 105 and determine that one of them is at least likely to be a human. As such, a second set of high confidence factors related to these other processes may overcome the erroneous low confidence factors that originate from the thermal analysis. If this event repeats itself over some amount of time, the main processor 320 may be configured to ignore or otherwise deemphasize the data from the thermal frames for the affected location(s) of the monitoring area 110. In another arrangement, the main processor 320 may automatically adjust the incorrect thermal confidence factors to compensate for the unreliable thermal data.

Confidence factors may be based on measurements of data contained within a current frame or a set of current frames, like average temperatures or the extraction of human features. Confidence factors may also be based on comparisons of the data of a current frame with some other frame, like a subsequent or previous current frame or a reference frame. Examples include confidence factors generated from a motion analysis. In another arrangement, the length of time that a particular object 105 has been detected in successive current frames may also affect the assignment of confidence factors, such as those annotated to an entire object 105. For example, an object 105 that has been detected in the monitoring area 110 over the course of a short succession of current frames may result in an initial lower confidence factor for that object. If the object 105 continues to be detected in successive current frames, however, the confidence factor for the object 105 may increase (such as proportionally) in relation to the amount of time it is detected. The principles of confidence factors described herein may apply to the analysis of data from any type of sensor of the passive-tracking system 115.

As noted above and similar to the visible-light reference frames, the main processor 320 may also store and track any number of thermal reference frames, which can be used to filter out pre-existing or recognized sources of thermal radiation in the monitoring area 110. For example, the portable heater 155 in the room 120 (see FIG. 1) may generate significant amounts of heat, which may be detected via the incoming thermal frames. The average temperatures associated with this object 105 may be significantly above the range selected for the potential identification of, for example, a human. Eventually, the data associated with the portable heater 155 may be integrated into one or more thermal reference frames, which can allow the heater 155 to be ignored for purposes of passive tracking.

Like the visible-light frames, blocks of the current thermal frames may be compared to corresponding blocks of the reference frame(s). Instead of relying on edge detection, however, this comparison may rely on average-temperature differences between the blocks. In one arrangement, a predetermined temperature difference may be used to establish novelty factors for the blocks of the current thermal frames. For example, blocks of the current thermal frames that reflect an average-temperature difference that is less than or equal to the predetermined temperature difference may be assigned a low novelty factor. This comparison may indicate that the object 105 responsible for the average temperatures of the blocks of the current frames has been incorporated into the thermal reference frame(s). In contrast, blocks of the current thermal frames that are associated with an average-temperature difference greater than this predetermined difference may be given a high novelty factor. A high novelty factor for a particular block may be a sign of a new object 105 that is not part of the thermal reference frame(s). Thus, the comparison of current thermal frames with thermal reference frames may be helpful in detecting new objects 105 and screening out previously existing objects 105.

The techniques used to track visible-light reference frames may also be applicable to thermal reference frames. In particular, objects 105 that are responsible for either low or high novelty factors may be used to update or replace the data of the thermal reference frames. An example of an object 105 that may be associated with high novelty factors for this purpose is the portable heater 155. Depending on how ordered the activation of the heater 155 is, only some of several reference frames may take the heater 155 into account. An example of an object 105 related to low novelty factors is sunlight entering the monitoring area 110. A certain number of thermal reference frames may be tracked with gradual changes in the intensity and coverage of sunlight in the monitoring area 110. In addition, because sunlight is transitional, only a portion of all the thermal reference frames may be tracked with this data. An averaging process may also be used to track the temperature reference frames. As an option, this averaging technique may be applied to the thermal frames (i.e., inter-frame comparison) to reduce the effects from noise in them.

In one arrangement, the ToF sensor 310, as noted earlier, can be configured to emit modulated light in the monitoring area 110 and to receive reflections of the modulated light off an object 105. The ToF sensor 310 may generate one or more modulated-light frames or positioning frames that at least include data about the modulated-light reflections from the objects 105 in the monitoring area 110. These modulated-light frames, which may be referred to as current modulated-light frames, may be transmitted to the main processor 320. As an example, the modulated-light frames provide a data stream that contains positional information about the objects 105, particularly the depth of such objects 105. For example, the data of the modulated-light frames may include phase-amplitude images. These phase-amplitude images may be obtained by applying a synchronous demodulation technique to modulated light reflected off the objects 105, resulting in two or more coefficients for each element (or pixel) of the ToF sensor 310. These coefficients can be acquired simultaneously or sequentially, over one or more frames. The values of the coefficients can be converted to quadrature coordinates, which may be positive or negative and may respectively represent the proportion of the signal returning in-phase to the modulated light emitted by the ToF sensor 310 and the proportion of the signal returning with a 90 degree phase shift to the emitted modulated light. Regardless of the scheme used to obtain the quadrature coordinates, a Cartesian-to-polar-coordinate conversion may result in a phase-amplitude representation. The phase-amplitude representation may separate the intensity of the reflections (as amplitude) from the temporal delay the reflections experienced (as phase). The temporal delay can be further taken to represent the distance of the object 105 from the ToF sensor 310.

In some cases, the ToF sensor 310 is more suitable for assisting other components of the passive-tracking system 115 by identifying the boundaries and depth of the objects 105 in a monitoring area 110, as opposed to detecting such objects 105 and providing full positional data about them. For example, in a passive-tracking system 115 that includes a visible-light sensor 300 and a thermal sensor 315, such as that shown in FIG. 3, the ToF sensor 310 may be configured to focus on boundary and depth identification. In other embodiments, particularly those in which visible-light sensors 300 are absent, the ToF sensor 310 may be configured to detect objects 105 and determine positional data of these objects 105. In the case of the latter, a ToF sensor 310 with a higher resolution may be incorporated into the passive-tracking system 115. This principle may also apply to a passive-tracking system 115 that includes a visible-light sensor 300, and the visible-light sensor 300 is malfunctioning or is otherwise producing unreliable images (such as in a low-light condition).

In the arrangement where the ToF sensor 310 is primarily intended to identify boundaries and depths of objects 105, the passive-tracking system 115 may avoid the creation and storage of modulated-light reference frames for purposes of comparing them with the modulated-light frames. In addition, the system 115 may avoid comparing modulated-light frames among each other as part of an analysis of the movement of an object 105. Nevertheless, these procedures may still be undertaken if the ToF sensor 310 is used just for boundary and depth identification, as they may supplement the determinations of the other sensors of the passive-tracking system 115 or may be used to calibrate or otherwise adjust them.

In cases where the ToF sensor 310 is configured to provide full positional data, beyond depth and boundary detection of an object 105, the passive-tracking system 115 may generate and store any suitable number of modulated-light reference frames (or positional reference frames). As with other reference frames discussed above, the current modulated-light frames may be compared against any number of modulated-light reference frames for purposes of detecting new objects 105 and filtering out pre-existing or recognized objects 105.

In one arrangement, the visible-light sensor 300 may assist in improving the operation of the ToF sensor 310. As noted earlier, the visible-light sensor 300 may not have an IR filter, which can permit it to receive and process IR signals, including those emitted by the ToF sensor 310. In such a case, features (like edges) of objects 105 in the monitoring area 110 may be recognizable in the amplitude image of the ToF sensor 310 and the corresponding image of the visible-light sensor 300. This scenario may be particularly true if the images were taken at the same time such that both the visible-light sensor 300 and the ToF sensor 310 receive the same reflections from the modulated-light emitted by the ToF sensor 310. If the visible-light sensor 300 and the ToF sensor 310 are located in different portions of the passive-tracking system 115, this concept can enable the use of stereovision techniques to provide depth estimates. These depth estimates may help remove erroneous data provided by the ToF sensor 310.

If modulated-light reference frames are employed, they may be created, stored, and tracked, similar to the processes described earlier. The modulated-light reference frames may also be created based on predetermined conditions, like modulated-light events. For example, certain times of day may cause increased noise levels with respect to the readings from the ToF sensor 310, and some of the reference frames may account for this circumstance. Moreover, the modulated-light reference frames may be composite averages, and different thresholds, such as high- and low-novelty thresholds, may be used during the comparisons to help filter out pre-existing or recognized objects 105 and to track the reference frames.

Also, if the ToF sensor 310 is used for detecting objects 105, if desired, a motion analysis can be performed on current modulated-light frames to determine the amount of motion and direction of an object 105. This analysis may involve tracking the object 105 between successive current modulated-light frames. If the resolution of the ToF sensor 310 is not high enough, the entirety of the object 105 may be tracked between the frames. If, however, the resolution is high enough, motion-vector-based hints may be used to reduce the amount of processing required for the analysis. In either arrangement, in accordance with earlier examples, a predetermined motion threshold may be applied to the objects 105 (or groups of blocks that may make up the objects 105) to help distinguish objects 105 from one another. The current modulated-light frames may also undergo image processing to identify human-recognition features, if the resolution of the ToF sensor 310 is high enough and/or if the object 105 is within a certain distance of the ToF sensor 310. If so, the main processor 320 may assign a high confidence factor or increase an existing confidence factor as an indication that the object 105 is likely human.

Accordingly, the ToF sensor 310 may act as a versatile sensor of the passive-tracking system 115. Additional embodiments will be presented below in which the ToF sensor 310 provides positional data beyond just depth of an object 105. For now, however, the immediate discussion here will focus on the ToF sensor 310 operating to identify the boundaries and depth of objects 105 in a monitored area 110. Before turning to this topic, a brief introduction to the concepts of field-of-view (FoV) and three-dimensional (3D) positioning with respect to the passive-tracking system 115 will be presented.

Figure 4A:
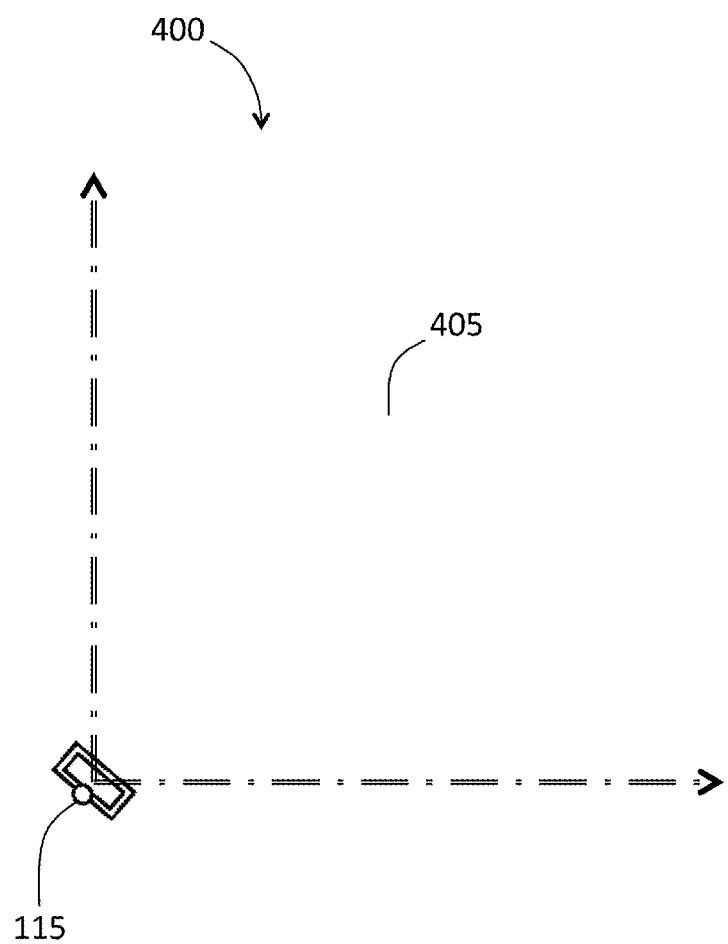
FIG. 4A illustrates an example of a passive-tracking system with a field-of-view.

Referring to FIG. 4A, an example of the passive-tracking system 115 in a monitoring area 110 with a FoV 400 is shown. In one arrangement, the FoV 400 is the range of operation of a sensor of the passive-tracking system 115. For example, the visible-light sensor 300 may have a FoV 400 in which objects 105 or portions of the objects 105 within the area 405 of the FoV 400 may be detected and processed by the visible-light sensor 300. In addition, the ToF sensor 310 and the thermal sensor 315 may each have a FoV 400. In one arrangement, the FoVs 400 for these different sensors may be effectively merged, meaning that the coverage areas for these FoVs 400 may be roughly the same. As such, the merged FoVs 400 may be considered an aggregate or common FoV 400. Of course, such a feature may not be necessary, but by relying on a common FoV 400, the data from any of the various sensors of the passive-tracking system 115 may be easily correlated with or otherwise mapped against that of any of the other sensors. As an example, the coverage area of each (individual) FoV 400 may have a shape that is comparable to a pyramid or a cone, with the apex at the relevant sensor. To ensure substantial overlapping of the individual FoVs 400 for purposes of realizing the common FoV 400, the sensors of the passive-tracking system 115 may be positioned close to one another and may be set with similar orientations. As another example, the range of the horizontal component of each (individual) FoV 400 may be approximately 90 degrees, and the common FoV 400 may have a similar horizontal range as a result of the overlapping of the individual FoVs 400. This configuration may provide for full coverage of at least a portion of a monitoring area 110 if the passive-tracking system 115 is positioned in a corner of the area 110. The FoV 400 (common or individual), however, may incorporate other suitable settings or even may be adjusted, depending on, for instance, the configurations of the monitoring area 110.

Figure 4B:
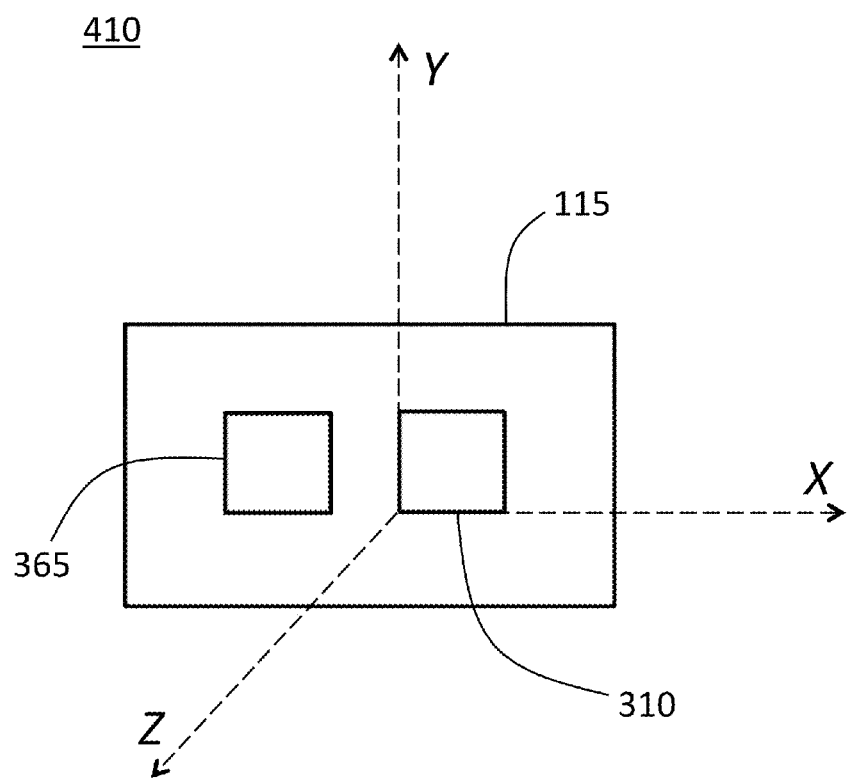
FIG. 4B illustrates an example of a coordinate system with respect to a passive-tracking system.

Referring to FIG. 4B, a positional or coordinate system 410 may be defined for the passive-tracking system 115. In one arrangement, the X axis and the Y axis may be defined by the ToF sensor 310, and the Z axis may be based on a direction pointing out the front of the ToF sensor 310 in which the direction is orthogonal to the X and Y axes. In this example, the ToF sensor 310 may be considered a reference sensor. Other sensors of the system 115 or various combinations of such sensors (like the visible-light sensor 300 and the ToF sensor 310) may act as the reference sensor(s) for purposes of defining the X, Y, and Z axes. To achieve consistency in the positional data that originates from the coordinate system 410, the sensors of the system 115 may be pointed or oriented in a direction that is at least substantially similar to that of the reference sensor. In one arrangement, each of the sensors that provide positional data related to one or more objects may initially generate such data in accordance with a spherical coordinate system (not shown), which may include values for azimuth, elevation, and depth distance. Note that not all sensors may be able to provide all three spherical values. The sensors (or possibly the main processor 320 or some other device) may then convert the spherical values to Cartesian coordinates based on the X, Y, and Z axes of the coordinate system 410. This X, Y, and Z positional data may be associated with one or more objects 105 in the monitoring area 110.

In certain circumstances, the orientation of the passive-tracking system 115 may change. For example, the initial X, Y, and Z axes of the system 115 may be defined when the system 115 is placed on a flat surface. If the positioning of the system 115 shifts, however, adjustments to the coordinate system 410 may be necessary. For example, if the system 115 is secured to a higher location in a monitoring area 110, the system 115 may be aimed downward, thereby affecting its pitch. The roll and yaw of the system 115 may also be affected. As will be explained below, the accelerometer 365 may assist in making adjustments to the coordinate system 410.

Figure 4C:
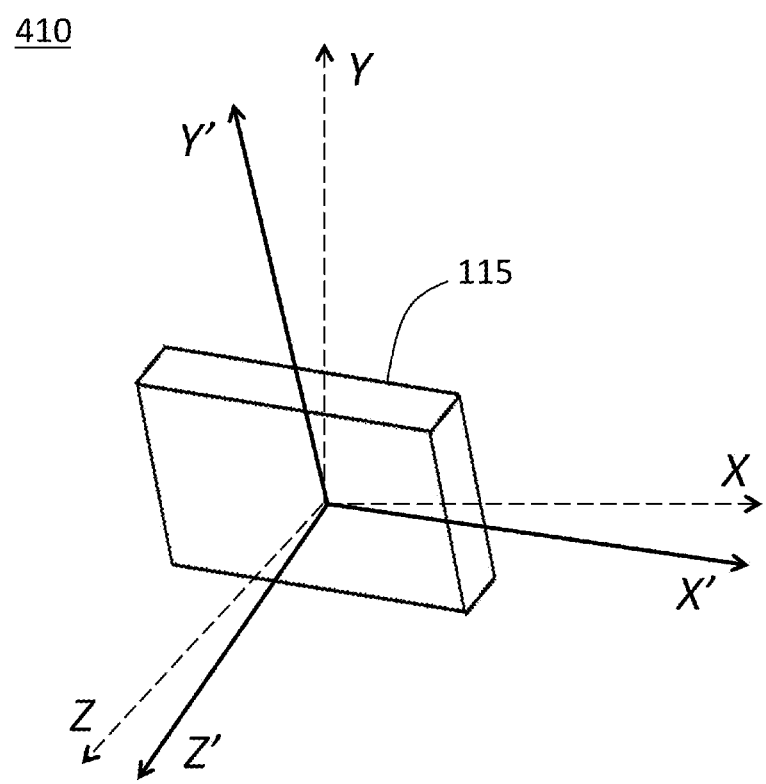
FIG. 4C illustrates an example of an adjusted coordinate system with respect to a passive-tracking system.

Referring to FIG. 4C, the passive-tracking system 115 is shown in which at least the pitch and roll of the system 115 have been affected. The yaw of the system 115 may have also been affected. In one arrangement, however, the change in yaw may be assumed to be negligible. The initial X, Y, and Z axes are now labeled as X', Y', and Z' (each in solid lines), and they indicate the shift in the position of the system 115. In one embodiment, the system 115 can define adjusted X, Y, and Z axes, which are labeled as X, Y, and Z (each with dashed lines), and the adjusted axes may be aligned with the initial X, Y, and Z axes of the coordinate system 410.

To define the adjusted X, Y, and Z axes, first assume the adjusted Y axis is a vertical axis passing through the center of the initial X, Y, and Z axes. The accelerometer 365 may provide information (related to gravity) that can be used to define the adjusted Y axis. The remaining adjusted X and Z axes may be assumed to be at right angles to the (defined) adjusted Y axis. In addition, an imaginary plane may pass through the adjusted Y axis and the initial Z axis, and a horizontal axis (with respect to the adjusted Y axis) that lies on this plane may be determined to be the adjusted Z axis. The adjusted X axis is found by identifying the only axis that is orthogonal to both the adjusted Y axis and the adjusted Z axis. One skilled in the art will appreciate that there are other ways to define the adjusted axes.

Once the adjusted X, Y, and Z axes are defined, the initial X, Y, and Z coordinates may be converted into adjusted X, Y, and Z coordinates. That is, if a sensor or some other device produces X, Y, and Z coordinates that are based on the initial X, Y, and Z axes, the system 115 can adjust these initial coordinates to account for the change in the position of the system 115. When referring to (1) a three-dimensional position, (2) X, Y, and Z positional data, (3) X, Y, and Z positions, or (4) X, Y, and Z coordinates, such as in relation to one or more objects 105 being passively tracked, these terms may be defined by the initial X, Y, and Z axes or the adjusted X, Y, and Z axes of the coordinate system 410 (or even both). Moreover, positional data related to an object 105 is not necessarily limited to Cartesian coordinates, as other coordinate systems may be employed, such as a spherical coordinate system. No matter whether initial or adjusted positional data is acquired by a passive-tracking system 115, the system 115 may share such data with other devices. As an example, if another device, like a security camera, is positioned near or adjacent to the system 115, such as on a common boom, and the security camera is substantially aligned with the system 115, the system 115 may share the initial coordinates with the security camera. Doing so can enable either of the system 115 or the security camera to quickly focus on or otherwise highlight an object 105.

In accordance with the description above, current frames from the components or sensors of the passive-tracking system 115 may include various positional data, such as different combinations of data associated with the X, Y, and Z positions, related to one or more objects 105. For example, the visible-light sensor 300 and the thermal sensor 310 may provide data related to the X and Y positions of an object 105, and the data from the ToF sensor 310 may relate to the X, Y, and Z positions of the object 105. As noted above, the ToF sensor 310 may be focused on supplying depth and boundary identification for the objects 105. In such a case, the data about the Z positions provided by the ToF sensor 310 may receive significant attention, and the data associated with the X and Y positions from the ToF sensor 310 may either be ignored, filtered out, or used for some other ancillary purpose (like tuning or confirming measurements from another sensor). As another example, a sonar device 355 (see FIG. 3) may be useful for determining or confirming X and Z positions of an object 105, and an array 350 of sound transducers 305 (see FIG. 3), configured to detect sounds, such as human speech, may help determine or confirm an X position. The array 350 may be one-dimensional in this context, although it may be configured to determine or confirm X and Z positional data.

The positional data provided by one component of the passive-tracking system 115 may be more accurate in comparison to that of another component of the system 115. As such, the system 115 may be configured to support components with higher resolutions, which can improve undesirable discrepancies among the accuracies of the components of the system 115. In addition, the coordinate system 410 is not the only coordinate system that may be employed here, as any other suitable arrangement may be relied on to help determine the positioning of the objects 105 for purposes of passively tracking them.

Consider the example where the ToF sensor 310 is used primarily for identifying the boundaries and depth of one or more objects 105 in a monitoring area 110. In such an example, the visible-light sensor 300 and the thermal sensor 315 may be generating (respectively) current visible-light and thermal frames. As explained earlier, following the comparison with the relevant visible-light reference frames, the main processor 320 may identify blocks associated with the current visible-light frames that have high novelty factors. In one arrangement, the main processor 320 may map the depth data from the current modulated-light frames generated by the ToF sensor 310 against the high-novelty blocks from the current visible-light frames. As such, the main processor 320 may determine the depth of the pixels that make up these high-novelty blocks. Because the visible-light sensor 300 and the ToF sensor 310 may be focused on roughly the same space (from the common FoV 400), the main processor 320 may acquire 3D positioning data related to the high-novelty blocks. Specifically, the X and Y positions of an object 105 may be obtained from the data of the visible-light sensor 300, and the Z position of the object 105 may be acquired from the data of the ToF sensor 310.

A similar process may be undertaken for the blocks from the thermal sensor 315. In particular, the main processor 320 may overlay the depth information from the ToF sensor 310 on the current thermal frames, focusing on the high-novelty blocks of these frames. The pixels of the high-novelty blocks, accordingly, may receive a depth measurement. If the thermal sensor 315 is substantially aligned with the ToF sensor 310, the main processor 320 may acquire 3D positioning information of the high-novelty blocks of the thermal frames (i.e., X and Y positions from the thermal sensor 315 data and Z position from the ToF sensor 310 data).

The positioning data from these particular sensors may be compared with the output of additional components of the passive-tracking system 115. Examples of this features will be provided below. As such, even though 3D positional information may be obtained from the combination of the visible-light sensor 300, the thermal sensor 315, and the ToF sensor 310, other steps may be executed, using other sensors or components, to improve the accuracy of these initial readings.

In one embodiment, the depth information from the ToF sensor 310 may be correlated only with the high-novelty blocks of the current visible-light and thermal frames. That is, following the comparison with the appropriate reference frames, the main processor 320 may ignore or otherwise filter out low-novelty blocks for purposes of correlating depth data. In another example, the depth correlation may only be conducted on high-novelty blocks that have a high enough confidence factor, which may (at least partially) originate from motion analyses of the blocks, the identification of human features in them (or groups of them), or determinations of whether their average temperatures fall within a certain range (or any combination thereof). Nevertheless, as another option, the depth data from the ToF sensor 310 may be correlated against both high and low novelty blocks of the objects 105, including those associated with either high or low confidence factors.

As part of the depth correlation, the main processor 320 may, for example, cross reference the depth data from the current modulated-light frames generated by the ToF sensor 310 with the edge-detection data of the current visible-light frames created by the visible-light sensor 300. This step can enable the main processor 320 to identify depth boundaries of blocks or groups of blocks, whether they are high- or low-novelty blocks. As an example, the ability to detect depth boundaries can help distinguish different groups of blocks from one another. As an option, a depth threshold may be used to help establish the depth boundaries. For example, if the depth estimates of a first group of blocks exceed a certain value in comparison to the depth estimates of a second group of blocks, then one or more depth boundaries may be established to effectively delineate the different groups of blocks. If the depth estimates do not exceed the depth threshold, other factors (like motion, human facial features, or temperatures) can be used to help establish depth boundaries. For example, motion vectors may be determined at the block level, and differences (or similarities) in the speed or direction between blocks may help in determining depth boundaries. As another example, temperatures may be generated on a per-block basis, and differences (or similarities) in this parameter may also assist with depth boundaries. These other factors may also confirm depth boundaries that have been set by the comparison with the depth threshold and can be used to set or adjust any relevant confidence factors. The differences or similarities in depth estimates between groups of blocks may also play a role in setting or adjusting confidence factors. For example, substantial differences in depth estimates may result in a higher confidence factor that is related to a determination that two groups of blocks are associated with different objects 105.

If the correlation of the depth data is limited to high novelty blocks, the blocks of the current visible-light frames and the current thermal frames may be subjected to a segmentation pass, which may be similar to a flood-fill operation. For example, the main processor 320 may identify a block that is the most novel block in the current visible-light frame (compared to the other blocks in the current visible-light frame). The most novel block may refer to a block that has the highest novelty factor out of all the blocks in the current visible-light frame. Subsequently, the main processor 320 may identify other high novelty blocks that are adjacent to (or substantially adjacent to) the most novel block. As an example, up to a one block gap may exist between high novelty blocks and/or the most novel block to qualify them as being adjacent to one another. This one block gap may be occupied by a low novelty block. As an option, confidence factors for a particular block or pixels of the block may be considered when identifying the most novel block or adjacent high novelty blocks. The most novel block and the identified adjacent high-novelty blocks may be associated with an object 105 in the monitoring area 110.

Once the high novelty blocks are identified and no other adjacent high-novelty blocks are found, the main processor 320 may flag or mark the most novel block and the identified high-novelty blocks. The marking may associate the most novel block and the adjacent high-novelty blocks as being part of a particular grouping. In some situations, the high-novelty blocks of a first object 105 may appear to be adjacent to the high-novelty blocks of a second object 105, which may occur if the first object 105 is positioned in front of the second object 105 (with respect to the passive-tracking system 115). The depth boundaries associated with the blocks of the first object 105 and/or the blocks of the second object 105, however, may prevent the (adjacent) high-novelty blocks of the second object 105 from being associated with those of the first object 105. As such, the (adjacent) high-novelty blocks of the second object 105 may not be marked as part of a grouping of the first object 105. The high-novelty blocks of the first object 105, however, may continue to be grouped in accordance with the description herein.

The main processor 320 may repeat this procedure by again identifying the most novel block remaining in the current visible-light frame that has not yet been marked and the high-novelty blocks adjacent to this remaining novel block that have also not been previously marked. This most novel block and its adjacent high-novelty blocks, which may be associated with the same or another (different) object 105 in the monitoring area 110, may then be marked. This marking process may be repeated until the main processor 320 can no longer identify blocks in the current frame that have sufficient novelty in them, such as if the only unmarked blocks remaining are low-novelty blocks.

In one embodiment, the main processor 320 may discard groups of marked high-novelty blocks that fail to meet a certain size threshold. For example, groups of blocks that contain less than a particular number of discrete high-novelty blocks (such as less than five or ten blocks total) may be filtered out. These small groups of blocks may be attributed to, for example, noise or objects 105 that are too small to be human and may be ruled out as a suitable subject for passive tracking. The size threshold may be a tunable parameter or may otherwise take into account factors that may affect its accuracy. For example, the size threshold for groups of blocks may be increased or decreased depending on the depth distance of the blocks. In this case, a first group of blocks that has an average depth measurement that is greater than that for a second group of blocks may be compared against a smaller size threshold for filtering purposes. This adjustment may account for an object 105 occupying a smaller number of blocks as the distance between the object 105 and the passive-tracking system 115 increases.

This segmentation pass may be conducted for the current thermal frames or other current frames generated by any other sensor or component of the passive-tracking system 115, such as the ToF sensor 310. The concept of filtering out smaller groups of blocks may also apply to these other sensors and components.

In one example, following the segmentation pass, the main processor 320 may apply a non-linear merging function to the marked groups of blocks associated with the current visible-light frame and the marked groups of blocks related to the current thermal frame. This step can identify commonalities in the novelties of different groups of blocks (different groups of blocks having high-novelty factors) and can create a merged data structure (or segmented object) that may represent a possible human object 105 or other desired target in the monitoring area 110. This merged data structure may be an example of a novelty representation of the object 105. In another embodiment, data from other sensors of the passive-tracking system 115 and other processing steps may assist in merging groups of blocks. For example, if two different groups of blocks have similar depth values and move substantially in the same direction and speed, such groups of blocks may be merged. In this example, the depth data may be provided by the ToF sensor 310 and/or the sonar device 355.

As noted above, the main processor 320 may separately map the depth data against the current visible-light frames and the current thermal frames. In some cases, however, the merging function may be applied to the current frames prior to the depth mapping, and the depth correlation may be conducted following this step. For example, after the merging function, the main processor 320 may apply the depth data from the ToF sensor 310 to the merged data structure. As such, the main processor 320 may provide a depth estimate for this unified output.

In other embodiments, the main processor 320 may apply a merging function to other combinations of current frames to create a segmented object. For example, a current visible-light frame and a current modulated-light frame may undergo a segmentation pass, and the main processor 320 may identify blocks from both frames with high novelty to create a novelty representation of an object 105. In addition, more than simply two current frames may serve as the basis for such a unified output. As an example, a merging function may be applied to each of a current visible-light frame, a current thermal frame, and a current modulated-light frame as part of generating a novelty representation of an object 105. Similar to the above passages, the depth-mapping step may be performed before or after the merging function is executed.

In another arrangement, as part or a byproduct of the processes described above, data from one type of sensor of the passive-tracking system 115 may be used to improve the resolution of another type of sensor of the device 115. For example, the edge coefficients of current visible-light frames from the visible-light sensor 300 may be used for adaptive interpolation, such as smoothing or noise reduction, for the data of current modulated-light frames from the ToF sensor 310. As also part of this example, the blocks from the current visible-light frames and the modulated-light frames (based on their edge coefficients) can be used to create segmented objects in accordance with the description above. This segmented-object data may then be used to increase the resolution of the thermal sensor 310. For example, the borders of the segmented objects from the current visible-light and modulated-light frames can be compared against the borders of a segmented object arising from a current thermal frame. As the resolution of the current visible-light and modulated-light frames may be higher than that of the current thermal frames, the main processor 320 may adjust the values of the thermal-segmented object to align it with the borders of the visible-light and modulated-light segmented objects.

Consider the following example: an object 105 has a high temperature may be in front of a background wall, which has a low temperature. Based on the depth data from the ToF sensor 310, the first object 105 may have a substantially precise contour because it is closer to the ToF sensor 310. The temperature of the first object 105 may be assigned to the inside of the contour of the first object 105, and the temperature of the background may be applied outside the contour. Because the assignment of temperatures can be based on the more precise boundaries produced by a sensor with a higher resolution, the resolution of the thermal sensor 315 can be effectively increased.

Optionally, at least some of the principles presented here may also be applicable to reference frames. For example, the main processor 320 may apply a merging function to reference frames associated with different sensors. As another example, data from the ToF sensor 310 may be used to provide depth estimates for other reference frames, and any particular reference frame or combination of such frames may undergo a segmentation pass. Such techniques, however, may not be necessary for comparing reference frames to current frames.

Figure 5:
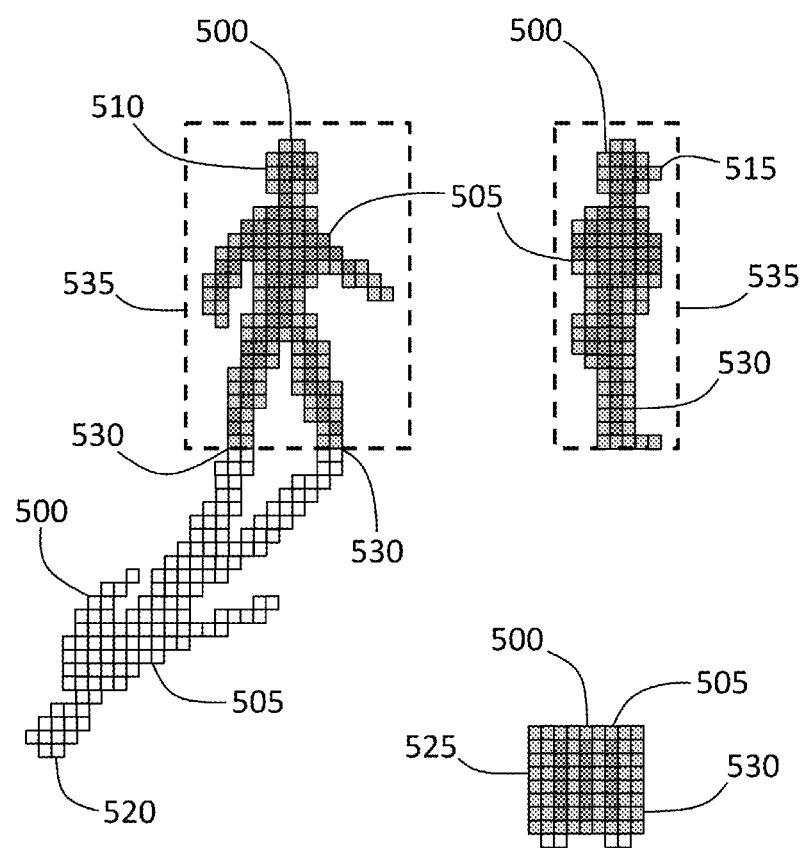
FIG. 5 illustrates several examples of novelty representations that correspond to detected objects.

Referring to FIG. 5, several examples of novelty representations 500 comprised of groups of merged blocks 505 are shown. As can be seen, the blocks 505 of the novelty representations 500 may assume a certain block arrangement, or a grouping of blocks 505. The block arrangement of a novelty representation 500 may depend on the form of the object 105 that corresponds to the representation 500. For example, an object 105 that is relatively short and wide may lead to a block arrangement with a similar shape or with similar proportions. This explanation surrounding FIG. 5 refers to some of the objects 105 presented in FIG. 1, although such explanation is relevant to objects 105 beyond those of FIG. 1.

As previously noted, the passive-tracking system 115 may be useful for passively tracking humans. Following the processes of filtering out data associated with objects 105 that are most likely not human, the main processor 320 may passively track the novelty representations 500 shown here and, consequently, any humans associated with the representations 500. As an example, a first novelty representation 510 may correspond to the human 150 and a second novelty representation 515 may be related to the second human 165, both of which were introduced in FIG. 1. In accordance with the explanations presented above, these novelty representations 500 may be associated with high-novelty factors in the corresponding current frames. Data related to the other objects 105 in the monitoring area 110, such as the entrance 130, the ceiling 135, and the windows 140 (see FIG. 1), may have generated blocks with low-novelty factors as a result of the comparison of the current frames with the relevant reference frames and may have been filtered out.

As a result of ambiguous data, novelty representations 500 may be created for certain other objects 105. For example, the shadow 160 (also see FIG. 1) of the human 150 may produce blocks with high-novelty factors, especially if the human 150 is moving; however, the confidence factors (which may be related to the likelihood that the blocks are associated with a human) that are relevant to these blocks 505 may be low. Low confidence factors may be the result of low temperature readings attached to the blocks (i.e., low-novelty factors from the blocks related to the thermal sensor 315). Other data from the sensors of the passive-tracking system 115 may also result in low confidence factors for the blocks of the shadow 160, such as a lack of detectable (human) facial features. The main processor 320 may determine, based on this information, that no additional processing of this data is necessary and the associated object 105 does not warrant passive tracking. Nevertheless, the main processor 320, at least at this point, may not necessarily rule out the possibility that the shadow 160 is a human suitable for passive tracking and may generate a third novelty representation 520 that represents the shadow 160. Such prudence may decrease the chances that the passive-tracking system 115 may not detect a human in the monitoring area 110.

Like the shadow 160, a portable heater 155 may result in at least some blocks with high-novelty factors being generated, such as those from current thermal frames created by the thermal sensor 315. For example, the portable heater 155 may have been recently activated, and the heat that it is producing may be within a range of temperatures given off by a human. Because the portable heater 155 may have been present in the monitoring area 110 for some time, however, the comparison of the current visible-light (or modulated-light) frames with the reference frame(s) may indicate that the relevant data of the current frames is related to a pre-existing or recognized object 105. Further, the visible-light sensor 300 may be unable to detect any human facial features from the data of any of the current frames that are related to the heater 155. Note the stationary nature of the portable heater 155 may not necessarily produce a low confidence factor, particularly if the heater 155 has just been recently positioned in the monitoring area 110 and is not yet captured in the relevant reference frames. In any event, in view of the ambiguity of the incoming data, the main processor 320 may generate a fourth novelty representation 525 that is associated with the portable heater 155 or may simply determine that the object 105 (i.e., the heater 155) is not a candidate for passive tracking.

For purposes of this description, references made to novelty representations 500 (or groups of blocks that make up the novelty representations 500) or other previously recorded data may effectively serve as references to their associated objects 105. For example, if the main processor 320 is passively tracking a novelty representation 500 or some other data structure, the main processor 320 may be considered to be also passively tracking the object 105 that led to the generation of that novelty representation 500 or data structure. That is, processing performed on data in the digital domain (the novelty representation 500 or data structure) may be linked to the physical world (the object 105 associated with the representation 500).

In one embodiment, if novelty representations 500 are created for non-human objects 105, additional processing may be applied to the novelty representations 500 to further increase or decrease their confidence factors. In view of the additional information, the main processor 320 may determine whether a particular novelty representation 500, and hence, the associated object 105, is a suitable candidate for passive tracking.

In support of this additional processing, the main processor 320 may distinguish the novelty representations 500 from one another through a number of techniques. For example, the groups of blocks of the novelty representations 500 may be differentiated based on the results of the segmentation pass, as discussed earlier. As such, the various novelty representations 500 may have distinct and sharp depth boundaries 530, allowing the main processor 320 to distinguish them from one another.

As an example, the main processor 320 may be able to distinguish the first novelty representation 510 (corresponding to the human 150) from the second novelty representation 515 (corresponding to the second human 165). Similarly, the main processor 320 may be able to distinguish the first novelty representation 510 (corresponding to the human 150) from the third novelty representation 520 (corresponding to the shadow 160 of the human 150). Based on the data from the appropriate sensors, such as low temperatures or lack of human facial features, the main processor 320 can discount the third novelty representation 520.

This segmentation of novelty representations 500 can improve the operation of the passive-tracking system 115. For example, without the ability to effectively distinguish the novelty representations 500 from one another, the main processor 320 may generate a single novelty representation 500 that corresponds to both the human 150 and the shadow 160. In that case, the single novelty representation 500 may corrupt the passive tracking process because it may be associated with a lower average temperature, resulting primarily from the shadow 160. As another example, being able to distinguish between different novelty representations 500 corresponding to different humans can permit the passive-tracking system 115 to passively track multiple humans (or other targets) simultaneously. This tracking of multiple humans may be conducted even if the humans are standing next to each other or if they are moving at or near the same speed and in an identical or substantially identical direction.

The discussion involving FIGS. 4A-C explained how the current frames from certain sensors could include positional data related to an object 105 based on a coordinate system 410. For example, the current visible-light and thermal frames may include X-Y positional data, and the current modulated-light frames may contain X-Y-Z positional data. As another example, a sonar device 355 (see FIG. 3) may be useful for determining or confirming X-Z positional information relating to an object 105.

In one arrangement, the main processor 320 may determine a 3D position of all or at least some of the novelty representations 500 based on this positional data. For example, the main processor 320 may determine a centroid of a novelty representation 500 by determining an overall X-Y position of the novelty representation 500 by averaging the X-Y positions of its blocks 505. Likewise, the main processor 320 may determine an overall Z position of the novelty representation 500 by averaging the Z positions of its blocks 505. In either case, the X-Y-Z positions may be weighted by one or more confidence factors (separate or combined), which may be an indication as to the overall confidence in these values.

Another option exists for determining the positional data of the novelty representations 500. In particular, referring to FIG. 5 again, the main processor 320 may frame a novelty representation 500 with a rectangle 535 and then determine the center of the rectangle 535 to find the overall X-Y position of the representation 500. In this option, the Z position could be determined by averaging the Z positions of the blocks 505 of the novelty representation 500, as previously described. These X-Y-Z values may also be weighted by one or more confidence factors, either individually or as a combination (or both). The use of the rectangle 535 may be useful in the case of a unified output from two or more sensors, such as the example of applying the merging function to the current frames from the visible-light sensor 300 and the thermal sensor 315.

No matter how the positional data is determined, the main processor 320 may continuously update this data as the relevant current frames are processed. With this information, the passive-tracking system 115 to passively track the novelty representations 500 over time and, hence, their corresponding objects 105.

In addition to depth boundary detection, other techniques may be useful in differentiating between separate novelty representations 500 and determining whether a particular novelty representation is a suitable target for tracking. For example, by knowing the X-Y-Z data of a novelty representation 500 and the number and arrangement of blocks 505 that make up the representation 500, the main processor 320 may estimate a height of the corresponding object 105. If the estimated height is outside a range of typical heights for a human, the main processor 320 may discount the object 105 for purposes of passive tracking, if humans are the intended targets for such tracking. Moreover, if two different objects 105 are near one another in a monitoring area 110, different height estimates for them may be used to confirm the depth boundaries 520 of their corresponding novelty representations 500 or to adjust one or more confidence factors. In some cases, the data from the current visible-light frames generated by the visible-light sensor 300 may suffer from perspective distortion. The main processor 320, however, can be configured to correct for this distortion based on the Z data that is has received.

As part of estimating the height (or some other dimension) of the object 105, differences in the depths of the objects 105 may be considered. As previously mentioned, the number of blocks that an object 105 occupies may drop as the distance between that object 105 and the passive-tracking system 115 increases. The generation of the height estimate here, however, occurs after the X-Y-Z data has already been obtained. To account for this effect, the determination of the X-Y-Z data may need to produce an estimate of extents of the object 105. For example, the size of the rectangle 535 (or some other planar representation) could be used to set this estimate. In such a case, the number of blocks that are within the bounds of the rectangle 535 or other representation may serve as a size output, which can then be converted into actual height, width, or any other relevant dimension for the object 105. As another example, a statistical method could be employed in which a certain percentage or number of the blocks associated with the object 105 are rejected for the size analysis. Specifically, Y-positional data may be determined for the blocks associated with an object 105, and they can be sorted to obtain quantiles. As an example, the difference between ten percent and ninety percent quantiles could be used, which would eliminate about ten percent of the blocks, or those that are excessively affected by noise. Another option is to reject a fixed number of blocks that are affected by too much noise. Yet another example is to use a scaled standard deviation estimate of the Y-positional data. Of course, other statistical measures may be employed for estimating sizes of the object 105.

The range of heights can be set based on any suitable criteria. For example, the range can include average human heights from an infant to a fully grown adult and may be adjusted to the particular setting being monitored. For instance, the range of heights may be lower for a day-care area that houses small children. The range of heights may also be set to include average heights for non-human objects 105 (such as pets or zoo animals) that may need to be passively tracked.

Measurements other than height may also be calculated for an object 105, in view of the positional and block data. For example, depending on the orientation of an object 105, the depth or width of the object 105 may be determined. As a specific example, if the object 105 is a human, the width of the human may be determined if the human is facing the passive-tracking system 115 or has his or her back to the system. The depth of the human could be calculated if the side of the human's body is facing the system 115. These additional measurements, similar to height, can be used to, for example, help determine whether an object 105 is human or to validate depth-boundary detections. Any of these size- or proportion-comparison processes may be referred to as a size-threshold analysis. A "size-threshold analysis" is defined as an analysis that compares measured data relating to an object's size to reference data relating to the size of one or more humans to determine whether the object's size is comparable or proportional to the size of the humans represented by the reference data or otherwise meets or fits within a range of sizes of such humans. Similar to the height calculation, the effect of depth distortion on these estimated measurements may be addressed.

The measurements that are generated for an object 105 may be updated, such as during the time that the object 105 is detected. Thus, as new data comes in from the current frames, the main processor 320 may provide updated estimates of the various sizes of the object 105. Over time, the estimates may be averaged to generate values that are more reflective of the actual measurements. In one embodiment, subsequent and substantial deviations from the collected samples may be ignored, such as those that may occur if the object 105 is a human, and the human temporarily bends over or squats down. In such cases, significant changes in, for example, the Y position of an object 105 may trigger the step of ignoring the current measurements of the object 105.

As described earlier, motion vectors at the block level may be useful in determining depth boundaries. Motion filtering in the context of novelty representations 500 may also be useful here. For example, a range of possible motion may be applied to a novelty representation 500 or some other previously recorded data, and this range may represent the possible coverage area for the corresponding object 105 to move in any particular direction without violating a maximum limit of possible human speeds. In such a case, if the X-Y-Z positioning of a novelty representation 500 corresponding to a detected human shifts over the course of multiple current frames, the main processor 320 may determine whether this movement is within the maximum range for a human over that time period. In doing so, the main processor 320 may compare current frames with previous frames, such as a current visible-light frame with one or more previous visible-light frames. The comparison can also be performed with current and previous modulated-light (or positioning) and thermal frames. If available, the main processor 320 may rely on motion vectors to make the comparison step more efficient.

If the calculated motion is within the range of human speed, the main processor 320 may use this information in designating the novelty representation 500 as an existing one that is currently being tracked. If the movement is outside the range, however, the main processor 320 may reject the excessive motion reading and determine that the novelty representation 500 is new and may represent a previously undetected object 105. Accordingly, motion filtering may help distinguish objects 105 from one another, in addition to the techniques previously described. As an option, the information obtained from motion filtering may also be used to increase or decrease any number and type of confidence factors, including those related to whether a detected object 105 is human or even a certain type of human. Like the range of heights, the range of speeds may also be set to correspond to non-human objects 105 typically found in a certain monitoring area 110. The range of speeds may also be adjusted depending on the type of humans intended to be passively tracked, such as being lowered for small children in a day-care establishment or elderly persons in an assisted-living facility.

Identifying the dissimilar movements of different novelty representations 500 may also be helpful in distinguishing them from one another. For example, the motion vectors for the blocks of a first novelty representation 500 may indicate the first novelty representation 500 is moving in a first direction, and the motion vectors for the blocks of a second novelty representation 500 may show the second novelty representation 500 is moving in a different direction. This information can help confirm the existence of two separate objects 105—which may have been previously performed via depth-boundary detection—or at least can be used to adjust any relevant confidence factors, such as those related to a determination made by the main processor 320 that the objects 105 are indeed two different objects 105. Moreover, this process can verify that a particular object 105 that has been detected is human (or increase one or more confidence factors) because the group of blocks 505 whose motion vectors show movement in the same direction may have the correct proportion or size for a human. If a group of blocks 505 moving in the same direction are too big or too small to be a human, this finding may support a determination that the group of blocks are not associated with a human or may otherwise reduce one or more confidence factors that are related to a positive indication of a human.

In one embodiment, because motion vectors may be generated on a per-block basis, the estimated motion of a novelty representation 500 may be compared to the motion of its blocks. Depending on the results of the comparison, one or more confidence factors may be set or adjusted, such as those relating to the motion of the novelty representation 500, its depth boundary 530, or other parameters or measurements.

Data about the motion of an object 105 may also enable the main processor 320 to determine the type of motion involved. For example, if the object 105 is a human, the speed of the human object 105 may be compared to a database that contains average speeds for different human-motion types, like walking, jogging, and/or sprinting speeds of humans. Based on this comparison, the main processor 320 may determine that the human object 105 is walking, jogging, or sprinting. Changes in the speed of the human object 105 may also correspondingly cause the main processor 320 to select another human motion type. Other motion types may be part of the database, including motion types for non-human entities. Confidence factors related to the determination of a motion type may also be set, and as will be shown later, inputs from other sensors or devices can help confirm the selected motion type.

Data received from the pressure sensor 325 may also assist in distinguishing existing objects 105 from new objects 105 in the monitored area 110. For example, if the pressure sensor 325 detects a pressure change based on the opening or activation of a door or other entry structure, the main processor 320 may rely on this input as part of its determination that the detected object 105 is a new (and different) object 105. This information may also be used to adjust any relevant confidence factors related to the presence of a pre-existing or new object 105.

Any combination of techniques can be used for purposes of discerning multiple objects 105 in a monitored area 110 from one another or for determining whether an object 105 is human, including any combination of the aforementioned processes. Moreover, some of such techniques may be given a higher weight in terms of the overall analysis, particularly based on results that are later validated.

In one arrangement, the passive-tracking system 115 may be configured to identify one or more stances that an object 105, such as a human, may take. For example, a detected object 105 may be a human, and the human may transition from a standing position to a seated one. The human may also assume a crouching position or may lie flat on the floor or a bed in the monitoring area 110.

Such transitions may lead to substantial, moderate, or slight changes in the X, Y, or Z positions of the human and the arrangement of blocks 505 of the human's corresponding novelty representation 500. As an example, if the human moves from a standing position to a seated one, the human's Y position may change significantly, but the human's X and Z positions may shift only slightly. Moreover, the arrangement of the blocks 505 of the corresponding novelty representation 500 may transition from a form that is primarily vertical to one that resembles a step function. The center of gravity of the novelty representation 500 may be altered as well, such as moving to a lower value (with respect to the floor) after the human sits.

The main processor 320 can be configured to analyze this data and conclude that the human (i.e., the object 105) has taken a seated position. In one embodiment, the passive-tracker system 115 can be loaded with multiple ranges of predetermined-orientation-change values, or simply change values. As an example, a set of three ranges containing a plurality of predetermined-orientation-change values may be assigned to each of several different orientations, such as sitting or lying flat on a bed, that an average human may assume. In particular, one of the three ranges, an X-shift range, may contain change values that may correspond to the average shifts in the X position for a specific orientation for a human. For example, assume a human has a first X position while standing and a second X position while seated. The shift in the value of the X position for the transition from the first X position to the second X position may substantially match at least one of the predetermined-orientation-change values that is part of the X-shift range designated for sitting. The change values of the X-shift range may be in any suitable form, such as in measurable distances (e.g., inches, feet, etc.) or degrees or percentages in the overall change of the X position.

In addition to sitting and lying flat, an X-shift range can be created for any suitable orientation that a human may assume, such as standing, squatting, kneeling, one or both arms raised, etc. That is, for each of these orientations, an X-shift range may be generated in which the range includes change values related to an X position of the human object that may be typically realized when transitioning to each of the orientations.

A second of the three ranges, a Y-shift range, may contain may contain predetermined-orientation-change values that may correspond to the average shifts in the Y position for the specific orientation for a human. Similarly, a third of the three ranges, a Z-shift range, may include change values that may correspond to the average shifts in the Z position for the specific orientation. Multiple sets of these three different ranges may be created to cover any number of possible orientations of an average human. The main processor 320 may map the shifts in the X, Y, and Z positions of the detected human object 105 following a transition by the human object 105 from a first orientation to a second orientation against all or at least a portion of the various sets of ranges. If there is a match to a particular set, the main processor 320 may identify the orientation assigned to that set. The detected human may then be designated with this identified orientation.

In another embodiment, the passive-tracking device 115 can include any number of reference novelty representations 500, each of which may have a predetermined block arrangement. Each of the predetermined block arrangements may correlate to a block arrangement that may be produced from an average human assuming a certain orientation. For example, one of the reference block arrangements may be based on a block arrangement resulting from an average human taking a seated position or squatting. As such, the main processor 320 can be configured to compare the block arrangement of the novelty representation 500 corresponding to a detected human with the block arrangements of the reference novelty representations 500. If the comparison produces a match, the main processor 320 may designate the detected human with the orientation that is assigned to the matched reference novelty representation 500.

As an example, the main processor 320 can rely solely on either of these techniques (X-Y-Z shift comparison or block-arrangement comparison) to identify an orientation for a detected human. Alternatively, the main processor 320 may identify a certain orientation for the detected human only if both solutions result in the same orientation. Moreover, confidence factors may be assigned to the identified orientations, and the confidence factors may be adjusted based on the similarities that are observed during the underlying comparisons. As an option, detecting that an object 105 is in a position that is comparable to one that an average human may assume can be used for purposes of determining whether the object 105 is human. As another option, if the passive-tracking system 115 determines that a human may have assumed a certain orientation, like crouching or lying flat, the main processor 320 may treat this condition as a possible security threat. This feature may depend on the circumstances of the monitoring area 110, such as whether the monitoring area 110 is a lobby of a bank that is currently closed in view of a holiday or weekend.

The current frames generated by a ToF sensor 310, as previously noted, may provide data related to the depth (or Z position) of an object 105. In one embodiment, this data may serve to narrow the focus of the search by the sonar device 355. For example, the main processor 320 may receive the current sound frames from the sonar device 355 and, following their comparison with the reference sound frame(s), may map the data from the current sound frames against the data of the current modulated-light frames. This mapping may also be performed against the data from, for example, the current visible-light frames.

As noted above, the current sound frames may include data relating to the X and Z positions of one or more objects 105 in the monitoring area 110. As part of this mapping, the main processor 320 may identify significant positive deviations from the data of the sonar device 355 that include X and Z positions that at least substantially correspond to the X and Z positions of the data from (respectively) the visible-light sensor 300 and the ToF sensor 310. Because the ToF sensor 310 may also provide data related to an X position for one or more objects 105, as an option, the mapping may be applied only to the data from the ToF sensor 310. As another option, the sonar data could also be mapped against the X position provided by the thermal sensor 315 (and the Z position provided by the ToF sensor 310).

No matter which reference is used for such mapping, once these significant deviations are identified, the main processor 320 may obtain one or more (possibly) revised Z positions from the data provided by the sonar device 355 with respect to the objects 105 in the monitoring area 110. These revisions of Z positions may be helpful because the Z positions provided by the sonar device 355 data may be more accurate than those from the ToF sensor 310 data. The Z-position data from the sonar device 355 may be applicable to any feature in this description that relies on depth values.

Data from the other sensors of the passive-tracking system 115 may also be used to narrow the focus of the search of the sonar device 355 in other ways. For example, based on the X- and Z-positional data of the object 105 from the current modulated-light frames and the current visible-light frames, the sonar device 355 may identify a sound transducer 305 in the array 350 that is positioned closest to the X position of the object 105. If virtual sound transducers are realized, the sonar device 355 may identify a direction of one of the narrow beams that is most relevant to the X position of the object 105. Once identified, the sonar device 355 may scan along the relevant direction at approximately the Z distance of the object 105. This technique may avoid having to scan the entire range of the sonar. Alternatively, after the full range of sonar is scanned for the significant deviations when a new object 105 is detected, subsequent scans (to enable the passive tracking) may be narrowed by using the previous position as a center for the search range, such as for the Z distance. This alternative may be helpful, for example, if the passive-tracking system 115 does not have a ToF sensor 310.

In some cases, the returns from the sonar device 355 may be weak and, therefore, unreliable. For example, if one of the objects 105 is a human wearing clothing that has low reflective properties or sound-absorbing fabric, such as a fluffy bathrobe, the main processor 320 may simply rely on the Z positional data furnished by the ToF sensor 310. Other objects 105 that may produce poor sonar data include those that are covered by or encased in foam that absorbs sound waves. Moreover, in certain conditions, the ToF sensor 310 may produce unreliable data. For example, if the monitoring area 110 is subjected to high ambient-light levels, the output from the ToF sensor 310 may be contaminated with excessive amounts of noise. If so, the main processor 320 may simply rely on the Z positional data from the current sound frames from the sonar device 355, as the sonar device 355 should not be adversely affected by this condition. In such a scenario, the data from the sonar device 355 can be mapped against the output of the other sensors, such as the visible-light sensor 300 and/or the thermal sensor 315, to find the depth data of one or more novelty representations 500 and their corresponding objects 105. Further, the data from the current sound frames may be mapped against individual data streams of the other sensors or combined outputs of such data to obtain the X-Y-Z positions.

Like the other sensors of the passive-tracking system 115, the main processor 320 may apply a motion range to the depth values that it determines, which can allow it to filter out sudden and large changes in the Z position of a novelty representation 500 or otherwise a previously recorded reflection. This motion range may be based on typical human speeds of movement and may also be adjustable in view of the circumstances of the monitoring area 110. Rejection of a relatively large change in the Z position may assist the main processor 320 in identifying new objects 105 in the monitoring area 110 or in setting one or more relevant confidence factors, similar to processes described earlier.

In one arrangement, the motion range may be kept to a relatively small area around the novelty representation 500 or previously recorded reflection. For example, the motion range may correspond to about one meter (in any direction) from the center or boundary of the representation 500 or recorded reflection. As such, the main processor 320 may be interested in only significant peaks in that small area for purposes of tracking the object 105 corresponding to the representation 500 or recorded reflection. Any significant peaks outside this range may be assumed to be attached to a different object 105. In one embodiment, the range here may be based on the period and speed of the sonar device 355.

Additional information on the operation of the sonar device 355 will now be presented. As previously explained, an array 350 of sound transducers 305 can make up part of the sonar device 355, which can also include one or more sound transmitters 360 configured to transmit, for example, ultrasonic sound waves in at least the monitoring area 110 (see FIG. 3). The sound transducers 305 can capture and process the sound waves that are reflected off the objects 105, and the sonar device 355 may generate the current sound frames.

In many environments, however, multiple reflections from various objects 105 in the monitoring area 110 may cause processing difficulties. Some sound waves may be reflected off an object 105 and directly received by the sonar device 355, which may be referred to as primary reflections. Some of the reflected sound waves, however, may bounce off another object 105 before being received, which may be labeled as secondary reflections. To overcome this issue, the main processor 320 may smooth out the peaks and valleys of the returned sonar data from the current sound frames. This smoothing out may essentially leave only the peaks of the returned data, a process similar to taking an envelope of a signal.

Subsequently, the main processor 320 may compare the returned (and processed) data from the current sound frames with the data of the reference sound frames, which can permit the main processor 320 to filter out return data associated with objects 105 (including reflections off of them) that do not warrant passive tracking, such as pre-existing or recognized objects 105. In one embodiment, the sonar device 355 may contain multiple sound transducers 305, and reference sound frames may be generated and stored on behalf of each of the sound transducers 305. Additional reference sound frames may be created and stored for each of the sound transducers 305 to account for changing conditions, such as excessive noise during a certain time of day, in the monitored area 110. Nevertheless, any number of reference sound frames may be generated and stored for any number of the sound transducers 305.

The main processor 320 may also take other steps in response to the problem of multiple reflections. For example, the main processor 320 may identify a strong peak from the return data, which may be associated with a primary reflection, and can filter out or ignore smaller peaks that follow the identified (strong) peak, which may be related to secondary reflections. This step may be useful because the secondary reflections should follow later in time in comparison to the primary reflections. In another embodiment, the passive-tracking system 115 may be positioned in a corner of a monitoring area 110 to assist in the detection and filtering of secondary reflections generated by the corners or other structural angles of the area 110. Specifically, putting the system 115 in a corner may prevent at least two walls and a ceiling (and/or possibly a floor) from participating in the primary reflection. Once identified, the significant peaks may be mapped against the data from the other sensors of the passive-tracking system 115, as explained above.

In addition to providing depth data, the sonar device 355 may provide X positional data, particularly if an object 105 is a human. The sonar device 355, as noted earlier, may include an array 350 of sound transducers 305. As an alternative, the passive-tracking system 115 may not include a sonar device 355 but may, nevertheless, include an array 350 of sound transducers 305 that are configured as microphones. In either case, the sound transducers 305 of the array 350 may be configured to capture human speech or other forms of animal communication, like barking or growling. The sound transducers 305 of the array 350 may also be aimed in one or more horizontal directions (with respect to the passive-tracking system 115), and as such, the transducers 305 may have a designated azimuth value. Here, the transducers 305 may be narrow-band transducers. This concept may apply to any arrangement of sound transducers 305 that are configured to capture sounds, including those within and outside the range of human hearing.

As an option, phased-array operation (similar to the examples described earlier) may be implemented when the transducers 305, which may be omnidirectional, are configured as microphones. In this option, a delay could be introduced to the received (sound) signals from each of the transducers 305 of the array 350, which can result in the delayed signals reaching a summing point at about the same time. A summed output signal may then be realized. Based on the delay that is introduced to the received signals, the array 350 can behave like a narrow-beam antenna, with the array 350 essentially pointing in a certain direction. Sound signals that come from a location that is counter to the virtual direction of the array 350 may not gain the benefit of the summing of the delayed signals because they may not arrive at the summing point at the same time, thereby producing a lower output signal. In one embodiment, the timing of the delays may be dynamic, and by repetitively changing them over time, the array 350 may realize multiple virtual narrow-beam microphones, with each direction existing for a limited amount of time. In this way, the relatively large summed output signal may be associated with a particular direction, which can assist in identifying the location of the monitoring area 110 from which the captured sound originated. Once a direction is identified, the delays may be set to arrange the array 350 to focus more on that direction and those that are nearby. In this example, the directions that are not associated with a particular incoming sound may still be monitored, but the amount of time the delays that are designated for these directions are in place may be decreased. This decrease may be temporary, such as until the original sound disappears or a new sound in one of the affected directions is detected.

The passive-tracking system 115 may include a database that includes digital reference signatures against which detected sounds may be compared. The reference signatures may be related to various forms of human speech and, if desired, animal or other non-human sounds, and the database may be updated with new reference signatures. If the comparison results in a match, the main processor 320 may determine that a human (or animal or other thing) may be present in the monitoring area 110.

Based on this determination, in the case of narrow-band transducers (i.e., non-phased-array operation), the main processor 320 may identify the most relevant sound transducer 305 of the array 350. As an example, the most relevant sound transducer 305 is the one positioned in a direction closest to the source of the detected sound, which can be determined by comparing the signal strength of the inputs from all or at least a portion of the transducers 305 of the array 350. As an example, the most relevant sound transducer 305 may be referred to as the source sound transducer 305. Once the source sound transducer 305 is identified, the main processor 320 may determine an estimate of the X position of the source of the sound based on the azimuth value of the source sound transducer 305. As an option, by analyzing the inputs from one or more of the other sound transducers 305 (those that are not the source sound transducer 305) in addition to the source sound transducer 305, the main processor 320 may extrapolate or interpolate the X position of the object 105. For better resolution, the number of sound transducers 305 of the array may be increased. In the case of phased-array operation, the X position may be based on the identified direction. In either arrangement, the X-positional data from the array 350 may serve as the sole input for the X position of an object or may be mapped against the data from other sensors of the passive-tracking system 115.

Other types of sounds, such as those produced by or from gunshots, sirens, footsteps, or breathing, may be identified through this technique. In addition, the periodicity of a repetitive sound may be used to assist in its identification. For example, the sound of footsteps and their pattern of repetition can be compared to reference data about human footsteps to possibly identify them as originating from a human. If identified as human, this data may be useful in confirming the determination of a certain human motion type (e.g., walking, sprinting, etc.) based on motion of an object 105, or at least to increase one or more relevant confidence factors related to such a determination.

The passive-tracking system 115 can be configured to adaptively learn from its operation. This principle may be particularly relevant in view of the ability of the system 115 to compare data between or among its various sensors, as has been previously shown. As an example, the thermal sensor 315 may provide data that indicates that a detected object 105 is likely human, given that it has a temperature that falls within the acceptable range. Data from the other sensors, however, may reveal that the object 105 is not human. For example, the data from the visible-light sensor 300 may show that the object 105 has no human facial features. As another example, data from the visible-light sensor 300, the ToF sensor 310 and/or the sonar device 355 may indicate that the height or other dimensions of the object 105 are outside the range of a human or that the object 105 has not moved for an extended period of time.

In view of this additional data, the main processor 320 may lower one or more confidence factors, which may be designed to provide an estimate of whether a particular object 105 is human, associated with the current output of the thermal sensor 315. This false positive from the output of the thermal sensor 315 may occur on a consistent or extended basis with respect to a particular object 105 or a certain portion of the monitoring area 110. If it does, in response, the main processor 320 may be configured to ignore the data from the thermal sensor 315 associated with this object 105 or portion of the monitoring area 110, lower the relevant confidence factors, or assign a deemphasizing grade to the data (e.g., the thermal frames) from the thermal sensor 315, without necessarily having to compare the thermal data with the data from the other sensors. As part of ignoring the data from the thermal sensor 315, the main processor 320 (or some other device) may ignore entire thermal frames or only the negatively affected portions of the thermal frames. In either case, by not processing the flawed data, overall computational intensity can be reduced.

Subsequent comparisons, however, may be performed periodically to make further adjustments in the event of a change to the status or condition of the object 105 or portion of the monitoring area 110 that would affect the occurrence of the false positive readings from the thermal data. Consistent or extended false-positive determinations or other inaccuracies from a sensor or other component may be referred to as past-performance factors.

The passive-tracking system 115 is not limited to this particular example, as the adaptive learning process may apply to any other sensor or combination of sensors of the system 115. For example, the main processor 320 may be configured to ignore the output data from the ToF sensor 310 or lower its relevant confidence factors with respect to a certain section of the monitoring area 110 at a specific time window because excessive amounts of sunlight in that section during that window overwhelm the ToF data with noise. Similarly, the data from the visible-light sensor 300 may indicate that human facial features are present on an object 105 and that the object 105 is proportionally equivalent to a normal human adult, but the data from the other sensors or other data from the visible-light sensor 300 itself may contradict this reading. A specific example of such a possibility is if the object 105 is a mannequin or some other lifeless, 3D representation or model of a human. In this example, the thermal data may indicate that the object 105 has a temperature that is substantially below that of a normal human. In addition, the data from the ToF sensor 310, sonar device 355, and visible-light sensor 300 may show that the object 105 has remained completely still for a significant amount of time.

In view of the contradictory data, the main processor 320 may determine to ignore the facial-feature-recognition aspect of the data from the visible-light sensor 300 or to lower the relevant confidence factors. Eventually, this non-human object 105 may be integrated into any number of reference frames to enable it to be easily discounted during the comparison with the corresponding current frames.

Other phenomena may affect the operation of one or more components or sensors of the passive-tracking system 115. For example, the appearance of an electro-magnetic field or fluctuations in the field may cause interference with one or more sensors. Likewise, an audio source may reduce the effectiveness of some of the sensors, like the sonar device 355. In either case, input from the sensors or some other component that is not affected by the interference may be used to recognize the problem. Once recognized, the main processor 320 may automatically perform adjustments to compensate for the interference, such as in accordance with the examples above.

As another option, any one of the sensors may be configured to avoid generating, reading, or outputting data about one or more portions of the monitoring area 110 based on the receipt of faulty data. The sensors may also be configured to avoid scanning or otherwise acquiring data associated with such portions of the area 110. For example, if the ToF sensor 310 consistently generates inaccurate data in relation to a certain section of the monitoring area 110, the ToF sensor 310 can apply a restrictive boundary such that it prevents the reading of the data associated with the negatively affected part of the monitoring area 110 or otherwise blocks the output of such data. The data that is allowed to pass may be part of a current frame and may be referred to as a region of interest. As such, the generation of current frames may include the generation of a frame that includes all the data that would normally comprise the frame or a frame that includes only portions of all the data that would normally be part of the frame. If only portions of a frame are to be included, the delineation of data may occur at the discrete-element level, such as at the block level. As mentioned earlier, by avoiding the generation or reading of poor-quality data, overall computational intensity may be lowered.

As another example of a sensor being configured to minimize the impact of inaccurate data, the power of the modulated-light sources 345 may be decreased or the sources 345 may be redirected to minimize or stop the receipt of reflected signals from the affected area. As another example, the lens of the visible-light sensor 300 may be adjusted to broaden or narrow its scope of coverage. In addition, if the passive-tracking system 115 or the network 200 includes or supports a pan-tilt-zoom (PZT) camera, for example, adjustments may also be made to the PZT camera in response to the receipt of flawed data. These concepts of adjusting sensors (including those described above) may apply to any of the sensors of the passive-tracking system 115, and these modifications may be based on adaptive learning principles such that the system 115 can take such steps automatically based on the receipt and processing of data over certain periods of time.

The sensor modifications described here may also be executed based on triggers that are not necessarily tied to adaptive learning. For example, the modifications described here may be performed manually or based on certain time periods or events. An example of an event that may cause such a modification of a sensor may be the detection of the activation of a light source in the monitoring area 110 that may interfere with the operation of a number of sensors of the system 115. In this example, the system 115 may have been previously configured to automatically adjust one or more of its sensors in response to the activation of this light source without having to undergo adaptive learning to do so. Inputs from other sensors, such as the light-detection sensor 330, the pressure sensor 325, or the accelerometer 365, may also result in a sensor being configured to avoid generating or outputting data about portions of the area 110 or scanning or otherwise acquiring data associated with such portions.

The adaptive learning aspect of the passive-tracking system 115 is not necessarily limited to the components and features of that system 115. Specifically, a first passive-tracking system 115 may rely on data provided by other passive-tracking systems 115, whether located in the same or different monitoring areas 110, to enable the first system 115 to adaptively learn and to compensate for any number of factors affecting its performance.

In this regard, a passive-tracking system 115, as shown earlier, may be part of a network 200 (see FIG. 2). The network 200 may contain one or more passive-tracking systems 115 and one or more hubs 205, and through this scheme, the passive-tracking systems 115 may share any type of data. For example, a first passive-tracking system 115 assigned to a first monitoring area 110 may provide to a second passive-tracking system 115 data about an object 105 that the first passive-tracking system 115 is currently tracking. Continuing with this example, the second passive-tracking system 115 may be assigned to a second monitoring area 110 that is adjacent to the first monitoring area 110, and the first system 115 may be prompted to execute this sharing of data if the object 105 appears to be moving towards the second monitoring area 110. This determination of which passive-tracking systems 115 are prompted to exchange data may be based on any number of factors, such as extrapolating a likely travel path by an object 105 to a new monitoring area 110.

The data exchange may occur directly between different passive-tracking systems 115, or a hub 205 may be responsible for managing such an exchange. In the case of the latter, the hub 205 may determine which (if any) of other passive-tracking systems 115 may receive the information about the object 105 from the first passive-tracking system 115.

The network 200 also offers various options for processing data and improving the performance of the passive-tracking systems 115. For example, the processing or analytics involved with any of the techniques previously described with respect to the operation of the passive-tracking system 115 may be performed locally (at the passive-tracking system 115) or remotely, such as at a hub 205, another passive-tracking system 115, or some other component that is part of the network 200. Remote processing may be needed if the passive-tracking system 115 currently tracking an object 105 does not have enough processing power to do so or some part of the passive-tracking system 115 is not operating properly.

In another embodiment, data sharing may occur between or among multiple passive-tracking systems 115 that are assigned to the same monitoring area 110. For example, a first system 115 in the monitoring area 110 may have only two types of sensors, and a second system 115 in the area 110 may contain only two types of sensors that are different from those of the first system 115. The first system 115 and the second system 115 may share their data with one another and, through the received data, may confirm their readings and passively track an object 105 in the area 110 simultaneously. The first system 115 and the second system 115 may also share their data with a hub 205 or one or more other passive tracking systems 115, whether in this monitoring area 110 or in another. In either situation, in this arrangement, a passive-tracking system 115 that does not include one or more certain sensors may still continue to receive data associated with such sensors and may use this data to improve its passive tracking.

As alluded to earlier, a passive-tracking system 115 may also use data from other passive-tracking systems 115 or other devices to adjust its findings or tune its components. For example, the data from the thermal sensor 315 of a first passive-tracking system 115 may reveal that the average temperature of a detected human object 105 in a first monitored area 110 is roughly 97.8 degrees Fahrenheit. As the human object 105 moves through second and third monitoring areas 110, second and third passive-tracking systems 115 assigned respectively to those area 110 may determine that the average temperature of the human object is 98.6 degrees Fahrenheit, which is normal for a human. The thermal data from the second and third passive-tracking systems 115 may be subsequently shared with the first passive-tracking system 115.

Because the second and third systems 115 are generating the same average temperature, in response, the first system 115 may run diagnostics tests on the thermal sensor 315 and/or other components of itself to determine if there are any operational issues. If so, the first system 115 may perform system updates or calibrations automatically or may signal the hub 205 or some other unit that steps to correct a possible faulty thermal sensor 315 or some other component may be required. If calibrations or corrections cannot be performed or do not solve the issue, the main processor 320 may adjust any relevant confidence factors of the first system 115 to reflect the possibly inaccurate thermal readings produced by the first system 115.

The sharing of data in this manner may enable a passive-tracking system 115 to update, calibrate, or repair other sensors and (with respect to the other sensors) to send notifications of such issues, ignore the affected data, or adjust any relevant confidence factors. Consider another example. A first passive-tracking system 115 may be assigned to a monitoring area 110 that is a foyer of a building located in a colder climate, and a second passive-tracking system 115 may be positioned in another monitoring area 110 of that building, such as a break room. The building may contain additional passive-tracking systems 115 beyond these two. On many occasions, humans entering the foyer may be wearing heavy winter clothing, and they may remove at least some of this clothing soon thereafter, meaning they may not be wearing these articles in the break room.

The clothing, while being worn, may affect the readings of the first system 115. For example, the clothing, because it does not produce IR, may cause the thermal data from the first system 115 to show a relatively low average temperature reading for many of the detected humans. As another example, the heights and other dimensions of the detected humans may be enlarged from the clothing, particularly from winter headgear, and the physical dimensions produced by the first system 115 may be correspondingly affected. In a similar vein, returns from the sonar device 355 may not be as pronounced because the clothing may absorb some of the energy of the generated waves. These distortions may not be reflected in the readings of the second system 115, however, because the heavy clothing is likely to have been removed once the humans have moved beyond the foyer.

The data from the second system 115 and other passive-tracking systems 115 in the building that are unaffected by the skewed readings may share their data with the first system 115. In response, the first system 115 may learn to automatically adjust some of its readings to account for the likely presence of winter clothing. For example, the first system 115 may reduce by a certain percentage at least some of the physical dimensions that it generates for the human objects 105, or it can ignore data generated from the sonar returns and rely on the ToF sensor 310 for depth information. The first system 115 may, in addition to such adjustments or in lieu of them, alter a number of relevant confidence factors.

In one embodiment, such adjustments may be performed only if data from other sensors supports the likelihood of winter clothing affecting the data. For example, the modification of the physical dimensions of the detected object 105 may be reduced only if the data from the thermal sensor 315 indicates a lower average temperature (from the outerwear) and the data from the visible-light sensor 300 determines that the object 105 has human facial features and moves within a range of human motion. In this instance, the main processor 320 may also subsequently adjust the average temperature of the object 105 to a normal human temperature to reflect the determination that the object 105 is most likely a human wearing heavy clothing. Further, the main processor 320 may set or modify any relevant confidence factors to account for any uncertainties in the data from the sensors.

A passive-tracking system 115, like one presented above, may be useful for many different applications, whether as part of a network 200 or on an individual basis. Several examples of such applications will be described here, although they are not meant to be limiting in any manner. Numerous examples of actions that may be taken as part of these applications will also be shown, and they are not intended to constrain the possibilities of operation of the embodiments presented herein. Moreover, as part of these actions, the passive-tracking system 115 or some other device may assign and (if necessary) adjust any number of relevant confidence factors.

In one embodiment, the detection of certain objects 105 in a monitoring area 110 may serve as a trigger for various actions. For example, based on the gathered data, the passive-tracking system 115 may determine that a detected object 105 is human and that the human is outside a range of predetermined heights. The monitored area 110 may be a day-care room for small children, and the range of predetermined heights for this room may be limited to the average height(s) for such children. In response to the detection of the human who is taller than the maximum height for this range and who may be an unauthorized adult in this area, the system 115 may take any number of actions. For example, the system 115 may sound an alarm, cause doors, windows, or other structures to be locked, signal security services or the police, and capture and store images of the detected human and forward them to any necessary parties.

Other characteristics may be used to detect a possible unauthorized adult in this area, either as an individual diagnostic or as a supplement to the calculated height of the adult. For example, the detected object 105 may move at a speed that is within the normal range for a human but is well above that for typical small child. In addition, this scheme may also apply to an assisted-living facility, where elderly patients there may typically be smaller in stature and move more slowly than younger adults.

In another embodiment, a network 200 of passive-tracking systems 115 may be established in a building with a plurality of rooms in which each room may include at least one system 115. As has been shown above, a passive-tracking system 115 can detect any number of humans in a monitoring area 110. In the event of an emergency that affects the building, the network 200 may receive a counting request for a number of humans in a number of monitoring areas 110, such as the rooms of the building. This counting request may originate from a first-responder activation. For example, a first responder may establish communications with the network 200, either directly or indirectly, and may enter an authorization code or can simply access a certain communications box with a special (physical) key. In response, the network 200 may signal each of the relevant passive-tracking systems 115 to perform a passive count of the humans in their respective rooms. Once returned, the network 200 may show through any suitable user interface (UI) the total number of humans in the building and the number of humans in each room, along with a map of the building showing these locations. If the humans move into different rooms or exit the building, the UI may be updated to reflect these changes.

In another arrangement, the network 200 can be configured to provide information about the emergency, such as the subject that prompted it. For example, in the event of a fire, data from a thermal sensor 315, a visible-light sensor 300, and an array 350 of sound transducers 305 may indicate the presence of flames in a certain room. Specifically, the thermal data may reveal average temperatures for an object 105 (the flames) that are significantly higher than those of other objects 105 in the room or other areas of the room. In addition, the visible-light sensor 300 may show extreme brightness and motion that is consistent with fire, and the sound transducers 305 may detect the familiar crackling sound of flames. As an option, the data from these sensors may be compared to a database (either in the passive-tracking system 115, a hub 200, or some other device) that contains signatures that are representative of such phenomena. If any potentially dangerous phenomena is recognized from the analysis, the main processor 320 may be configured to temporarily prevent the incorporation of the object 105 associated with the data leading to such recognition into the relevant reference frames. This step may prevent the potentially dangerous object 105 from being ignored for purposes of passive tracking.

Another example of providing information about the subject of the emergency is the passive tracking of an armed criminal in the building. For example, the thermal data may show rapid heating of an object 105 and its subsequent, gradual cooldown, which may be the case if the object 105 is a firearm that has been discharged. The sound transducers 305 may also detect the distinct sound of a gunshot, and the visible-light sensor 300 may produce data that reveals the presence of a muzzle flash or the weapon itself. The pressure sensor 325 may also detect changes in pressure caused by a discharge. Like the example above related to the fire, the data from the sensors may be compared to a database that may contain relevant signatures related to the firearm or other weapons.

In either example, the passive-tracking systems of the network 200 can passively track the subject of the emergency, share the data they collect with each other, and provide this information to the first responders. For example, the systems 115 of the network may monitor the progress of the fire throughout the building and provide updates to the first responders. Similarly, the systems 115 may detect the armed criminal in their respective area, and as this person moves throughout the building, may signal other systems 115 that are likely in the subject's path to anticipate that person's entry into the areas covered by such systems 115. First responders may also be provided with this information, giving them an advantage because they may know where the criminal is located. The network 200 may also be configured to execute any number of steps in response to the emergency, such as automatically closing and locking doors, activating fire-suppression systems and alarms, and opening emergency exits.

A network 200 of this nature may be useful for detecting humans or other living things in unauthorized spaces or areas of danger. As an option, the restrictive access may be based on certain times of day, such as after normal business hours. For example, a network 200 in a zoo may easily distinguish a nighttime human intruder from the animals and can provide a warning to zoo personnel or the police. As another example, a passive-tracking system 115 may detect the presence of a child or a pet and can warn any relevant parties if the child or pet leaves or enters a particular area or a range of that area.

A passive-tracking system 115 may also monitor a detected living being for certain signs of distress, which may be caused by a medical emergency. For example, if the system 115 detects the presence of a human and is passively tracking the human, the data from the visible-light sensor 300, the ToF sensor 310, or the sonar device 355 may detect a sudden change in the human's position, such as from the human falling. Further, the data from the pressure sensor 325 may indicate a pressure change caused by the fall, and the data from the sound transducers 305 may reflect the sound caused by the human's body hitting the floor and any cries for help. The data from the thermal sensor 315 may also be used to detect whether the human's average temperature has dropped to a level that may be indicative of a problem, such as if the person has been rendered unconscious.

In other examples, data from the thermal sensor 315 may detect raised temperatures in a living being, which may be reflective of a fever, and the pressure sensor 325 may capture a reduced periodicity of pressure changes, which may be caused by a lowered breathing rate of the living being. In either of these examples, the passive-tracking system 115 may perform any number of steps in response to the possible medical emergency, such as by generating a notification for emergency personnel or other persons. The passive-tracking system 115 may also be configured to generate an audio signal that may be in the form of human speech asking the detected human if he or she needs assistance.

The passive-tracking system 115 can also be configured to control access to certain areas. For example, if the system 115 detects the presence of a human, the system 115 can generate one or more signals that may cause doors (or other ingress/egress structures) to automatically unlock or open. The doors that are automatically unlocked or opened may be based on their proximity to the human or the likelihood that the human may approach the doors in view of the current direction of motion of the human. This principle may also apply to other living things, such as a pet in which the pet is approaching a pet doorway. Once the system 115 determines that the human has left the monitoring area 110, the system 115 can generate signals that can cause the closing and/or locking of the doors. The passive-tracking system 115 may be configured to employ certain restrictions on this access. For example, the system 115 may generate the opening or unlocking signals only if the system 115 determines that the detected human is an adult (such as by size determination). In the case of a pet, the system 115 may avoid generating such signals if no pet is present and only humans are near the pet doorway. In either of the examples here, the system 115 may also cause other devices or systems to become active, such as lights or air conditioners in the affected area.

In another arrangement, a passive-tracking system 115 may perform certain steps to reduce energy consumption. As an example, if the system 115 determines that no humans (or other living beings) are present in a monitoring area 110, the system 115 may generate one or more signals that can cause certain devices or systems to shut down, deactivate, or otherwise reduce its energy use. Examples of these devices or systems include lights, televisions, air conditioners, and ceiling fans. The system 115 is particularly suited for this arrangement because it may still detect the presence of a human (such as through the thermal data), even if the human remains motionless for an extended period of time. Conventional systems simply detect for motion and will deactivate certain devices if no movement is sensed. As such, these conventional systems will, for example, turn off lights in a room if a person in the room is seated at a desk.

In earlier sections, examples of adaptive learning by a passive-tracking system 115 were presented. This process of learning may also apply to interactions with humans or other living beings in a monitoring area 110. For example, the system 115 may, over time, determine that a human object 105 is detected in the monitoring area 110 at roughly the same time for certain days. The human may be a child arriving home from school on weekdays around the same time or an adult returning from work on the same days but later in the day. In response, the system 115 may execute certain steps that anticipate this arrival, such as setting a particular temperature on an air conditioner or powering up a television or a desktop computer. If the human is not detected within a certain amount of time of the usual arrival time, the system 115 may undo the anticipatory steps, such as by returning the air conditioner to its previous setting or shutting off the television or computer.

If a human is detected within this time period, the system 115 may determine whether the detected human fits the profile of the human who is detected at the usual arrival time. For example, the physical dimensions of the human detected within the time period may be compared to those of the human who is normally detected at the usual arrival time. The system 115 may also be configured to perform other comparisons, such as those based on other physical traits. If the detected human fits the profile, the system 115 may keep the anticipatory steps in place. If not, however, the system 115 may undo them or attempt to match the detected human with another profile. In either of these automation examples, the system 115 may be configured to receive input from other devices, such as televisions, programmable thermostats, or smart lights, in the monitoring area 110 or other locations to enable the system 115 to learn the habits of one or more humans.

As another example, if a human object 105 is not detected within a certain temporal range of an expected arrival time, the passive-tracking system 115 may carry out certain precautionary steps. For example, if a human is not detected within one hour of an expected arrival time, the system 115 may generate signals that cause a pet doorway to open or unlock or a pet feeder to release certain amounts of food or water. As another example, the system 115 can generate a notification to be directed to one or more different phone numbers or email addresses.

Passive-tracking systems 115 may also provide analytics, such as for retail establishments. In one embodiment, a system 115 can detect and passively track multiple humans over time in a retail establishment and can collect and store tracking data related to this process. The tracking data may identify certain sections of the establishment that generate high or low amounts of traffic or browsing or detect other patterns of behavior among the humans being passively tracked. As part of this solution, the positional data related to the humans can be mapped against one or more digital floor plans or planograms. Accordingly, employees or consultants of the establishment may determine which sections are generating the most (or least) interest and may correspondingly take steps to build on these patterns or make improvements to optimize the floor plans or planograms. Other human behaviors that may be passively tracked include the amount of time a human may spend at a table or bar in a restaurant and how long humans may spend in a checkout line and their rate of abandoning the line before reaching the point-of-sale.

Real-time adjustments may also be made in view of this data. Specifically, the passive-tracking system 115 may detect an excessive number of human objects 105 in a checkout line. In response, the system 115 may signal one or more staff members or other personnel to report to a point-of-sale terminal or other customer-interaction area to alleviate the waiting time.

Because a passive-tracking system 115 can provide a passive count of the number of humans in a monitoring area 110, the system 115 (or a group of them in a network 200) can determine whether a certain location has exceeded or is about to exceed its maximum occupancy. This solution may be particularly helpful in establishments where occupancy levels are commonly exceeded, such as theaters and nightclubs. In addition, the passive count can be constantly updated to give a virtual real-time count of the number of humans in a location. If the maximum occupancy is exceeded or about to be exceeded, the system 115 can perform corrective steps, like signaling ushers or causing entry doors (but not exit doors) to be automatically closed. Some of these steps may be automatically reversed once the system 115 determines that the passive count has gone below the maximum occupancy.

Passive counting may also be used to ensure compliance with specified minimum thresholds. For example, a day-care center may be required to have one or more adults in each of its rooms designated for housing children when children are present in these rooms. If the system 115 determines that only humans of a size that is equivalent to that a child are present in at least one of the rooms, the system 115 may generate notifications in an effort to correct the deficiency.

The workplace is another setting that may benefit from the introduction of passive-tracking systems 115. As an example, a passive-tracking system 115 may be configured to determine whether a human object 105 comes within a predetermined distance or area of a dangerous area, such as a conveyer belt or a blast furnace. If the system 115 detects a human within or near the distance or area, the system 115 can generate a warning signal for the human or can signal the dangerous component to shut down. The system 115 may also be used to ensure that a minimum number of employees for performing a specific task are present or that an employee is positioned in the proper location for operating a machine. If deficiencies are detected, the system 115 may generate notifications to that effect or may cause the operation of any affected machinery to be blocked.

Passive-tracking systems 115 may also monitor the fulfillment of workplace requirements by passively tracking the movements of employees. As an example, a number of systems 115 may passively track a security guard to determine whether the guard maintained compliance with any particular routines, such as checking on secure areas along a designated path. Passive tracking of employees may also identify areas in the workplace that may be suitable for modifications. For example, a system 115 may provide feedback that shows that employees consistently loiter in one or more places in the workplace, such as before the workday begins. Based on this information, an employer may decide to post important workplace notifications in the identified areas.

As noted earlier, a passive-tracking system 115 may be configured to identify non-human objects 105, such as a weapon or fire. This principle can be expanded to recognize other machines. For example, a system 115 can detect the presence of one or more forklifts in a workplace and can passively track these machines over the course of the workday. Some of the characteristics of a forklift that may enable its identification here include its heat and noise signatures, its overall size and shape, and its speed and ability to quickly change directions. The passively-tracked positioning data of the forklifts during the day may be compared to structural plans of the workplace to detect possible dangerous conditions or to optimize or otherwise improve the travel paths for the forklifts.

Many of the examples described so far show the passive-tracking system 115 in a fixed position, particularly in an enclosed area. The system 115, however, is not necessarily limited to these arrangements. Specifically, the system 115 may be capable of being moved from one position in a monitoring area 110 to another, such as from a first corner to a second corner, both of the monitoring area 110. Additionally, the system 115 is capable of being moved from one monitoring area 110 to another monitoring area 110. In one arrangement, the system 115 may be supported by hardware to permit the system 115 to be detachably coupled for purposes of moving the system 115. Such hardware may also allow the system 115 to pivot or rotate, which may be helpful to improve its operation. In another example, the hardware may include one or more tracks to enable the system 115 to slide into other positions in the monitoring area 110, whether vertically, horizontally, or in any other suitable direction. In another example, the system 115 can be installed on a support structure that can permit the system 115 to be raised or lowered.

Individual components of the system 115 may also be capable of being moved or repositioned. For example, the orientation of one or more of the sound transducers 305 may be adjusted, with the overall positioning of the system 115 remaining the same. In another arrangement, some of the components of the system 115 may be capable of being physically separated from the system 115 and placed in a new location. For example, the thermal sensor 315 may be decoupled from the system 115 and placed in a new position that is some distance from the system 115. In this configuration, however, the thermal sensor 315 may be configured to continue providing its data to the system 115, whether through (directly or indirectly) a wired or wireless connection.

If the system 115 or a component thereof is moved, some features of the system 115 may be reconfigured to account for the new position. For example, adjustments to the coordinate system 410 of the system 115 can be made to account for changes in the positioning of the system 115. Moreover, the new position of the system 115 or component may have changed its perspective of pre-existing or recognized objects 105, and the system 115 may cause any number of reference frames to be updated to ensure these objects 105 remain part of the reference frames. As another example, base references used for various calculations, like X, Y, or Z reference data for the visible-light sensor 300 or the ToF sensor 310 or the values for the orientation of the sound transducers 305, may be correspondingly adjusted. To assist in the updating process, the accelerometer 365 or some other device can provide to the main processor 320 input that includes the new positioning data of the system 115 or the component. Any changes in the positioning of a system 115 or a component and the updating of reference data may be shared with the hub 205, other systems 115, or any other suitable devices, if necessary for passive tracking purposes.

Passive-tracking systems 115 may be capable of being positioned in monitoring areas 110 that are not enclosed or sheltered. For example, a system 115 may be positioned in areas that are exposed to the environment, such as open locations in amusement parks, zoos, nature preserves, parking lots, docks, or stadiums. Environmental features, like sunlight patterns, foliage, snow accumulations, or water pooling, may be integrated into any number of relevant reference frames, in accordance with previous descriptions. Some parameters of the system 115 may be adjusted to account for differences caused by the open environment. For instance, the range of normal human temperatures may be expanded, such as being raised during summer months and lowered during winter months. As another example, the operation of certain components of the system 115 may be modified. For example, the ToF sensor 310 may be disabled during daylight hours if the ambient light overwhelms the data with noise, and when operating at night, the power of the modulated-light signals may be raised to increase the range of the ToF 310. The expanded range may be necessary in view of the monitoring area 110 being an open location. The power of the scanning signals from the sonar device 355 may also be intensified to boost its range In one arrangement, a passive-tracking system 115 may be secured (either permanently or temporarily) to a host that is capable of movement. The movement of the host can be in any form, such as translational or rotational (or both) motion, and in any direction. Examples of a movable host include robots, airplanes, boats, motor vehicles, drones, military equipment, and other types of machinery. In one example, a system 115 may be installed on a robot, and the system 115 may be part of a network 200 that includes other systems 115. At least some of the other systems 115 may be fixed to a location in a monitoring area 110 in which the robot operates.

In one example, if the host robot (or host) is stationary, the passive-tracking system 115 installed on the host may detect any number of objects 105, including humans, in accordance with the illustrations provided herein. The host may take any number of precautionary actions, such as preventing movement in a certain direction if a human is detected in that location. In another example, the host may move and such movement may translate to the host's system 115. The host may feed data about its movement to the host's system 115, and this system 115 may use this information to adjust its readings. For example, knowing the movement information of the host, the system 115 may adjust the X, Y, and Z positions of an object 105 to account for the motion of the system 115. In addition, the data of the reference frames of the host's system 115 may be correspondingly adjusted, which can ensure that the movement of the host does not interfere with the process of filtering certain objects 105 from being passively tracked when such objects 115 do not warrant the tracking.

In another arrangement, the other passive-tracking systems 115 of the network 200 may share their data with the host's system 115. This data may include, for example, information about a detected object 105, such as a human detected in the monitoring area 110. The host's system 115 may rely on this data to calibrate or confirm its readings or to simply ignore its own readings and use the data from the other systems 115. In either case, the host's system 115 can cause the host to take certain actions to avoid injury or damage to the detected object 105. The data from the other systems 115 of the network 200 can also support the adaptive learning techniques previously described, on behalf of the host system 115.

A passive-tracking system 115 may be arranged in many different configurations, and it may contain other devices and features beyond those shown here. Alternatively, the system 115 may not necessarily be equipped with all the sensors, components, or features that are described herein. Several examples of such systems 115 will be presented. These systems 115 may also illustrate how a system 115 that does include the additional sensors or components may operate if such additional sensors or components become disabled or malfunction or are otherwise unable to provide data or to provide reliable data. Unless otherwise stated, when a particular sensor or component is presented as part of (including optional implementations) these alternative embodiments, the operation and configuration of such sensor or component and the features that they support may be similar to that of prior passages in this description.

Figure 6:
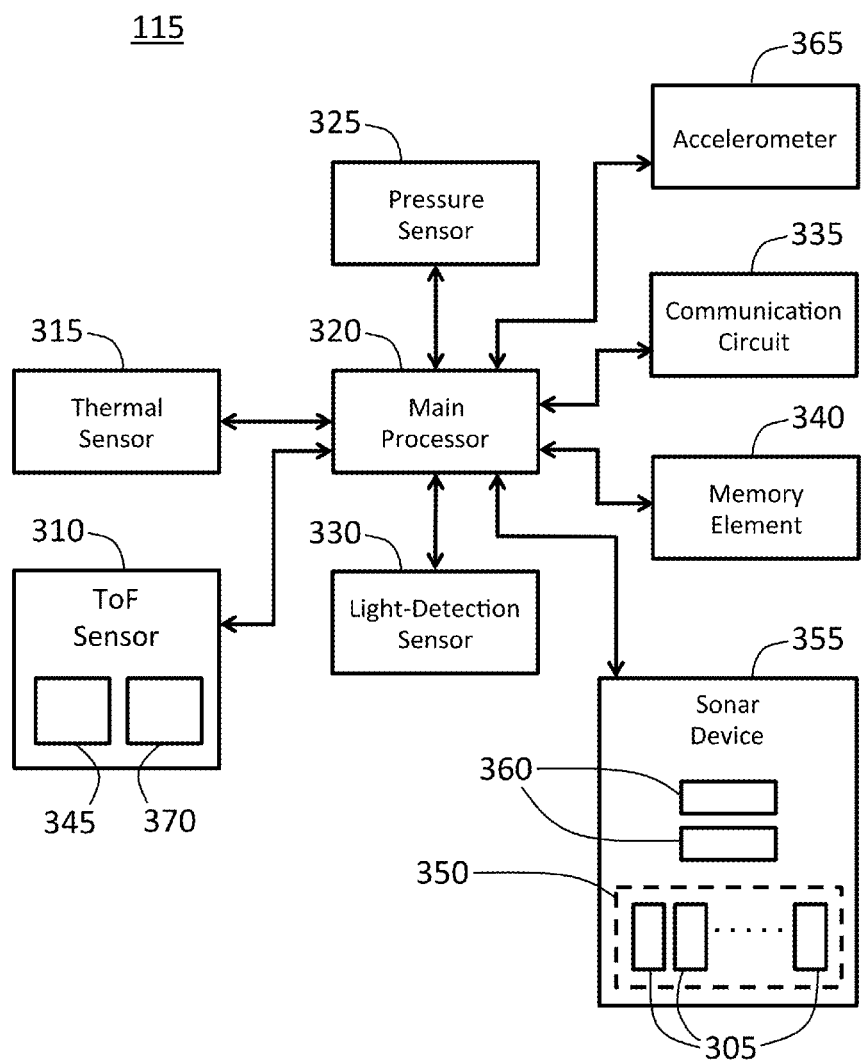
FIG. 6 illustrates another example of a passive-tracking system for passively tracking one or more objects.

Referring to FIG. 6, another example of a passive-tracking system 115 is pictured. In this embodiment, the system 115 may include a ToF sensor 310 and a thermal sensor 315 but may not have a visible-light sensor 300 (or it may not be operational). The main processor 320 may obtain the X, Y, and Z positions of an object 105 from the current modulated-light frames generated by the ToF sensor 310. If necessary, the main processor 320 may also acquire the X and Y positions of the object 105 from the current thermal frames of the thermal sensor 315. As an option, the data from the ToF sensor 310 can be overlaid on the data from the thermal sensor 315, which can confirm the X and Y positions of either sensor or can permit either of the sensors to be calibrated. The depth data from the ToF sensor 310 may also be used for purposes of depth boundary detection to help distinguish between objects 105.

The data from the thermal sensor 315 may also be used to distinguish human (or living being) objects 105 from inanimate objects 105, as previously described. As another example, the ToF sensor 310 may be configured to detect human facial features and to provide data that can be used to determine the height or size of an object 105. In another embodiment, the main processor 320 may be able to determine the speed and direction of movement of an object 105 from the data generated by the ToF sensor 310. For example, if the resolution of the ToF sensor 310 is sufficient, motion vectors may be used to determine these values of the object 105. If the resolution is insufficient, the digital representations of the object 105 in current and previous modulated-light frames may be compared to obtain such motion values. Accordingly, a system 115 equipped with these two primary sensors may passively determine the position of an object 105, including a human object 105, and passively track that object 105 over time, similar to the processes presented above.

As an option, the passive-tracking system 115 of FIG. 6 may also include a sonar device 355, which can contain an array 350 of sound transducers 305. The data from the sonar device 355 may be used to confirm or update depth distances and to provide X positions of detected objects 105, as described earlier. To support this feature, the main processor 320 may be configured to merge the data from the current thermal frames and the current modulated-light frames and to generate novelty representations 500 (see FIG. 5). This system 115 may also include a number of the other components that were previously shown, such as a pressure sensor 325, a light-detection sensor 330, a communication circuit 335, a circuit-based memory element 340, or an accelerometer 365. These optional components may assist in the passive tracking process.

Figure 7:
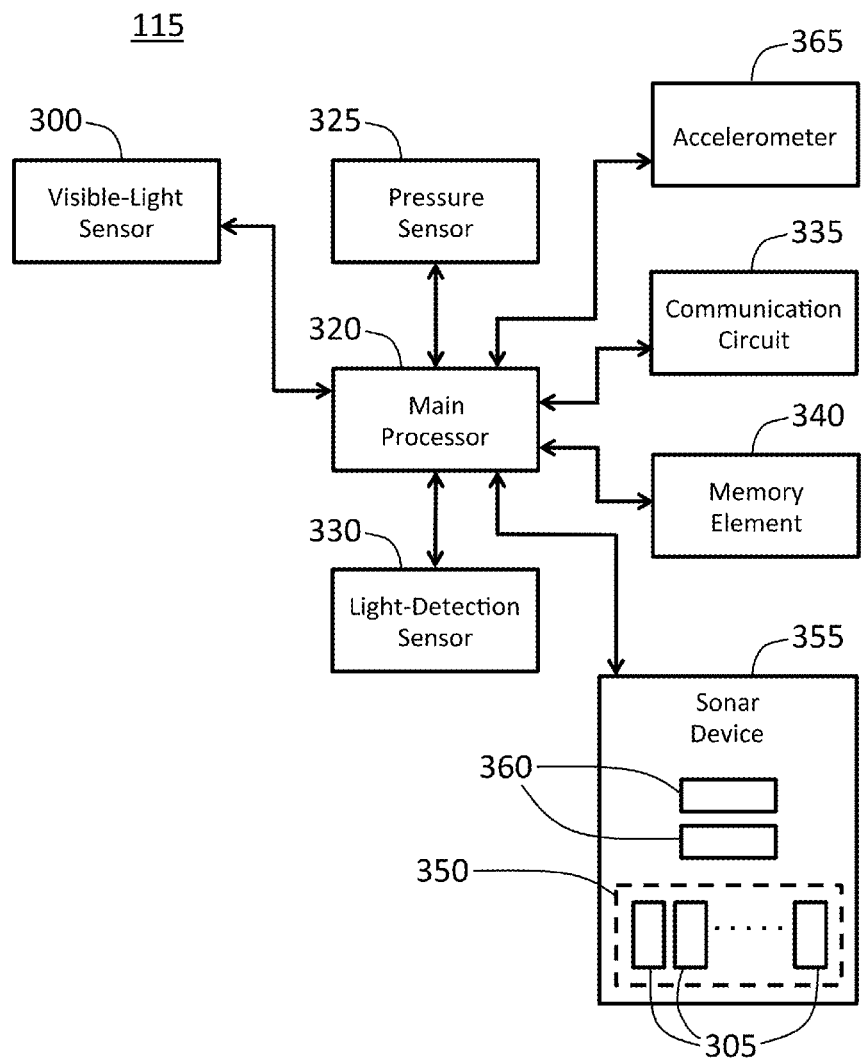
FIG. 7 illustrates another example of a passive-tracking system for passively tracking one or more objects.

Referring to FIG. 7, another example of a passive-tracking system 115 is depicted. In this example, the passive-tracking system 115 may include a visible-light sensor 300 and one or more sound transducers 305, which may be part of an array 350 of a sonar device 355. This system 115, however, may not have a ToF sensor 310 or a thermal sensor 315 (or one or both of them may not be operational). Here, the main processor 320 may determine the X and Y positions of an object 105 from the current visible-light frames generated by the visible-light sensor 300. In addition, the main processor 320 may acquire the X and Z positions of the object 105 from the current sonar frames of the sonar device 355. The data from the sonar device 355 may be mapped against the data from the visible-light sensor 300 to obtain the depth data of the objects 105 and to detect depth boundaries of these objects 105.

Although thermal data may not be available, the data from the visible-light sensor 300 may capture human facial features and can be used to estimate the height or other dimensions of the object 105. Moreover, the visible-light data may provide information about the motion of the object 105. Through these features, the main processor 320 may be able to determine whether an object 105 is a human (or some other living thing). Thus, like the preceding example, a system 115 equipped with these two primary sensors may find the position of an object 105, determine that the object 105 is a human, and passively track that human over time, similar to the processes presented above.

As an alternative, either or both of a ToF sensor 310 and a thermal sensor may be incorporated into the system 115 of FIG. 7. This system 115 may also include, if desired, a pressure sensor 325, a light-detection sensor 330, a communication circuit 335, a circuit-based memory element 340, or an accelerometer 365. Implementation of any of these devices into the system 115 may add to the system 115 any of the features that may be realized from their operation, in accordance with earlier descriptions.

Figure 8:
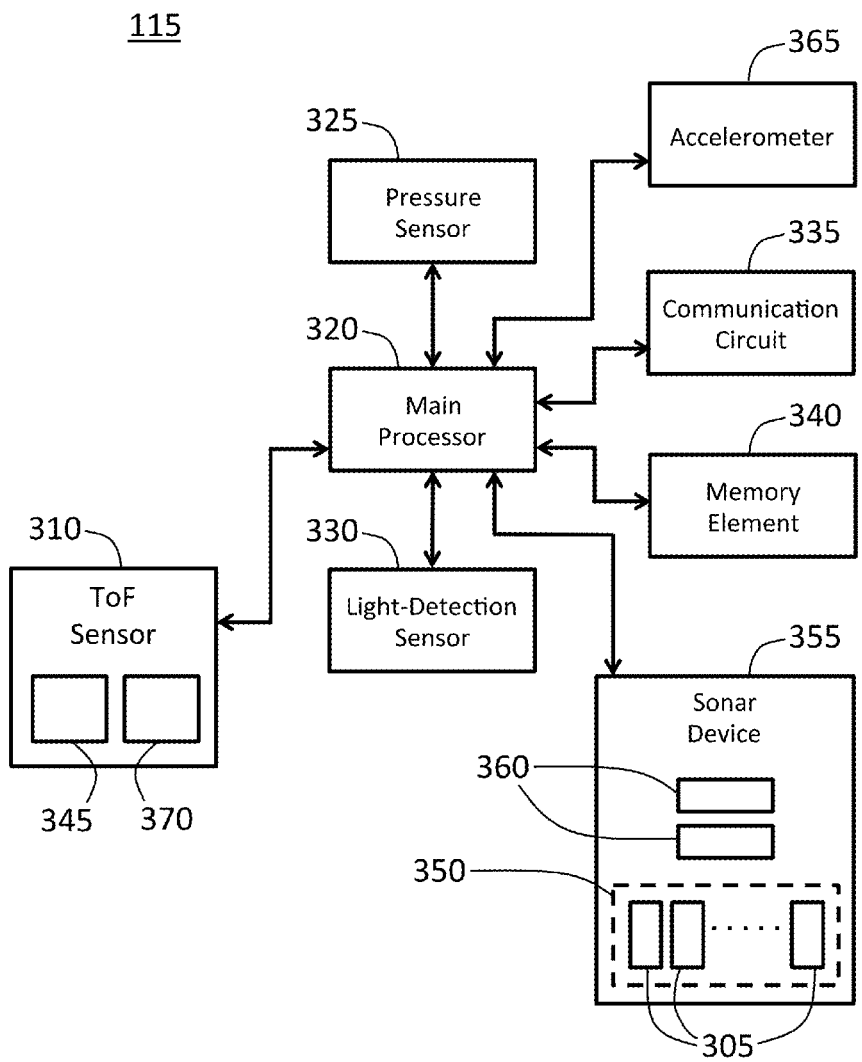
FIG. 8 illustrates another example of a passive-tracking system for passively tracking one or more objects.

Yet another example of a passive-tracking system 115 is illustrated in FIG. 8. In this case, the system 115 can include a ToF sensor 310 and a transducer array 350, which may or may not be part of a sonar device 355. This system 115 may not be equipped with a visible-light sensor 300 or a thermal sensor 315. Nevertheless, the main processor 320 may determine the X, Y, and Z positional data of an object 105 from the current modulated-light frames created by the ToF sensor 310. Depth-boundary detection can be performed based on the depth distances supplied by the data from the ToF sensor 310.

The transducer array 350, which can include one or more sound transducers 305, can be configured to capture human speech, which can be realized from comparisons with digital reference signals. This feature can enable the main processor 320 to determine that a particular object 105 is human. The data from the ToF sensor 310 may also be used to calculate a height or other size of the object 105 and its motion (speed and direction), and these values may assist in determining whether (or confirming) the object 105 is human. Based on the orientation of the transducers 305, the main processor 320 may obtain an X position of an object 105 through the data from the array 350, if necessary. As such, this system 115, with a ToF sensor 310 and a transducer array 350 serving as its primary sensors, can detect an object 105, determine whether the object 105 is human, and passively track the object 105 over time, similar to the other systems 115 presented herein.

Like the previous alternative embodiments, additional sensors and components may be integrated into the passive-tracking system 115 of FIG. 8. For example, a visible-light sensor 300 or a thermal sensor 315 (or both) may be integrated into this system 115. A pressure sensor 325, light-detection sensor 330, communication circuit 335, circuit-based memory element 340, or an accelerometer 365 or any combination thereof may optionally be part of this system 115. Like the earlier examples, adding these devices to the system 115 may enhance or otherwise supplement the operation of the system 115, in accordance with prior descriptions.

Figure 9:
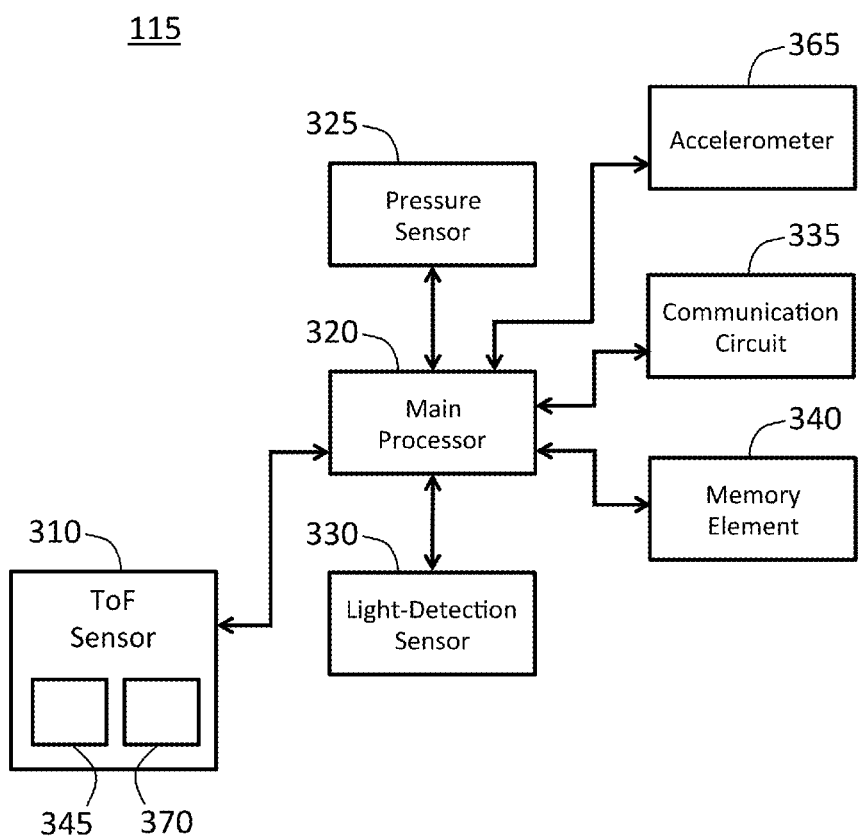
FIG. 9 illustrates another example of a passive-tracking system for passively tracking one or more objects.

Referring to FIG. 9, another embodiment of a passive-tracking system 115 is shown. The system 115 pictured here may include a ToF sensor 310 but may not have a visible-light sensor 300, a thermal sensor 315, or any sound transducers 305 (and hence, no sonar device 355). In this arrangement, the main processor 320 may obtain the X, Y, and Z positional data from the current modulated-light frames created by the ToF sensor 310. The depth data from the ToF sensor 310 can enable depth-boundary detection to occur. Moreover, the ToF sensor 310 can support identification of human facial features of an object 105, calculation of the height or other sizes of the object 105, and determination of motion values, each of which can assist in distinguishing human objects 105 from non-human or non-living objects 105. As a result, a system 115 with a ToF sensor 310 as its only primary sensor could detect an object 105, determine whether an object 105 is human, and passively track objects 105. As is the case with the previous alternative systems 115 presented above, other sensors and additional components—like a visible-light sensor 300, sonar device 355, thermal sensor 315, pressure sensor 325, light-detection sensor 330, communication circuit 335, circuit-based memory element 340, or an accelerometer 365 could be added to this system 115 to increase or supplement its functionality.

Much of the description herein focuses on providing three-dimensional positioning of an object 105 or a digital element, like a novelty representation 500. The embodiments recited herein, however, are not so limited. In particular, the passive-tracking system 115 can be configured to provide two-dimensional positioning of an object 105 or digital element or even a single coordinate or other positional value. For example, the system 115 can be configured to output only the X and Z coordinates of an object 105, as the Y coordinate (or elevation value) may not be necessary. In this example, any data related to the Y coordinate provided by the sensors may be ignored. Moreover, obviating the need for the Y data may also enable the system 115 to be configured with fewer sensors or may reduce the amount of processing required, including that for confirming Y data from one sensor with another sensor's output. For example, the system 115 may be equipped with a sonar device 355, which may provide X- and Z-positional data, and (possibly) one or more other sensors to confirm (or adjust) this positional data from the sonar device 355.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein.

Furthermore, arrangements described herein may take the form of a computer program product embodied in one or more computer-readable media having computer-readable-program code embodied (e.g., stored) thereon. Any combination of one or more computer-readable media may be utilized. The computer-readable medium may be a computer-readable signal medium or a computer-readable storage medium. The phrase "computer-readable storage medium" is defined as a non-transitory, hardware-based storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable storage medium may be transmitted using any appropriate systems and techniques, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects herein can be embodied in other forms without departing from the spirit or essential attributes thereof. Accordingly, reference should be made to the following claims, rather than to the foregoing specification, as indicating the scope hereof.

What is claimed is:

1. A passive-tracking system for passively tracking a human, comprising:
    a thermal sensor that is configured to receive thermal radiation emitted from an object in a monitoring area and generate a series of thermal frames based at least in part on the thermal radiation emitted from the object in the monitoring area;
    a time-of-flight sensor that is configured to generate a series of modulated-light frames based at least in part on modulated light reflected off the object; and
    a processor that is communicatively coupled to the thermal sensor and the time-of-flight sensor, wherein the processor is configured to:
        receive the thermal frames from the thermal sensor and the modulated-light frames from the time-of-flight sensor;
        based at least in part on the data of the thermal frames and the modulated-light frames, generate a novelty representation of the object;
        based at least in part on the data of the thermal frames and the modulated-light frames, determine whether the object is human;
        if the processor determines that the object is human, generate, based on the novelty representation, a three-dimensional position of the human object;
        passively track the object over time by, based on the novelty representation, selectively updating the three-dimensional position of the human object;
        based at least in part on data of the thermal frames, track one or more thermal reference frames; and
        based at least in part on data of the modulated-light frames, track one or more modulated-light reference frames.

2. The passive-tracking system of claim 1, wherein the processor is further configured to, based on an analysis of the thermal reference frames and one or more past-performance factors, assign a deemphasizing grade to one or more of the thermal frames.

3. The passive-tracking system of claim 1, wherein the thermal reference frames include thermal reference frames that correspond to different time periods or to different thermal events and wherein the modulated-light reference frames include modulated-light reference frames that correspond to different time periods or to different modulated-light events.

4. The passive-tracking system of claim 1, wherein the processor is further configured to compare the data of the thermal frames to data of the thermal reference frames and to compare the data of the modulated-light frames to data of the modulated-light reference frames as part of the generation of the novelty representation of the object.

5. The passive-tracking system of claim 4, wherein the processor is further configured to merge the data of the thermal frames and the modulated-light frames based on novelty factors as part of the generation of the novelty representation of the object.

6. The passive-tracking system of claim 1, wherein the processor is further configured to conduct a size-threshold analysis or to conduct a thermal analysis as part of the determination of whether the object is human.

7. The passive-tracking system of claim 1, wherein one of the modulated-light frames is a current modulated-light frame and another one of the modulated-light frames is a previous modulated-light frame, wherein the processor is further configured to compare data of the current modulated-light frame to data of the previous modulated-light frame and to reject excessive motion readings based on the comparison of the data of the current modulated-light frame to the data of the previous modulated-light frame as part of the determination of the three-dimensional position of the object.

8. The passive-tracking system of claim 1, wherein the three-dimensional position includes X, Y, and Z coordinates.

9. The passive-tracking system of claim 1, wherein the processor is further configured to extract features from data of the modulated-light frames, wherein at least some of the features include human-recognition features that are associated with the object.

10. The passive-tracking system of claim 1, further comprising a communication circuit that is communicatively coupled to the processor, wherein the processor is further configured to signal the communication circuit to cause the three-dimensional position of the object and the updates of the three-dimensional position of the object to be transmitted to a hub or to a second passive-tracking system, wherein the hub or the second passive-tracking system is part of a network.

11. A method of passively tracking a human, comprising:
    generating thermal frames that include data associated with thermal radiation emitted from a human in a monitoring area;

generating modulated-light frames that include data associated with modulated light reflected off the human;

comparing the data of the thermal frames with one or more thermal reference frames;

comparing the data of the modulated-light frames with one or more modulated-light reference frames;

based on comparing the data of the thermal frames with the thermal reference frame and on comparing the data of the modulated-light frames with the modulated-light reference frame, selectively generating a digital representation of the human;

determining a three-dimensional position for the digital representation; and passively tracking the human over time by periodically updating the three-dimensional position of the digital representation.

12. The method of claim 11, further comprising selectively tracking the thermal reference frame and the modulated-light reference frame.

13. The method of claim 12, wherein selectively tracking the thermal reference frame and the modulated-light reference frame comprises tracking multiple thermal reference frames and multiple modulated-light reference frames, wherein the multiple thermal reference frames include thermal reference frames that are based on separate time periods or separate thermal events and wherein the multiple modulated-light reference frames include modulated-light reference frames that are based on separate time periods or separate modulated-light events.

14. The method of claim 11, wherein generating thermal frames that include data associated with thermal radiation emitted from a human in a monitoring area comprises generating thermal frames that include data associated with thermal radiation emitted from the human and a second human in the monitoring area and wherein generating modulated-light frames that include data associated with modulated light reflected off the human comprises generating modulated-light frames that include data associated with modulated light reflected off the human and the second human, wherein the method further comprises:

distinguishing the digital representation of the human from a digital representation of the second human; and simultaneous to passively tracking the human, passively tracking the second human over time by periodically updating a three-dimensional position of the digital representation of the second human.

15. The method of claim 14, wherein distinguishing the digital representation of the human from the digital representation of the second human comprises detecting a depth boundary of the digital representation of the human and the digital representation of the second human.

16. The method of claim 11, further comprising providing a passive count of a plurality of humans in the monitoring area.

17. A passive-tracking system for passively tracking a living being, comprising:

a thermal sensor that is configured to generate a series of thermal frames based at least in part on an object in a monitoring area;

a time-of-flight sensor that is configured to generate a series of modulated-light frames based at least in part on modulated-light reflections off the object;

a transducer array that is configured to generate a series of sound frames based at least in part on sound reflections off the object; and a processor that is communicatively coupled to the thermal sensor, the time-of-flight sensor, and the transducer array, wherein the processor is configured to:

receive the thermal frames from the thermal sensor and the modulated-light frames from the time-of-flight sensor;

based at least in part on the data of the thermal frames and the modulated-light frames, determine a three-dimensional position of the object;

based on at least one of the values of the three-dimensional position of the object, narrow a focus of a search of the transducer array;

based on the search of the transducer array, selectively adjust the value of the three-dimensional position of the object; and passively track the object over time by selectively updating the three-dimensional position of the object and the adjusted value of the three-dimensional position of the object.

18. The passive-tracking system of claim 17, wherein the value of the three-dimensional position that is selectively adjusted is a depth position of the object with respect to the passive-tracking system.

19. The passive-tracking system of claim 18, wherein the processor is further configured to narrow the focus of the search of the transducer array at least in part by merging the data of the thermal frames and the modulated-light frames and mapping data from the sound frames against the merged data to identify a primary maximum of the sound reflections off the object.

* * * * *